US012683729B2

(12) United States Patent
Lee et al.

(10) Patent No.: US 12,683,729 B2
(45) Date of Patent: Jul. 14, 2026

(54) METHOD FOR HANDLING MULTI-CELL SCHEDULING, USER EQUIPMENT AND BASE STATION

(71) Applicant: Acer Incorporated, New Taipei City (TW)

(72) Inventors: Chien-Min Lee, New Taipei City (TW); Li-Chung Lo, New Taipei City (TW); Jen-Hsien Chen, New Taipei City (TW)

(73) Assignee: Acer Incorporated, New Taipei City (TW)

( * ) Notice: Subject to any disclaimer, the term of this patent is extended or adjusted under 35 U.S.C. 154(b) by 461 days.

(21) Appl. No.: 18/331,922

(22) Filed: Jun. 8, 2023

(65) Prior Publication Data

US 2023/0412329 A1     Dec. 21, 2023

Related U.S. Application Data

(60) Provisional application No. 63/353,849, filed on Jun. 21, 2022.

(51) Int. Cl.
*H04L 5/00*          (2006.01)
*H04W 72/1268*      (2023.01)
*H04W 72/232*       (2023.01)

(52) U.S. Cl.
CPC ....... *H04L 5/0035* (2013.01); *H04W 72/1268* (2013.01); *H04W 72/232* (2023.01)

(58) Field of Classification Search
CPC ................ H04L 5/0035; H04L 5/0053; H04L 27/26025; H04W 72/1268; H04W 72/232; H04W 72/23; H04W 72/0446; H04W 72/21; H04W 72/563; H04W 88/02; H04W 88/08

USPC ................................................ 370/329–330
See application file for complete search history.

(56) References Cited

U.S. PATENT DOCUMENTS

| | | | |
|---|---|---|---|
| 2019/0150124 A1 | 5/2019 | Nogami et al. | |
| 2020/0374094 A1 | 11/2020 | Pelletier et al. | |
| 2022/0086894 A1 | 3/2022 | Papasakellariou et al. | |
| 2022/0095324 A1 | 3/2022 | Huang et al. | |
| 2022/0150832 A1 | 5/2022 | Yang et al. | |
| 2023/0057605 A1* | 2/2023 | MolavianJazi | ....... H04L 5/0053 |

(Continued)

FOREIGN PATENT DOCUMENTS

| | | |
|---|---|---|
| WO | 2022066599 | 3/2022 |

OTHER PUBLICATIONS

CATT, "Discussion on multi-cell PUSCH/PDSCH scheduling with a single DCI", 3GPP TSG RAN WG1 #109-e e-Meeting, R1-2203448, May 9-20, 2022, pp. 1-4.

(Continued)

*Primary Examiner* — Candal Elpenord
(74) *Attorney, Agent, or Firm* — JCIPRNET

(57) ABSTRACT

An aspect of the disclosure includes a method for, including: receiving a DCI from a first serving cell; determining a plurality of scheduled cells from a first set of serving cell according to the DCI, wherein the DCI is configured to schedule a plurality of physical uplink shared channels (PUSCHs) respectively on the plurality of scheduled cells; and transmitting at least one of the PUSCHs respectively on at least one of the plurality of scheduled cells according to the DCI.

34 Claims, 40 Drawing Sheets

(56) References Cited

U.S. PATENT DOCUMENTS

| | | | |
|---|---|---|---|
| 2023/0209530 A1* | 6/2023 | Rastegardoost | H04L 1/1854 370/329 |
| 2023/0284219 A1* | 9/2023 | Saber | H04L 1/1854 |
| 2024/0292409 A1* | 8/2024 | Xiong | H04W 72/0453 |
| 2025/0062864 A1* | 2/2025 | Wang | H04L 5/0055 |
| 2025/0142589 A1* | 5/2025 | El Hamss | H04W 52/0219 |
| 2025/0203599 A1* | 6/2025 | Okano | H04W 72/0453 |
| 2025/0212229 A1* | 6/2025 | Choi | H04L 1/1664 |

OTHER PUBLICATIONS

Intel Corporation, "Discussions on multi-cell scheduling with a single DCI", 3GPP TSG RAN WG1 #109-e, R1-2204816, May 9-20, 2022, pp. 1-12.

* cited by examiner

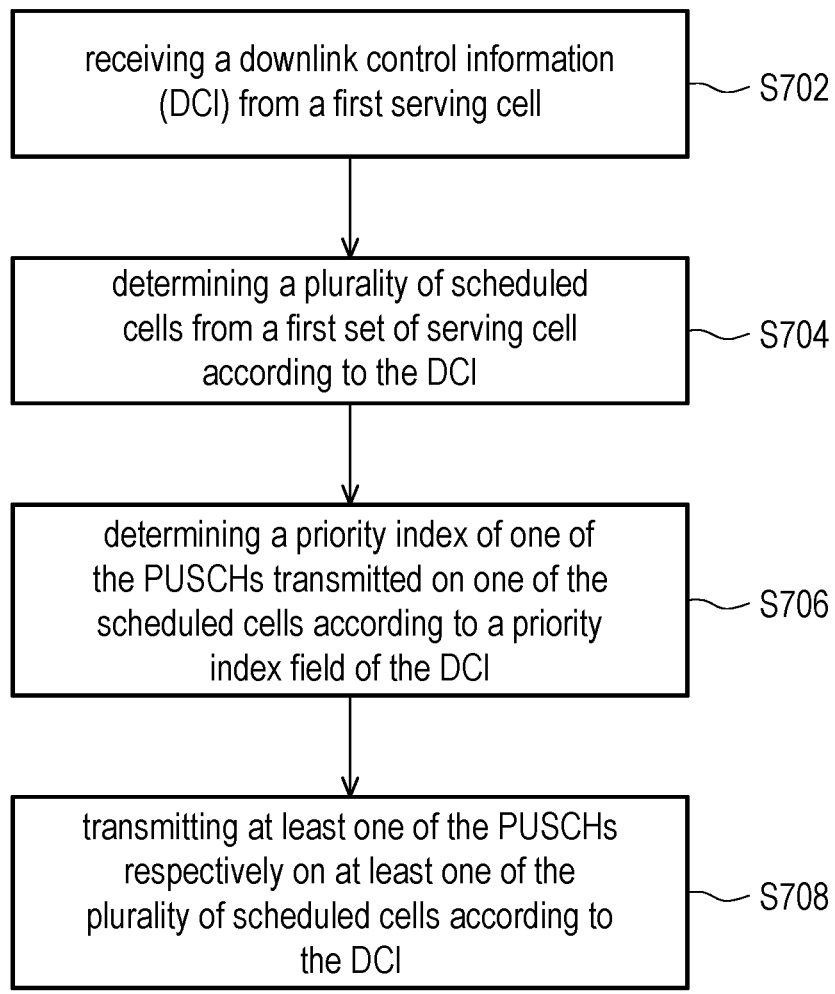

receiving a downlink control information (DCI) from a first serving cell — S702 determining a plurality of scheduled cells from a first set of serving cell according to the DCI — S704 determining a priority index of one of the PUSCHs transmitted on one of the scheduled cells according to a priority index field of the DCI — S706 transmitting at least one of the PUSCHs respectively on at least one of the plurality of scheduled cells according to the DCI — S708

FIG. 7

Figure 8:
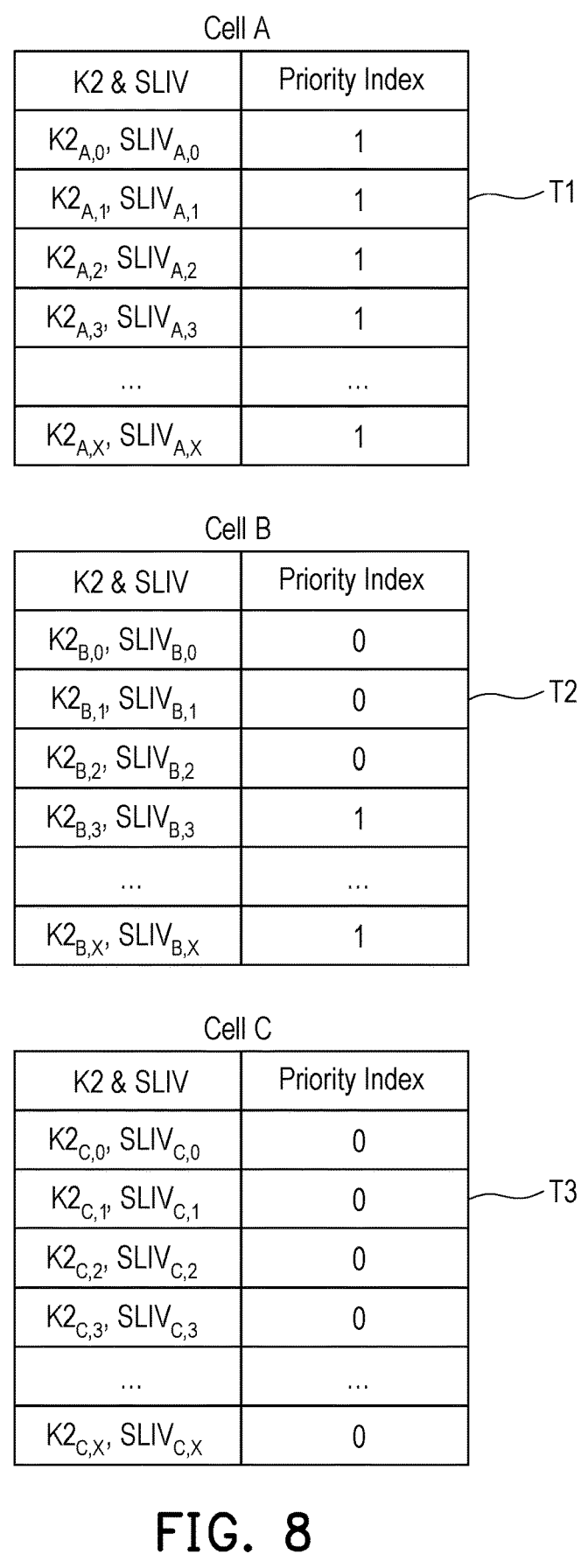

Cell A

| K2 & SLIV | Priority Index |
|---|---|
| $K2_{A,0}$, $SLIV_{A,0}$ | 1 |
| $K2_{A,1}$, $SLIV_{A,1}$ | 1 |
| $K2_{A,2}$, $SLIV_{A,2}$ | 1 |
| $K2_{A,3}$, $SLIV_{A,3}$ | 1 |
| ... | ... |
| $K2_{A,X}$, $SLIV_{A,X}$ | 1 |

T1

Cell B

| K2 & SLIV | Priority Index |
|---|---|
| $K2_{B,0}$, $SLIV_{B,0}$ | 0 |
| $K2_{B,1}$, $SLIV_{B,1}$ | 0 |
| $K2_{B,2}$, $SLIV_{B,2}$ | 0 |
| $K2_{B,3}$, $SLIV_{B,3}$ | 1 |
| ... | ... |
| $K2_{B,X}$, $SLIV_{B,X}$ | 1 |

T2

Cell C

| K2 & SLIV | Priority Index |
|---|---|
| $K2_{C,0}$, $SLIV_{C,0}$ | 0 |
| $K2_{C,1}$, $SLIV_{C,1}$ | 0 |
| $K2_{C,2}$, $SLIV_{C,2}$ | 0 |
| $K2_{C,3}$, $SLIV_{C,3}$ | 0 |
| ... | ... |
| $K2_{C,X}$, $SLIV_{C,X}$ | 0 |

Cell A

| K2 & SLIV | RA type |
|---|---|
| $K2_{A,0}$, $SLIV_{A,0}$ | A |
| $K2_{A,1}$, $SLIV_{A,1}$ | A |
| $K2_{A,2}$, $SLIV_{A,2}$ | A |
| $K2_{A,3}$, $SLIV_{A,3}$ | A |
| ... | ... |
| $K2_{A,X}$, $SLIV_{A,X}$ | A |

— T4

Cell B

| K2 & SLIV | RA type |
|---|---|
| $K2_{B,0}$, $SLIV_{B,0}$ | A |
| $K2_{B,1}$, $SLIV_{B,1}$ | A |
| $K2_{B,2}$, $SLIV_{B,2}$ | A |
| $K2_{B,3}$, $SLIV_{B,3}$ | B |
| ... | ... |
| $K2_{B,X}$, $SLIV_{B,X}$ | B |

— T5

Cell C

| K2 & SLIV | RA type |
|---|---|
| $K2_{C,0}$, $SLIV_{C,0}$ | B |
| $K2_{C,1}$, $SLIV_{C,1}$ | B |
| $K2_{C,2}$, $SLIV_{C,2}$ | B |
| $K2_{C,3}$, $SLIV_{C,3}$ | B |
| ... | ... |
| $K2_{C,X}$, $SLIV_{C,X}$ | B |

| Slot index for HARQ-ACK: | n | n+1 |
| --- | --- | --- |
| HARQ-ACK on LP PUCCH: | N/A | 5 bits |
| HARQ-ACK on HP PUCCH: | 8 bits | N/A |
| HARQ-ACK codebook : | 8 bits | 8 bits |

METHOD FOR HANDLING MULTI-CELL SCHEDULING, USER EQUIPMENT AND BASE STATION

CROSS-REFERENCE TO RELATED APPLICATION

This application claims the priority benefit of U.S. provisional patent application Ser. No. 63/353,849, filed on Jun. 21, 2022. The entirety of the above-mentioned patent application is hereby incorporated by reference herein and made a part of this specification.

TECHNICAL FIELD

This disclosure is directed to a method for handling multi-cell scheduling, a user equipment and a base station.

BACKGROUND

Third generation global partnership project (3GPP) are developing the 5G wireless access technology, known as new radio (NR). 5G NR is intended to address a variety of usage scenarios to meet new requirements associated with latency, reliability, security, scalability (e.g., with Internet of Things (IoT)), and other requirements. 5G NR includes services related to enhanced mobile broadband (eMBB), large-scale machine type communication (mMTC), and ultra-reliable low-latency communication (URLLC). Nevertheless, there still a need for further multiple-access improvements in 5G NR technology. These improvements may also be applicable to other multi-access technologies and the telecommunication standards that employ these technologies.

In the future wireless communication system, e.g. 5G NR system, a user equipment (UE) may communicate with a base station (BS) via multiple cells. Therefore, a downlink control information (DCI) may need to carry control information and scheduling information for multiple cells. However, the payload size of the DCI is limited. That is, how to efficiently apply the DCI for cross-cell scheduling is an important issue. Besides, in the current specification of 5G NR system, how to transmit an uplink control information (UCI) according to the DCI scheduling multiple cells has not been specifically specified yet. But such a specification is needed.

SUMMARY

Accordingly, the disclosure is directed to a method for handling multi-cell scheduling, a user equipment and a base station.

In one of exemplary embodiments, the disclosure is directed to a method for handling multi-cell scheduling used by a UE, and the method would include but no limited to: receiving a DCI from a first serving cell; determining a plurality of scheduled cells from a first set of serving cell according to the DCI, wherein the DCI is configured to schedule a plurality of physical uplink shared channels (PUSCHs) respectively on the plurality of scheduled cells; and transmitting at least one of the PUSCHs respectively on at least one of the plurality of scheduled cells according to the DCI.

In one of the exemplary embodiments, the disclosure is directed to a UE which would include not limit to: a transceiver and a processor coupled to the transceiver, and configured to: receiving, through the transceiver, a DCI from a first serving cell; determining a plurality of scheduled cells from a first set of serving cell according to the DCI, wherein the DCI is configured to schedule a plurality of PUSCHs respectively on the plurality of scheduled cells; and transmitting, through the transceiver, at least one of the PUSCHs respectively on at least one of the plurality of scheduled cells according to the DCI.

In one of exemplary embodiments, the disclosure is directed to a method for handling multi-cell scheduling used by a BS, and the method would include but no limited to: transmitting a DCI by a first serving cell, wherein the DCI is configured to schedule a plurality of PUSCHs respectively on the plurality of scheduled cells; and receiving at least one of the PUSCHs respectively on at least one of the plurality of scheduled cells according to the DCI.

In one of the exemplary embodiments, the disclosure is directed to a BS which would include not limit to: a transceiver and a processor coupled to the transceiver, and configured to: transmit, through the transceiver, a DCI by a first serving cell, wherein the DCI is configured to schedule a plurality of PUSCHs respectively on the plurality of scheduled cells; and receive, through the transceiver, at least one of the PUSCHs respectively on at least one of the plurality of scheduled cells according to the DCI.

It should be understood, however, that this summary may not contain all of the aspect and embodiments of the disclosure and is therefore not meant to be limiting or restrictive in any manner. Also, the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 7 is a flowchart of a method for handling multi-cell scheduling according to an embodiment of the disclosure.

FIG. 8 is a schematic diagram that illustrates determining a priority index of a PUSCH according to a TDRA field of the DCI according to an exemplary embodiment of the present disclosure.

FIG. 9 is a schematic diagram that illustrates determining a priority index of a PUSCH according to a TDRA field of the DCI according to an exemplary embodiment of the present disclosure.

DESCRIPTION OF THE EMBODIMENTS

Figure 1:
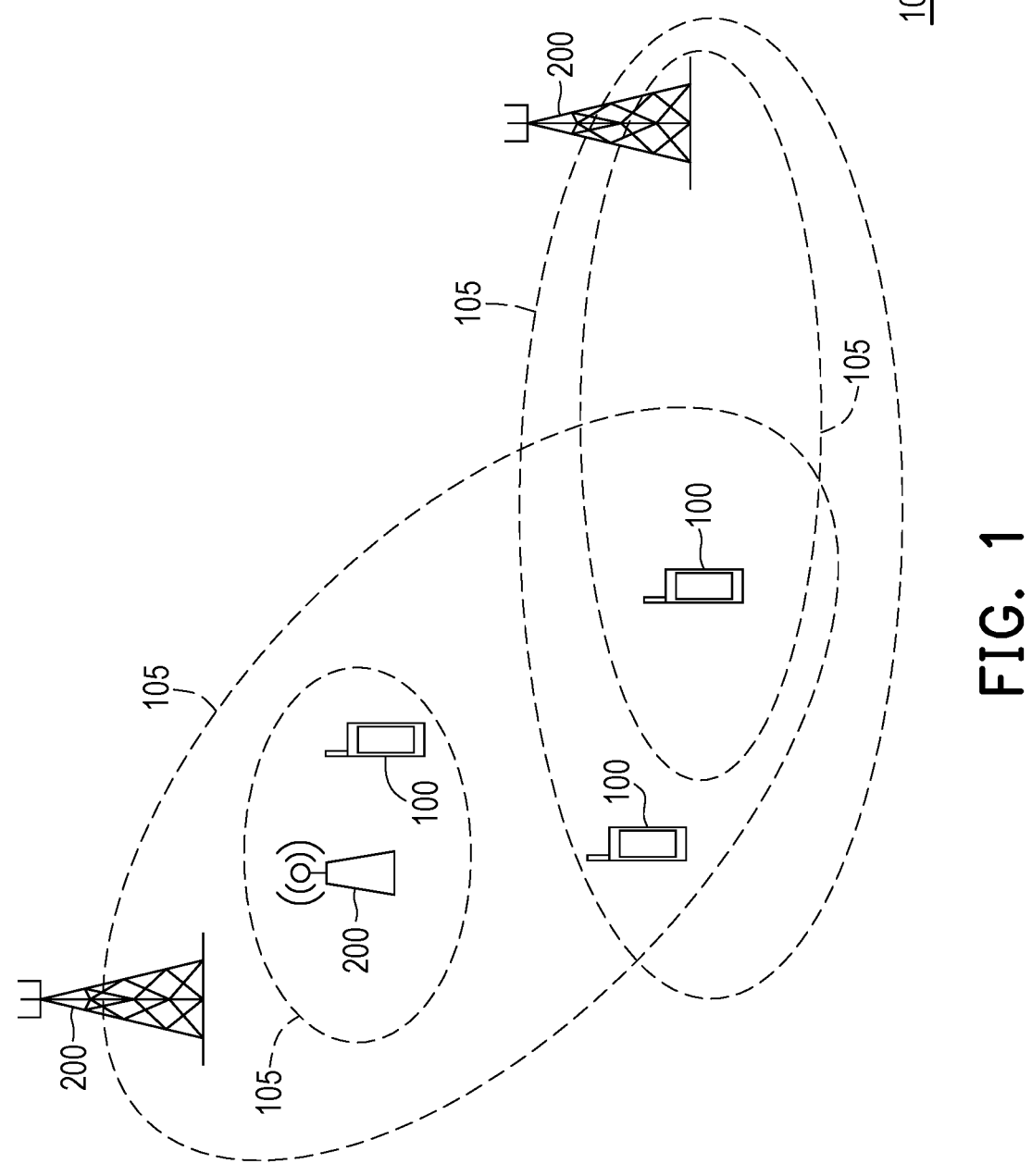
FIG. 1 is a schematic diagram that illustrates a wireless communication system according to an exemplary embodiment of the present disclosure.

It is to be understood that both the foregoing general description and the following detailed description are exemplary, and are intended to provide further explanation of the disclosure as claimed. Wherever possible, the same reference numbers are used in the drawings and the description to refer to the same or like parts.

Several aspects of wireless communication systems will now be presented with reference to various apparatus and methods. These apparatus and methods will be described in the following detailed description and illustrated in the accompanying drawings by various elements, such as blocks, components, circuits, processes, algorithms, etc. These elements may be implemented using electronic hardware, computer software, or any combination thereof. Whether such elements are implemented as hardware or software depends upon the particular application and design constraints imposed on the overall system. Accordingly, in one or more example embodiments, the functions described in this disclosure may be implemented in hardware, software, or any combination thereof. If implemented in software, the functions may be stored on or encoded as one or more instructions or code on a computer-readable medium.

FIG. 1 is a schematic diagram that illustrates a wireless communication system according to an exemplary embodiment of the present disclosure. Referring to FIG. 1, the wireless communication system 10 includes at least, but not limited to, UEs 100 and BSs 200. Besides, the wireless communication system 10 may include elements of a 5G (e.g., NR) network and/or a 4G (e.g., Long Term Evolution (LTE)) network, among other examples. In some examples, the wireless communications system 10 may support enhanced broadband communications, ultra-reliable communications, low latency communications, communications with low-cost and low-complexity devices, or any combination thereof.

The BSs 200 and the UEs 100 may wirelessly communicate via one or more communication links. The BSs 200 may provide a coverage area over which the UEs 100 and the BSs 200 may establish one or more communication links. The coverage area may be an example of a geographic area over which the BSs 200 and the UEs 100 may support the communication of signals according to one or more radio access technologies. The BSs 200 may be a macro base station, a pico base station, a femto base station, which is not limited in the disclosure.

The BSs 200 may support the operations of the cells. Each cell may be operable to provide services to at least one UE 100 within its radio coverage. Specifically, each cell (often referred to as a serving cell) may provide services to serve one or more UEs 100 within its radio coverage (e.g., each cell schedules the Downlink (DL) and optionally Uplink (UL) resources to at least one UE within its radio coverage for DL and optionally UL packet transmission). The BSs 200 may communicate with one or more UEs 100 in the radio communication system through the plurality of cells.

The BSs 200 may include, for example, a NR base station, an LTE base station, a Node B, an eNB (e.g., in 4G), a gNB (e.g., in 5G), a Node-B, an advanced BS (ABS), a transmission reception point (TRP), an unlicensed TRP, a base transceiver system (BTS), an access point, a home BS, a relay station, a scatterer, a repeater, an intermediate node, an intermediary, satellite-based communication BSs, and so forth.

The UEs 100 may communicate with a network (e.g., a Core Network (CN), an Evolved Packet Core (EPC) network, an Evolved Universal Terrestrial Radio Access network (E-UTRAN), a 5G Core (5GC), or an internet), through a RAN established by one or more BSs 200. Wireless communication between the BSs 200 and the UEs 100 may be described as utilizing an air interface. Transmissions over the air interface from the BSs 200 to the UEs 100 may be referred to as downlink (DL) transmission. Transmissions from the UEs 100 to the BSs 200 may be referred to as uplink (UL) transmissions.

The UEs 100 may be, for example, a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and the like. In some applications, a UE may be a fixed computer device operating in a mobile environment, such as a bus, a train, an airplane, a boat, a car, and so forth. Besides, the UEs 100 may be considered as, for example, a machine-type communication (MTC) or evolved or enhanced machine-type communication (eMTC) UE. An MTC UE and/or an eMTC UE may include, for example, a robot, a drone, a remote device, a sensor, a meter, a monitor, and/or a location tag, that may communicate with a base station, another device (e.g., a remote device), or some other entity.

In some embodiments, a UE 100 with carrier aggregation (CA) function and a BS 200 may communicate with each other by using a plurality of cells 105. More than one cells are aggregated to achieve a wider band transmission in the wireless communication system 10. In detail, a UE 100 may communicate with a single base station 200 by utilizing multiple cells, and may also communicate with multiple BSs 200 simultaneously on different cells. That is, the communication links between the UEs 100 and the BSs 200 may be through one or more cells. Each cell 105 may be referred to one component carrier in CA. The coverage of the cells 105 may differ due to that CCs on different frequency bands will experience different pathloss. Since the UEs 100 and the BSs 200 may use one or more cells to communicate with each other, cross-cell scheduling is needed in the wireless communication system 10. Generally, in the cross-cell scheduling operation, scheduling information for one cell (e.g., secondary cell) may be transmitted on another cell (e.g., primary cell).

In some embodiments, a DCI may be carried in a PDCCH. PDCCH may carry DCI in control channel elements (CCEs). For example, in 5G NR system, a CCE may consist of six logically contiguous resource element groups (REGs), and each REG may contain 12 resource elements (REs). The DCI may include information regarding DL scheduling assignments, UL resource grants, transmission scheme, UL power control, HARQ information, modulation and coding scheme (MCS) and other information. The size and format of the DCI may differ depending on the type and amount of information that is carried by the DCI.

To facilitate understanding of the technical solutions of the embodiments of the disclosure, the technical concepts related to the embodiments of the disclosure are described below.

Figure 2:
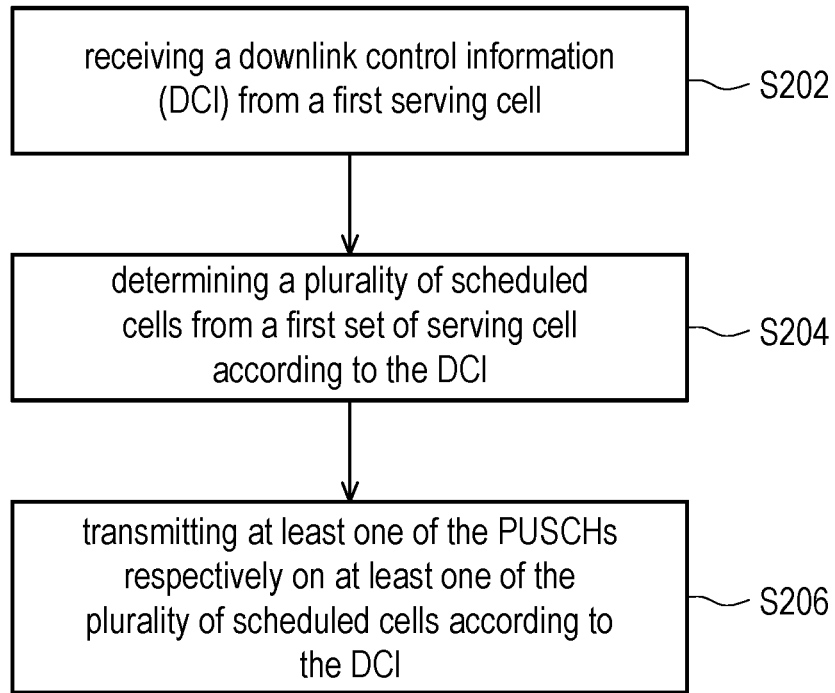
FIG. 2 is a flowchart of a method for handling multi-cell scheduling according to an embodiment of the disclosure.

FIG. 2 is a flowchart of a method for handling multi-cell scheduling according to an embodiment of the disclosure. Referring to FIG. 2, the method of this embodiment may be adapted for a UE 100 under the wireless communication system 10 of FIG. 1. Nevertheless, the processes of this method may be adjusted according to the actual needs and thus are not limited to the following.

In S202, the UE 100 may receive a DCI from a first serving cell. The DCI is configured to schedule a plurality of PUSCHs respectively on the plurality of scheduled cells. The UE 100 may be notified with the scheduling information of the PUSCHs on the scheduled cells by receiving the DCI. Namely, the DCI may be a UL grant. In some embodiments, the first serving cell configured for transmitting the DCI may be a primary cell (PCell) or a primary secondary cell (PSCell). In some embodiments, the scheduled cells for PUSCH transmission may be a plurality of secondary cells (Scells).

In S204, the UE 100 may determine a plurality of scheduled cells from a first set of serving cell according to the DCI. It should be noted that, the UE 100 is capable of communicating with the BS 200 via a plurality of serving cells, and the serving cells may be grouped into a plurality of cell groups. From another point of view, a cell group is a collection of one or more serving cells that are grouped together for the purpose of coordinating radio resource management (RRM) functions. The number of the cell groups and the serving cells in each cell group may be configured by a high layer configuration (e.g., radio resource control (RRC) configuration). The UE 100 may determine a plurality of scheduled cells from the serving cells grouped into the cell groups.

In some embodiments, the first set of serving cell may be also referred as a first cell group among the cell groups. For example, the first set of serving cell may be a Master Cell Group (MCG) or a Secondary Cell Group (SCG). In some embodiments, the first serving cell and the scheduled cells may be in the same cell group. Alternatively, in other embodiments, the first serving cell and the scheduled cells may be in the different cell groups.

In some embodiments, since the DCI is configured to schedule the PUSCHs respectively on the scheduled cells, the UE 100 may determine the scheduled cells scheduled for transmitting the PUSCHs from a cell group based on a field in the DCI. In some embodiments, the format of the DCI may be a DCI format 0_1, but not limited herein. The maximum number (e.g., 3, 4, or 8) of scheduled cells may be a predetermined value, a fixed value or configured by the BS 200, and the cell IDs of the scheduled cells scheduled for PUSCH may be determined by the UE 100 according to the DCI.

In S206, the UE 100 may transmit at least one of the PUSCHs respectively on at least one of the plurality of scheduled cells according to the DCI. In detail, after confirming the scheduled cells scheduled for transmitting the PUSCHs according to the DCI, the UE 100 may transmit the uplink data via at least one of the PUSCHs on the at least one of the scheduled cells, wherein the uplink data may include a UCI, uplink user data (also referred as uplink shared transport channel (UL_SCH) data) or the combination thereof. The PUSCHs scheduled by the DCI are transmitted in multiple UL slots or a single UL slot.

Figure 3:
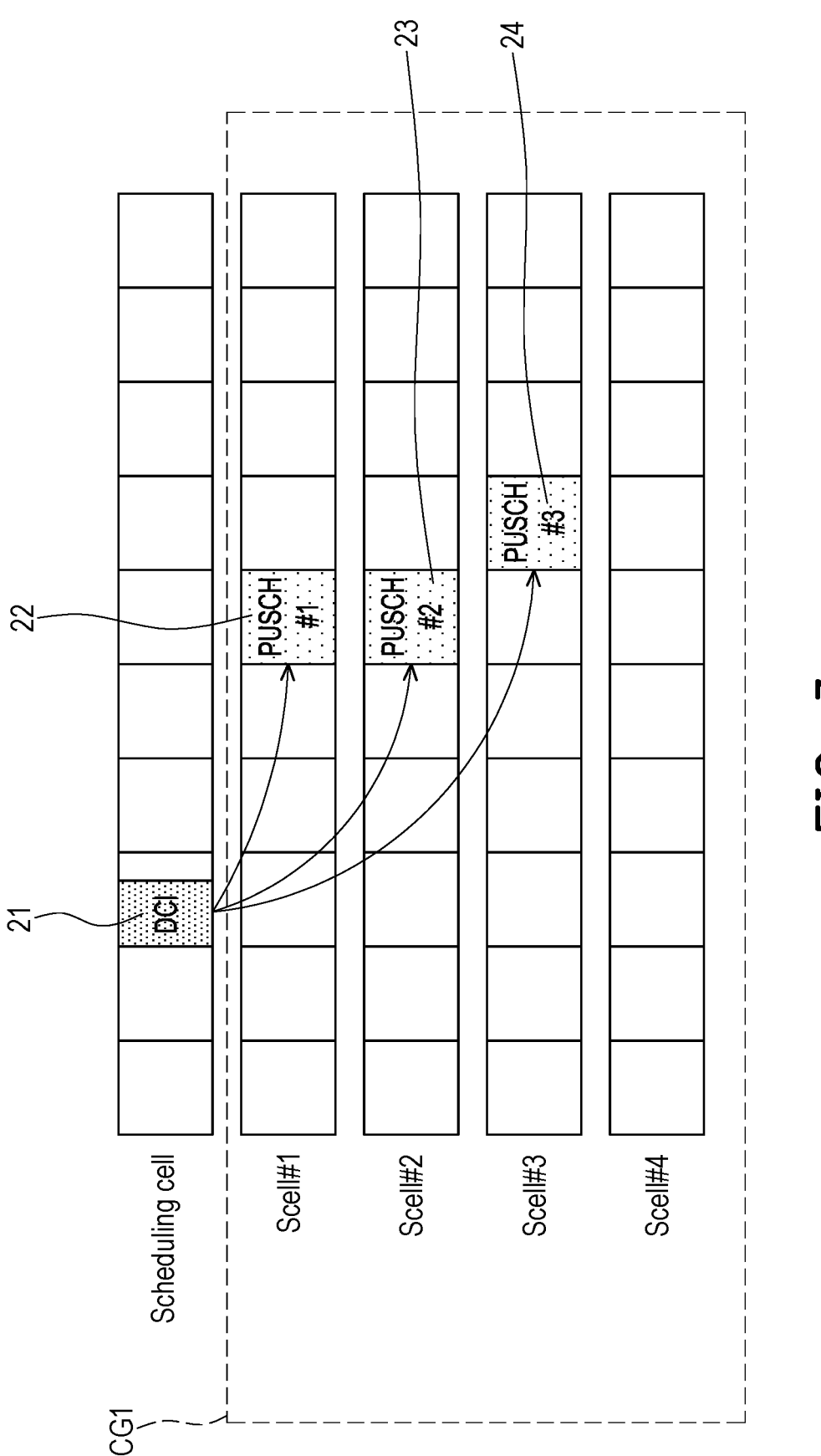
FIG. 3 is a schematic diagram that illustrates multi-cell scheduling according to an exemplary embodiment of the present disclosure.

For example, FIG. 3 is a schematic diagram that illustrates multi-cell scheduling according to an exemplary embodiment of the present disclosure. Referring to FIG. 3, the UE 100 may receive a DCI 21 from a scheduling cell. The DCI 21 may indicate that the PUSCHs 22, 23, 24 are scheduled on the scheduled cells Scell #1, Scell #2 and Scell #3 in the cell group CG1. Therefore, according to a filed in the DCI 21, the UE 100 may select the scheduled cells Scell #1, Scell #2 and Scell #3 from the cell group CG1 to perform the UL transmission via the PUSCHs 22, 23, 24. Namely, the cell IDs of the scheduled cells Scell #1, Scell #2 and Scell #3 scheduled for PUSCH may be identified by the UE 100 according to the field in the DCI 21. It should be noted that, the scheduling cell may be in the cell group CG1 or may not be in the cell group CG1.

In some embodiments, one of the scheduled cells scheduled for PUSCH may include a non-supplementary UL carrier and a supplementary UL carrier if the one of the scheduled cells is configured with a higher layer parameter (e.g., supplementary Uplink). If there is one scheduled cell including a non-supplementary UL carrier and a supplementary UL carrier, the UE 100 may not expect the DCI schedules PUSCHs on both the supplementary UL (SUL) carrier and the non-supplementary UL (non-SUL) carrier of the scheduled cell.

Figure 4:
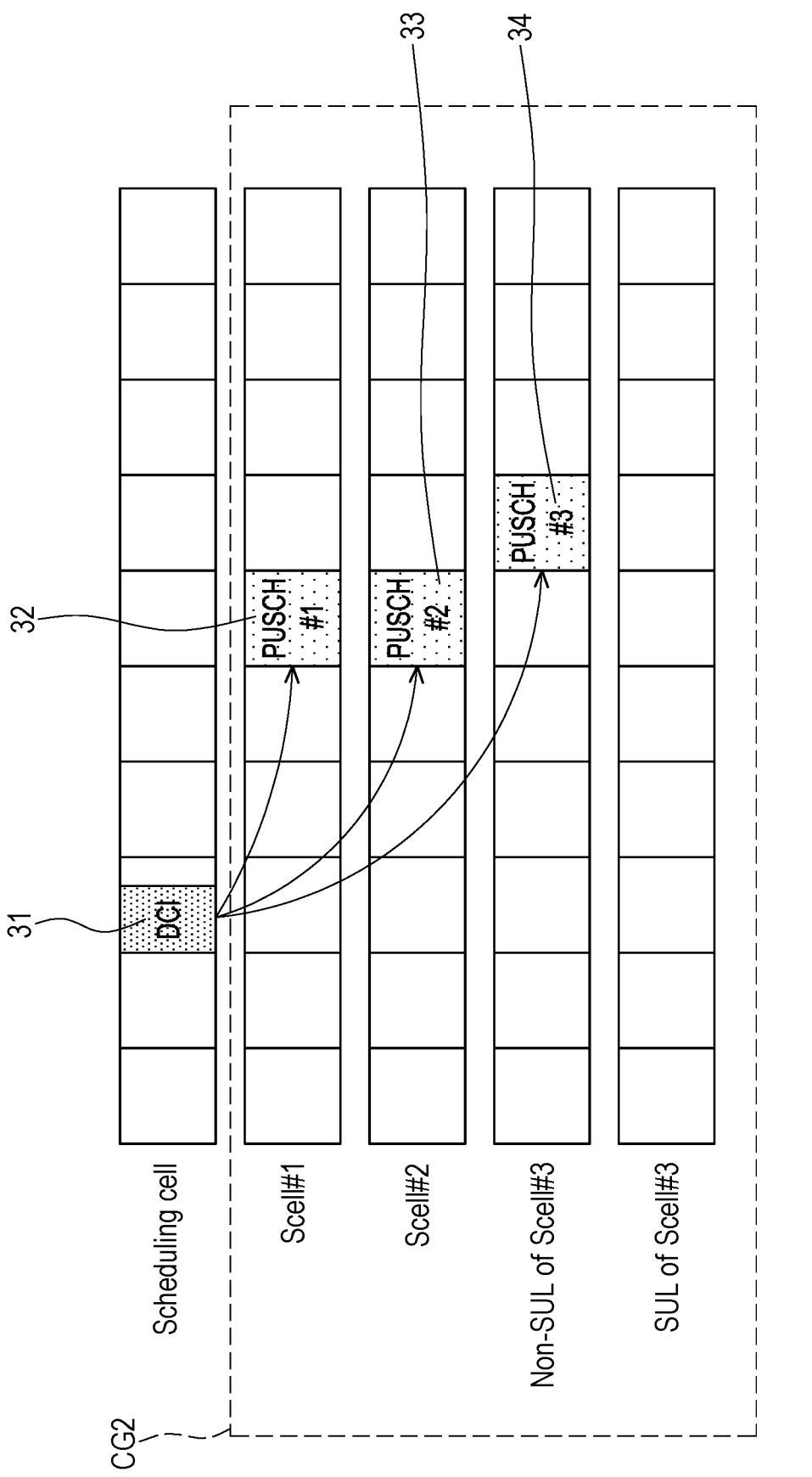
FIG. 4 is a schematic diagram that illustrates multi-cell scheduling according to an exemplary embodiment of the present disclosure.

For example, FIG. 4 is a schematic diagram that illustrates multi-cell scheduling according to an exemplary embodiment of the present disclosure. Referring to FIG. 4, the UE 100 may receive a DCI 31 from a scheduling cell. The DCI 31 may indicate that the PUSCHs 32, 33, 34 are scheduled on the scheduled cells Scell #1, Scell #2 and Scell #3 in the cell group CG2. It should be noted that, the scheduled cell Scell #3 may include a non-supplementary UL carrier and a supplementary UL carrier. However, the DCI 31 only schedules PUSCH 34 on the non-supplementary UL carrier of the scheduled cell Scell #3.

In some embodiments, the UE 100 may determine the cell ID of N scheduled cells, on which PUSCHs are scheduled, according to one or more DCI fields, wherein N is the number of the scheduled cells. In some embodiments, the DCI may include N Carrier Indicator Fields (CIF fields), and each CIF field may indicate one scheduled cell. For example, the DCI may include two CIF fields and the two CIF fields respectively indicate [001] and [010]. Such that, the UE 100 may determine the cell IDs of the two scheduled cells are [001] and [010].

In some embodiments, the DCI may include a bitmap, and each bit of the bitmap may indicate whether one serving cell configured for the UE 100 is a scheduled cell scheduled for transmitting a PUSCH. For example, the DCI may include a bitmap with 5-bit, and each bit in the bitmap may indicate whether a corresponding cell among the 5 serving cells in multiple cell groups is selected for transmitting a PUSCH or not.

In some embodiments, the DCI may include a first indication. The UE 100 may determine the first set of serving cell from a plurality sets of serving cell according to the first indication in the DCI. Each of the sets of serving cell comprises a plurality of serving cells. That is, the UE 100 may determine a first cell group from a plurality of cell groups according to the first indication in the DCI. Namely, the first indication may indicate a cell group ID of the first set of serving cell. It should be noted that, any one of the serving cells would not be grouped into the different sets of serving cell.

In some embodiments, the DCI may include a second indication. The UE 100 may determine the plurality of scheduled cells from the first set of serving cell according to the second indication in the DCI. The second indication may be a bitmap or an indicator indicating the co-scheduled cells. That is, the UE 100 may select the scheduled cells from the serving cells in the first set of serving cell according to the second indication in the DCI, and then may determine the cell IDs of the scheduled cells according to the second indication in the DCI.

Figure 5:
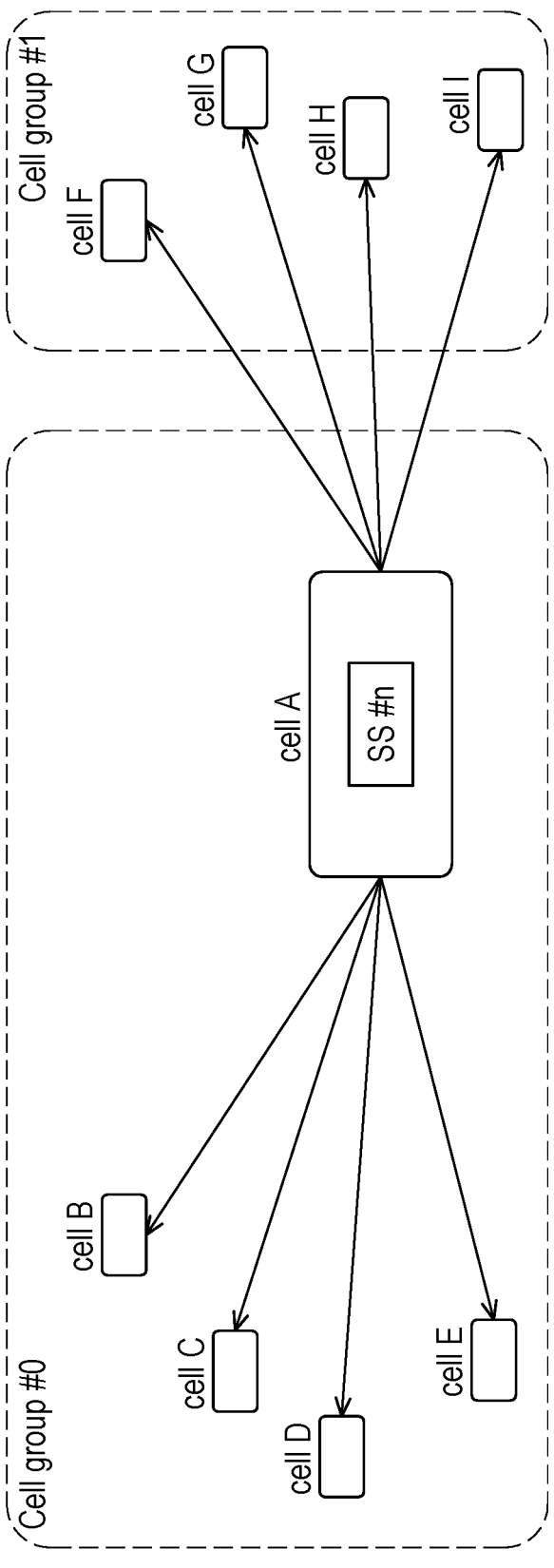
FIG. 5 is a schematic diagram that illustrates cell indication for PUSCH according to an exemplary embodiment of the present disclosure.

For example, FIG. 5 is a schematic diagram that illustrates cell indication for PUSCH according to an exemplary embodiment of the present disclosure. Referring to FIG. 5, there are two sets of serving cell which are a first cell group with cell group ID #0 and a second cell group with cell group ID #1. The first cell group includes a serving cell A, a serving cell B, a serving cell C, a serving cell D, and a serving cell E. The second cell group includes a serving cell F, a serving cell I, a serving cell G, and a serving cell H. The UE 100 may perform blind detection (also known as blind decoding) throughout the search space (SS) #n to receive the DCI from the serving cell A. Assuming there are PUSCHs scheduled on the serving cell B and the serving cell C, the first indication of the DCI may be [0] indicating the first cell group with cell group ID #0. Besides, the second indication of the DCI which is a bitmap may be [01100]. The 5 bits of the second indication respectively correspond to the serving cells A to E. '1' in the bitmap represents the corresponding serving cell is selected for scheduling a PUSCH. '0' in the bitmap represents the corresponding serving cell is not selected for scheduling a PUSCH.

Figure 6:
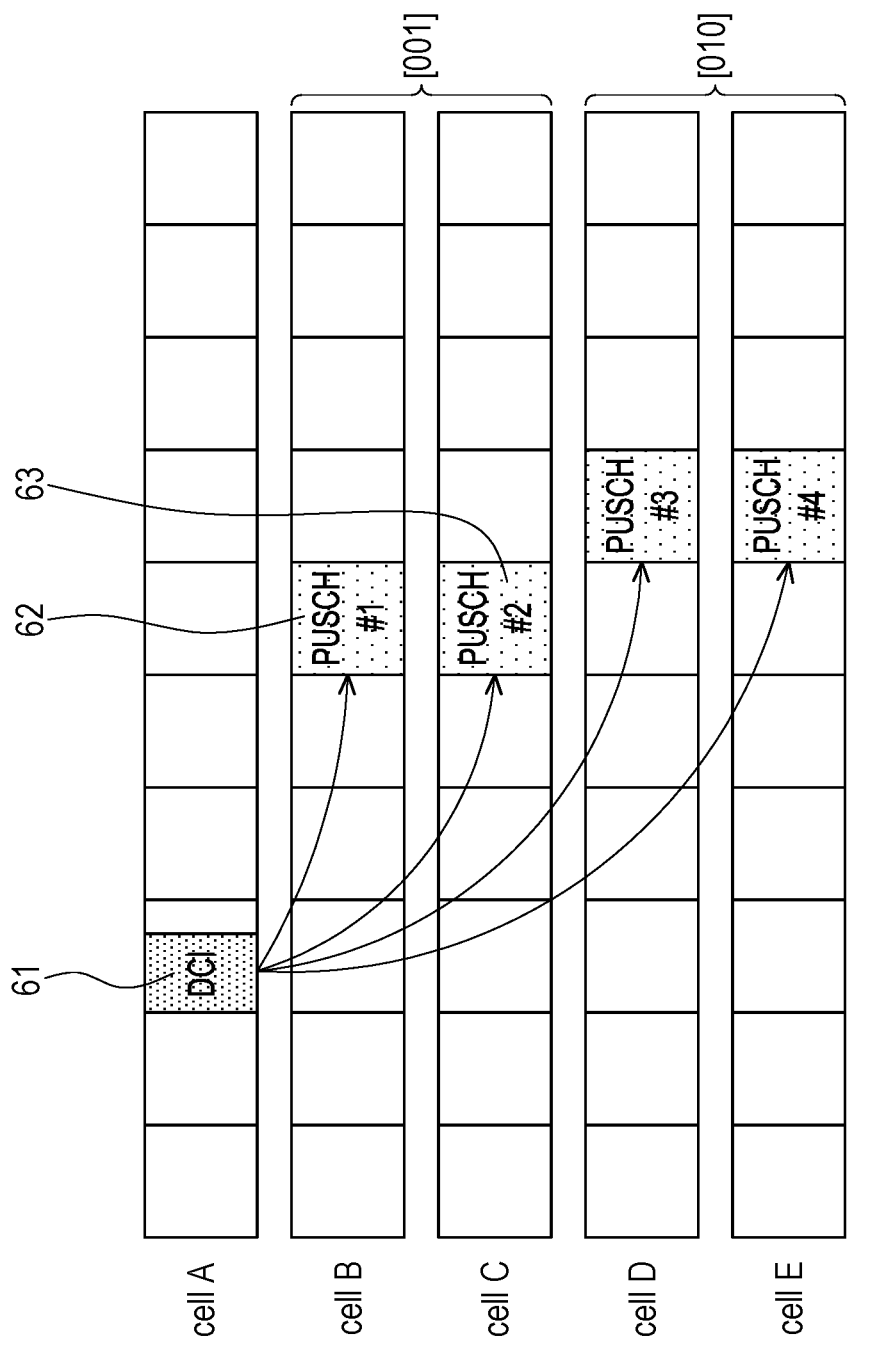
FIG. 6 is a schematic diagram that illustrates cell indication for PUSCH by using a indicator according to an exemplary embodiment of the present disclosure.

In other embodiments, the second indication may be an indicator indicating a combination of one or more co-scheduled cell(s). An indicator (e.g., a codepoint) may indicate a set of co-scheduled cell(s), and the co-scheduled cell(s) indicated by each codepoint may be configured by the BS 200. The indicator (e.g., a codepoint) may be in a carrier indicator field (CIF). For example, FIG. 6 is a schematic diagram that illustrates cell indication for PUSCH by using an indicator according to an exemplary embodiment of the present disclosure. Referring to FIG. 5 and FIG. 6, assuming there are PUSCHs 62 and 63 scheduled on the serving cell B and the serving cell C, the first indication of the DCI 61 may be [0] indicating the first cell group with cell group ID #0. Besides, the second indication of the DCI 61 which is an indicator may be [001]. Alternatively, assuming there are PUSCHs scheduled on the serving cell D and the serving cell E, the second indication of the DCI 61 which is an indicator may be [010]. The co-scheduled cell(s) indicated by the indicator may be configured as the following table 1 which may be configured by the BS 200 through a RRC layer signal and/or a MAC layer signal.

TABLE 1

| indicator | Co-scheduled cell(s) |
| --- | --- |
| 000 | Cell A (Pcell) |
| 001 | Cell B (Scell #1), Cell C (Scell #2) |
| 010 | Cell D (Scell #3), Cell E (Scell #4) |
| . . . | . . . |

In some embodiments, the UE 100 may determine a serving cell excluded from the plurality of scheduled cells in response to to Frequency domain resource assignment (FDRA) field of the serving cell in the DCI comply with a predetermined pattern. That is, the scheduled cells for transmitting PUSCHs may be identified by the UE 100 according to a FDRA field of each serving cell. For example, if the FDRA filed of the serving cell in the DCI is all '0's or all '1's, the serving cell may not be scheduled for transmitting PUSCH. Take FIG. 5 as example, assuming there are PUSCHs scheduled on the serving cell B and the serving cell C, the FDRA filed of the serving cell A, D and E in the DCI may be all '0's or all '1's. Take FIG. 5 as example, in some embodiments, even though the first indication and the second indication indicate that the serving cell E is a scheduled cell for PUSCH transmission, the UE 100 may not use the serving cell E for PUSCH transmission since the FDRA filed of the serving cell E is complied with the predetermined pattern.

In some embodiments, a sub-carrier spacing (SCS) corresponding to each of the PUSCHs is identical with a reference SCS. That is, the UE 100 may assume all the scheduled cells are configured with the same SCS when the scheduled cells are indicated by the DCI for PUSCH transmission. In some embodiments, the reference SCS is a SCS corresponding to a PDCCH transmitting the DCI. Take FIG. 3 as example, the UE 100 may assume the scheduled cells Scell #1, Scell #2 and Scell #3 are configured with the same SCS which is identical with the SCS of the scheduling cell carrying the DCI 21.

In some embodiments, the UE 100 may determine not to transmit one of the PUSCHs on one of the plurality of scheduled cells if a SCS corresponding to the one of the PUSCHs is different from a reference SCS. That is, the UE 100 may determine whether to perform the PUSCH transmission according to whether the SCS of each scheduled cell is identical with the reference SCS. In detail, the UE 100 may perform PUSCH transmission on the scheduled cell that configured with the reference SCS. Otherwise, the UE 100 may not perform PUSCH transmission on the scheduled cell that is not configured with the reference SCS.

FIG. 7 is a flowchart of a method for handling multi-cell scheduling according to an embodiment of the disclosure. Referring to FIG. 7, the method of this embodiment may be adapted for a UE 100 under the wireless communication system 10 of FIG. 1. Nevertheless, the processes of this method may be adjusted according to the actual needs and thus are not limited to the following.

In step S702, the UE 100 may receive a downlink control information (DCI) from a first serving cell. In step S704, the UE 100 may determine a plurality of scheduled cells from a first set of serving cell according to the DCI. The detail of the step S702 and the step S704 may be similar with the detail of the step S202 and the step S204 which have been described above.

In step S706, the UE 100 may determine a priority index of one of the PUSCHs transmitted on one of the scheduled cells according to a priority index field of the DCI. In some embodiments, except for indicating the scheduled cells for PUSCH transmission, the DCI may also configure the priority index of one or more PUSCHs on the scheduled cells. Besides, in some embodiments, a priority index of each PUSCH may be determined further according to a RRC configuration, a cell ID, a BWP ID, a HARQ ID or the combination thereof. In step S708, the UE 100 may transmit at least one of the PUSCHs respectively on at least one of the plurality of scheduled cells according to the DCI. The UE 100 may use the priority indexes of the PUSCHs to optimize uplink transmissions and ensure that the uplink data is transmitted efficiently and with the required QoS. The network is allowed prioritize different types of traffic based on their importance or urgency by configuring the priority indexes of the PUSCHs.

In some embodiments, the co-scheduled cells are indicated by the DCI, wherein the DCI may schedule one or more PUSCH(s) on one or more scheduled cell(s) with different priority indexes. For example, if the a co-scheduled PUSCH is configured with high priority, the co-scheduled PUSCH may be indicated with a high priority (HP) index, a larger priority index or a priority index=1. Correspondingly, if the a co-scheduled PUSCH is configured with low priority, the co-scheduled PUSCH may be indicated with a Low priority (LP) index, a smaller priority index or a priority index=0. Take FIG. 3 as example, the UE 100 may determine the priority indexes of the PUSCHs 22, 23, 24 according to a priority index field of the DCI 21.

In some embodiments, the priority index field of the DCI comprises a bitmap, a TDRA field, or an indicator comprising at least one bit.

In some embodiments, the priority index field of the DCI may be a TDRA field corresponding to each scheduled cell for PUSCH transmission. In detail, in response to receiving the DCI including a TDRA field, the UE 100 may refer to a TDRA table to determine the specific time-domain resource allocation pattern for a scheduled cell. The TDRA table is used to determine the appropriate uplink resource allocation for data transmission on the scheduled cell. The UE 100 may determine a priority index of a PUSCH transmitted on a scheduled cells according to a TDRA field in the DCI and a TDRA table.

In some embodiments, the TDRA table may record a priority index for each time-domain resource allocation pattern, wherein each time-domain resource allocation pattern may be referred as a codepoint in the TDRA table. Therefore, in response to receiving the DCI including a TDRA field, the UE 100 may also determine the priority index of one of the PUSCHs transmitted on one of the scheduled cells by referring the TDRA table. For example, if the UE 100 receives a TDRA field which value is 'V1', the UE 100 may refer the TDRA table by using the value 'V1' to determine a priority index of a PUSCH transmitted on the scheduled cell.

For example, FIG. 8 is a schematic diagram that illustrates determining a priority index of a PUSCH according to a TDRA field of the DCI according to an exemplary embodiment of the present disclosure. Referring to FIG. 8, TDRA tables T1 to T3 respectively corresponding to a serving cell A, a serving cell B and a serving cell C respectively include one bit in each codepoint for indicating the priority index. Assuming the UE 100 receives a DCI that schedules 3 PUSCHs on the serving cell A, the serving cell B and the serving cell C, respectively. The UE 100 may determine the priority indexes of the 3 PUSCHs according to the TDRA tables T1 to T3 and the TDRA fields in the DCI. It should be noted that, the TDRA table T1 is referred by the UE 100 based on the current active BWP of the serving cell A. The TDRA table T2 is referred by the UE 100 based on the current active BWP of the serving cell B. The TDRA table T3 is referred by the UE 100 based on the current active BWP of the serving cell C. In some embodiments, if a single serving cell is configured with multiple BWPs, each BWP of the single serving cell would have a corresponding TDRA table (e.g., configured by gNB).

In some embodiments, each codepoint of the TDRA table may comprise a resource allocation (RA) type (e.g., type A or B), the priority index of the scheduled PUSCH may be determined according to the resource allocation type in the TDRA. That is, after receiving the DCI including a TDRA field corresponding to the scheduled cell, the UE 100 may determine the time-domain resource allocation pattern including the resource allocation type by referring the TDRA table using the TDRA field in the DCI. Afterwards, the UE 100 may determine the priority index of the scheduled PUSCH according to the resource allocation type. For example, a PUSCH scheduled with resource allocation type A may be corresponding to a first priority index (e.g., priority index=0), and a PUSCH scheduled with resource allocation type B may be corresponding to a second priority index (e.g., priority index=1).

For example, FIG. 9 is a schematic diagram that illustrates determining a priority index of a PUSCH according to a TDRA field of the DCI according to an exemplary embodiment of the present disclosure. Referring to FIG. 9, TDRA tables T4 to T6 corresponding to a serving cell A, a serving cell B and a serving cell C respectively include a resource allocation type in each codepoint. Assuming the UE 100 receives a DCI that schedules 3 PUSCHs on a serving cell A, a serving cell B and a serving cell C, respectively. The UE 100 may determine the resource allocation types of the 3 scheduled PUSCHs according to the TDRA tables T4 to T6 and the TDRA fields in the DCI. For example, in response to receiving a TDRA field corresponding to the serving cell A in the DCI, the UE 100 may refer the TDRA table T4 by using the TDRA field to determine resource allocation type of the scheduled PUSCH on serving cell A. Therefore, the UE 100 may determine the priority indexes of the 3 scheduled PUSCHs according to the resource allocation types of the 3 scheduled PUSCHs. It should be noted that, the TDRA table T4 is referred by the UE 100 based on the current active BWP of the serving cell A. The TDRA table T5 is referred by the UE 100 based on the current active BWP of the serving cell B. The TDRA table T6 is referred by the UE 100 based on the current active BWP of the serving cell C. In some embodiments, if a single serving cell is configured with multiple BWPs, each BWP of the single serving cell would have a corresponding TDRA table (e.g., configured by gNB).

In some embodiments, the priority index field of the DCI may be an indicator including at least one bit. Further, in some embodiments, the priority index of the one of the PUSCHs is determined according to a higher layer configuration. In detail, the higher layer configuration may indicate one or more specific serving cells that support dynamically indication of priority index. A PUSCH scheduled on the specific serving cell may be indicated with a priority index via the at least one bit in the priority index field of the DCI.

In some embodiments, the UE 100 may determine a priority index of one of the PUSCHs transmitted on one of the scheduled cells according to a priority index field of the DCI if the one of the scheduled cells is configured with a higher layer configuration. The higher layer configuration is configured to indicate whether the one of the scheduled cells supporting PUSCH with different priority index.

In some embodiments, the UE 100 may determine a priority index of one of the PUSCHs transmitted on one of the scheduled cells as a fixed priority index if the one of the scheduled cells is not configured with a higher layer configuration. The higher layer configuration is configured to indicate whether the one of the scheduled cells supporting PUSCH with different priority index.

Figure 10:
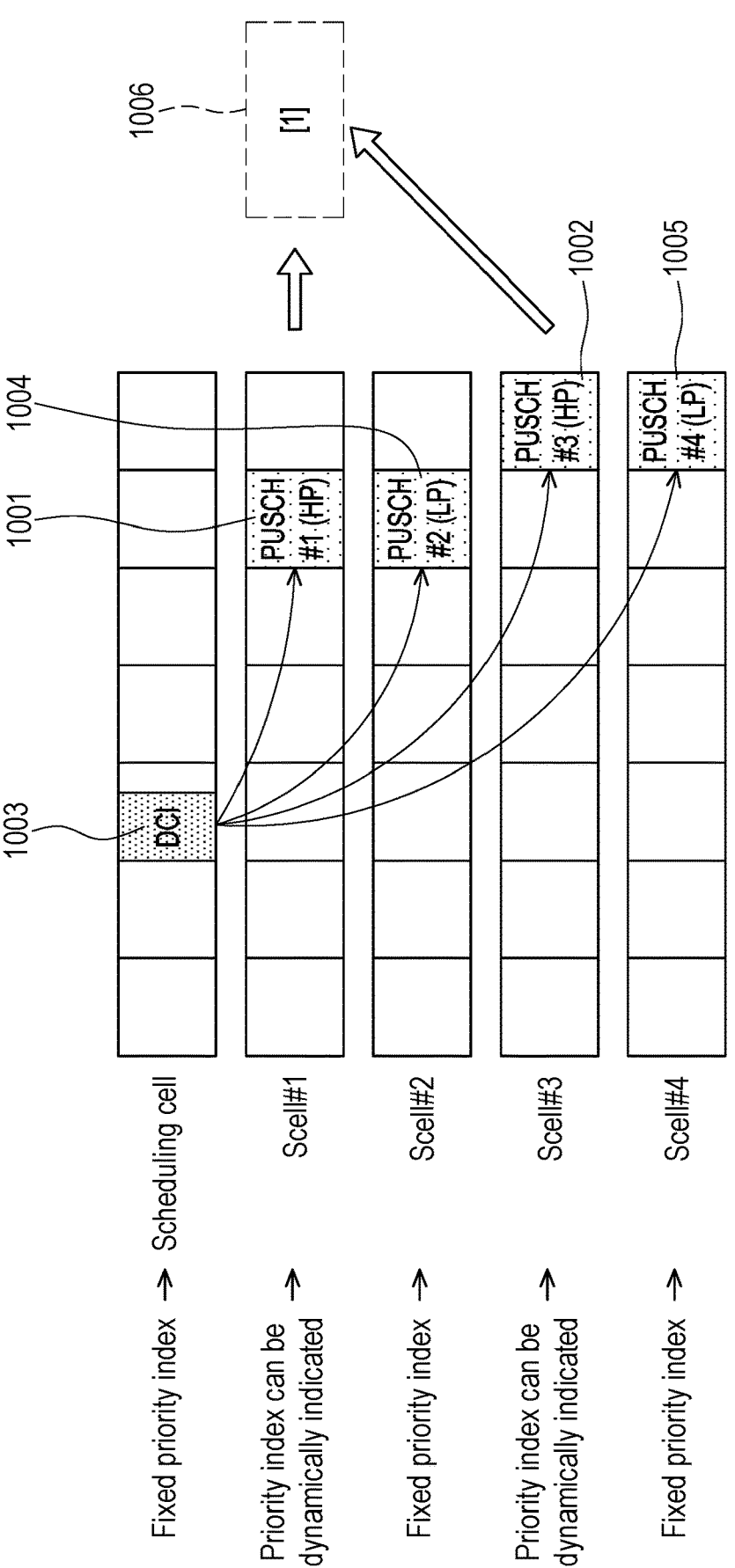
FIG. 10 is a schematic diagram that illustrates determining a priority index of a PUSCH according to a higher layer configuration and the priority index field of the DCI according to an exemplary embodiment of the present disclosure.

For example, FIG. 10 is a schematic diagram that illustrates determining a priority index of a PUSCH according to a higher layer configuration and the priority index field of the DCI according to an exemplary embodiment of the present disclosure. Referring FIG. 10, the UE 100 may determine a set of serving cell including the serving cells Scell #1 and Scell #3 according to higher layer signals (e.g., allowPHY-PriorityIndex), wherein each higher layer signal (e.g., allowPHY-PriorityIndex) may indicate whether a scheduled cell supporting PUSCH with different priority index. The serving cells Scell #1 and Scell #3 are configured to supporting PUSCH with different priority index. Since PUSCH 1001 and PUSCH 1002 are scheduled on the serving cells Scell #1 and Scell #3, the UE may determine the priority indexes of the PUSCH 1001 and the PUSCH 1002 according to the scheduling DCI 1003. For example, the priority index field of the DCI 1003 may include an indicator 1006 including one bit, and the bit in the indicator 1006 represent the priority indexes of the the PUSCH 1001 and the PUSCH 1002. On the other hand, the UE may determine the priority indexes of the PUSCH 1004 and the PUSCH 1005 as a fixed priority index (e.g., 0).

In some embodiments, the priority index field of the DCI may be an indicator including at least one bit. Further, in some embodiments, the priority index of the one of the PUSCHs is determined according to a cell ID of the one of the scheduled cells. In detail, at least one serving cell may support dynamically indication of priority index, and the serving cell supporting dynamically indication of priority index is configured by the cell ID. A PUSCH scheduled in a specific serving cell with a predetermined cell ID (e.g., lowest or highest cell ID among scheduled cells) may be indicated with a priority index via the indicator including at least one bit.

Figure 11:
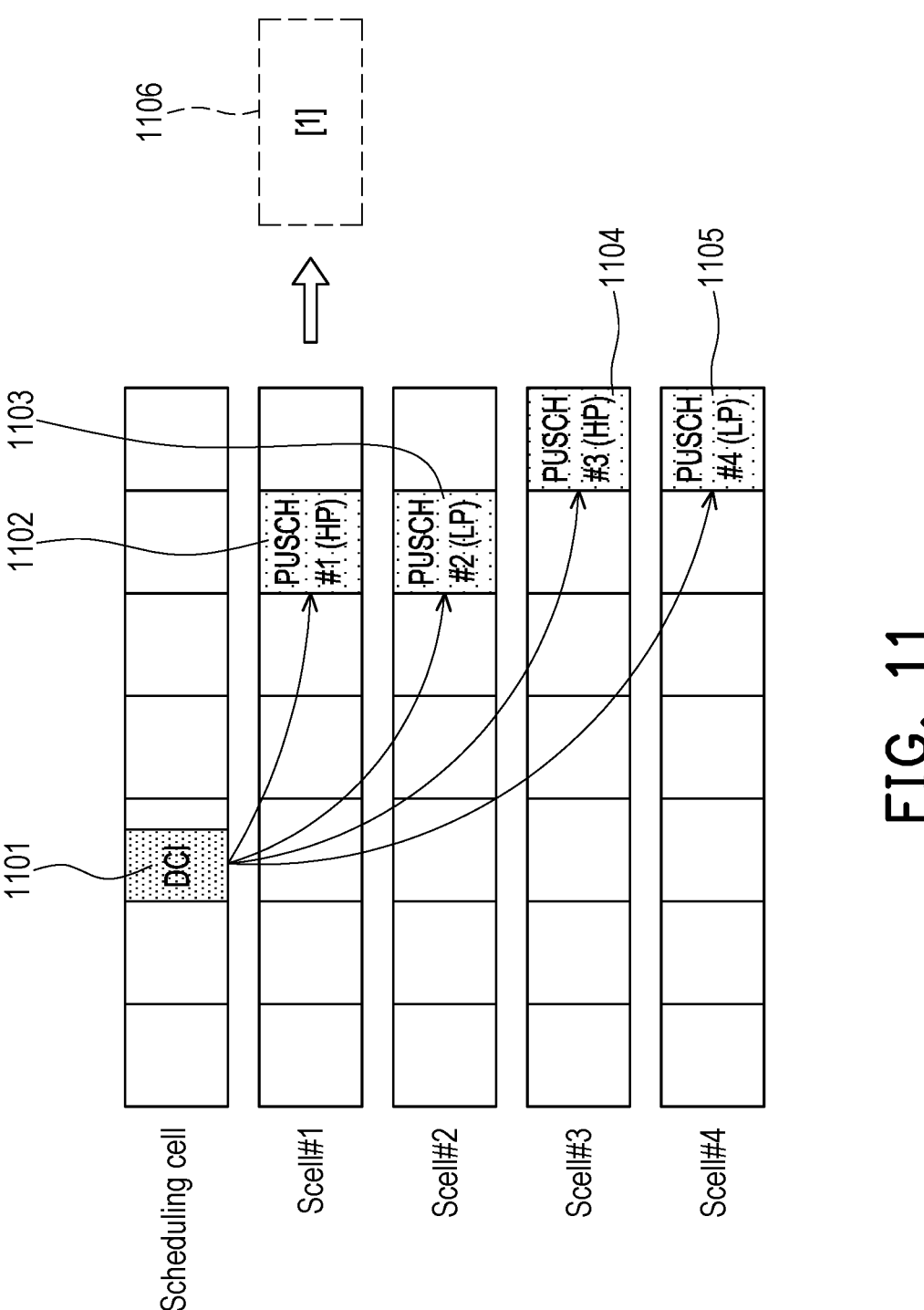
FIG. 11 is a schematic diagram that illustrates determining a priority index of a PUSCH according to the cell ID and the priority index field of the DCI according to an exemplary embodiment of the present disclosure.

For example, FIG. 11 is a schematic diagram that illustrates determining a priority index of a PUSCH according to the cell ID and the priority index field of the DCI according to an exemplary embodiment of the present disclosure. Referring FIG. 11, the DCI 1101 schedules 4 PUSCHs 1102, 1103, 1104, 1105 on the serving cells Scell #1 to Scell #4, respectively. The UE 100 may determine a priority index of the PUSCH 1102 on the serving cell Scell #1 according to an indicator 1106 (e.g., 1) in the DCI 1101, since the serving cell Scell #1 has lowest cell ID among the co-scheduled serving cells Scell #1 to Scell #4. That is, the priority index of the PUSCH 1102 on the serving cell Scell #1 with the lowest cell ID may be dynamically configured by using the indicator 1106. On the other hand, the UE may determine the priority indexes of the PUSCH 1103, 1104, 1105 as a fixed priority index (e.g., 0).

In some embodiments, the priority index field of the DCI may be an indicator including at least one bit. Each codepoint of the indicator may indicate a set of serving cell, and the set of serving including one or more serving cells can be scheduled with a first priority index, while a second priority index (e.g., 0) may be apply to the other serving cells not in the set of serving.

Figure 12:
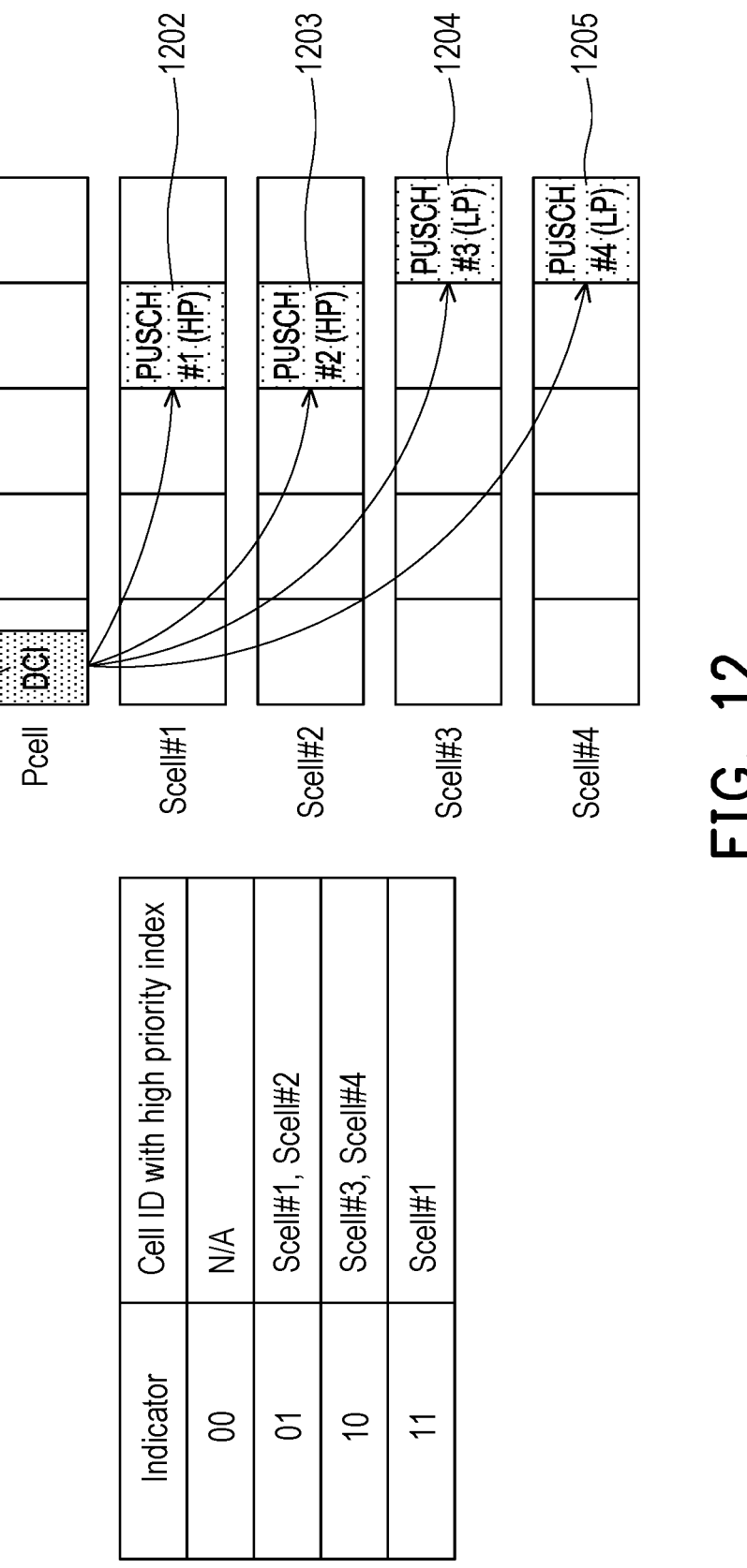
FIG. 12 is a schematic diagram that illustrates determining a priority index of a PUSCH according to the priority index field of the DCI according to an exemplary embodiment of the present disclosure.

For example, FIG. 12 is a schematic diagram that illustrates determining a priority index of a PUSCH according to the priority index field of the DCI according to an exemplary embodiment of the present disclosure. Referring FIG. 12, the DCI 1201 may indicate 4 PUSCHs 1202, 1203, 1204, 1205 scheduled on the scheduled cells Scell #1 to Scell #4, respectively. Besides, the indicator in the DCI 1201 may indicate at least one scheduled cell on which the PUSCH with a specific priority (e.g., high priority) is scheduled. For example, the UE 100 may determine PUSCHs 1202 and 1203 on scheduled cells Scell #1 and Scell #2 are scheduled with high priority index according to the indicator={01}. Alternatively, in other embodiment, the UE 100 may determine PUSCHs 1204 and 1205 on scheduled cells Scell #3 and Scell #4 are scheduled with low priority index according to the indicator={01}.

In some embodiments, the plurality of priority indexes of all of the PUSCHs transmitted on the scheduled cells are identical. In some embodiments, since the priority indexes of all of the PUSCHs are the same, the DCI indicating the scheduled cells for PUSCH transmission may not be configured with a priority index field, and the priority indexes of all of the PUSCHs on the scheduled cells may be configured to be a default value (e.g., priority index=0). Alternatively, in some embodiments, the plurality of priority indexes of all of the PUSCHs can be indicated by a priority index field of the DCI. Since the priority indexes of all of the PUSCHs are the same, the priority index field of the DCI may indicate the priority indexes via one-bit indicator.

In some embodiments, the priority index(es) of scheduled PUSCH(s) may be determined according to a cell ID, a BWP ID, and/or a HARQ process ID. In some embodiments, a PUSCH scheduled in the scheduled cell with a specific cell ID may correspond to a first priority index (e.g., priority index=1), otherwise, the PUSCH scheduled in the scheduled cell without the specific cell ID may correspond to a second priority index (e.g., priority index=0). The specific cell ID may be a lowest/highest/configured cell ID. In some embodiments, a PUSCH scheduled in the scheduled cell with a specific BWP ID may correspond to a first priority index (e.g., priority index=1), otherwise, the PUSCH scheduled in the scheduled cell without the specific BWP ID may correspond to a second priority index (e.g., priority index=0). The specific BWP ID may be a lowest/highest/configured BWP ID. In some embodiments, a PUSCH with a specific HARQ process ID may correspond to a first priority index (e.g., priority index=1), otherwise, the PUSCH may correspond to a second priority index (e.g., priority index=0). The specific HARQ process ID may be a lowest/highest/configured HARQ process ID.

Figure 13:
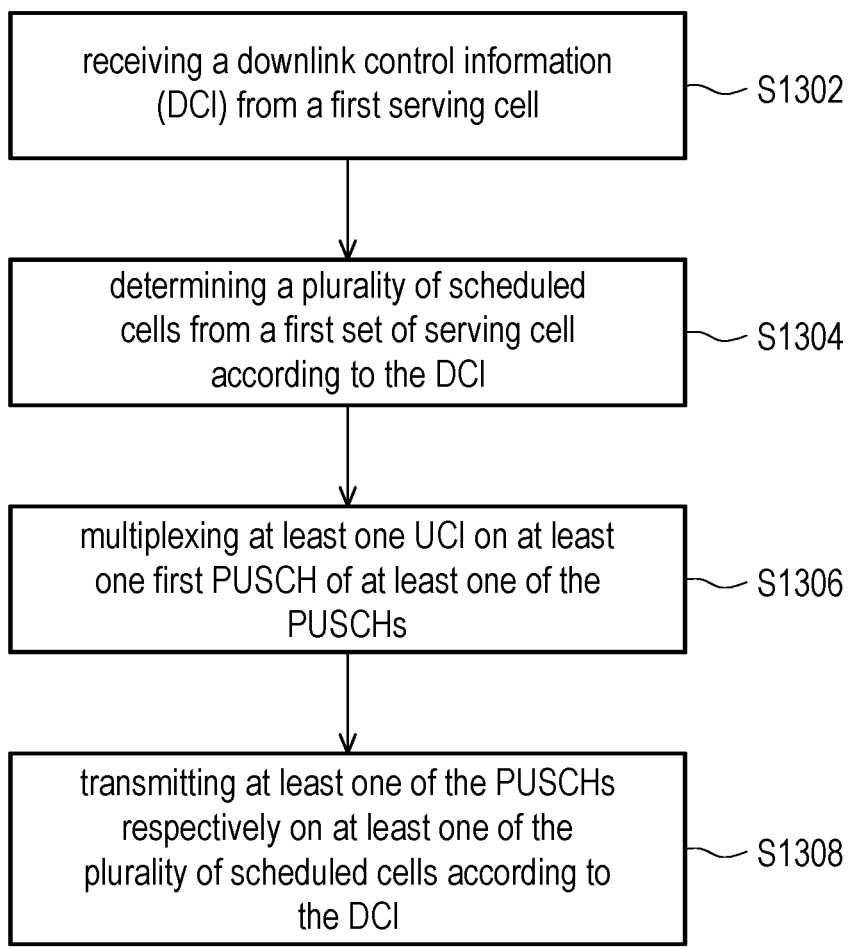
FIG. 13 is a flowchart of a method for handling multi-cell scheduling according to an embodiment of the disclosure.

FIG. 13 is a flowchart of a method for handling multi-cell scheduling according to an embodiment of the disclosure. Referring to FIG. 13, the method of this embodiment may be adapted for a UE 100 under the wireless communication system 10 of FIG. 1. Nevertheless, the processes of this method may be adjusted according to the actual needs and thus are not limited to the following.

In step S1302, the UE 100 may receive a downlink control information (DCI) from a first serving cell. In step S1304, the UE 100 may determine a plurality of scheduled cells from a first set of serving cell according to the DCI. The detail of the step S1302 and the step S1304 may be similar with the detail of the step S202 and the step S204 which have been described above.

In step S1306, the UE 100 may multiplex at least one UCI on at least one first PUSCH of at least one of the PUSCHs. In step S1308, the UE 100 may transmit at least one of the PUSCHs respectively on at least one of the plurality of scheduled cells according to the DCI.

In some embodiments, the at least one UCI comprises at least one of a HARQ-ACK, a periodic CSI and an aperiodic CSI. That is, the UE 100 may multiplex at least one of a HARQ-ACK, a periodic CSI and an aperiodic CSI on at least one first PUSCH which is scheduled by the DCI. In some embodiments, the UE 100 may or may not multiplex a Semi-persistent (SP) CSI on at least one first PUSCH. In detail, the UE 100 may receive a DCI scheduling the PUSCHs on the scheduled cells, and the UE 100 may select at least one first PUSCH from the scheduled PUSCHs to carry the UCI. Further, the UE 100 may multiplex the UCI on the selected first PUSCH according to the DCI.

[HARQ-ACK Multiplexed on PUSCH]

In some embodiments, the at least one first PUSCH is overlapped with at least one PUCCH for transmitting the at least one UCI in time domain, and the at least one UCI is the HARQ-ACK. The at least one first PUSCH may transmitted in a plurality of different slots. It should be noted that, the at least one first PUSCH is transmitted in a first scheduled cell with a lowest cell ID among the scheduled cells. In detail, the UE 100 may determine whether a PUCCH related with the HARQ-ACK is overlap with the PUSCHs scheduled by the DCI in the time domain. If yes, the UE 100 may select a first PUSCH from the PUSCHs overlapped with at least one PUCCH related with the HARQ-ACK in time domain according to the cell IDs of the scheduled cells.

Figure 14:
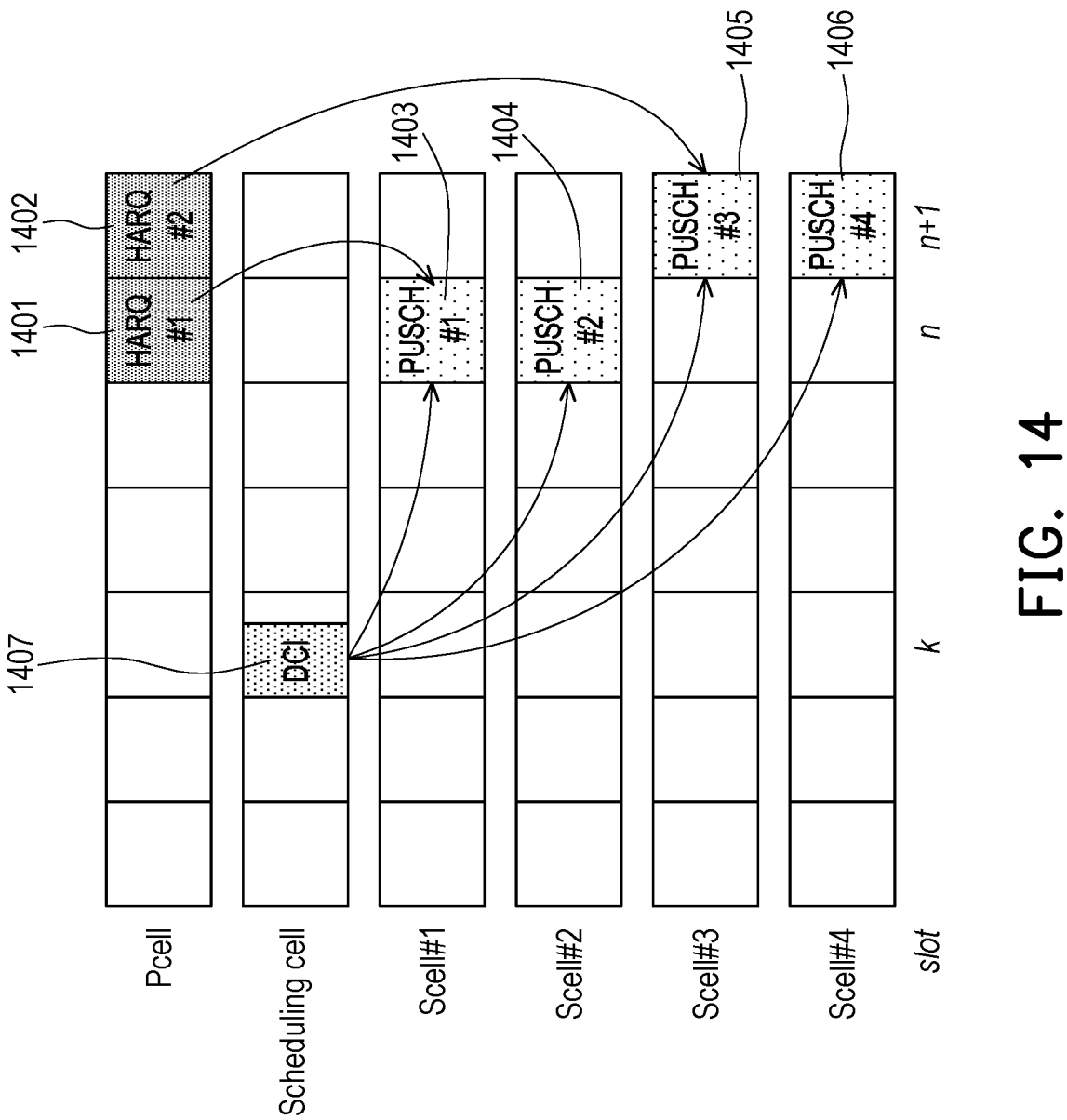
FIG. 14 is a schematic diagram that illustrates determining a first PUSCH for multiplexing a HARQ-ACK according to an exemplary embodiment of the present disclosure.

FIG. 14 is a schematic diagram that illustrates determining a first PUSCH for multiplexing a HARQ-ACK according to an exemplary embodiment of the present disclosure. Referring FIG. 14, PUCCH 1401 for transmitting a HARQ-ACK HARQ #1 is overlapped with PUSCHs 1403 and 1404. PUCCH 1402 for transmitting a HARQ-ACK HARQ #2 is overlapped with PUSCHs 1405 and 1406. The PUSCHs 1403 to 1406 are scheduled by the DCI 1407 to be receptively on the scheduled cells Scell #1, Scell #2, Scell #3 and Scell #4. Since PUSCHs 1403 to 1406 are overlapped with PUCCH 1401 and 1402 in time domain, the UE 100 may select the specific PUSCHs scheduled in the first scheduled cells with a predetermined (e.g., lowest) cell ID for multiplexing the HARQ-ACK HARQ #1 and HARQ #2. For example, in slot n, since PUSCH 1403 is scheduled on the scheduled cell Scell #1 with the lowest cell ID (i.e., the cell ID of the scheduled cell Scell #2 is greater than the cell ID of the scheduled cell Scell #1), the PUSCH 1403 is selected for multiplexing HARQ-ACK HARQ #1 by the UE 100. In slot n+1, since PUSCH 1405 is scheduled on the scheduled cell Scell #3 with the lowest cell ID (i.e., the cell ID of the scheduled cell Scell #4 is greater than the cell ID of the scheduled cell Scell #3), the PUSCH 1405 is selected for multiplexing HARQ-ACK HARQ #2 by the UE 100.

In some implementations, the UE 100 may be configured to provide HARQ feedback for multiple PDSCH transmissions. In this case, the UE 100 may generate a HARQ codebook (CB) including the HARQ feedback bits corresponding to the multiple PDSCH transmissions.

In some embodiments, a Downlink Assignment Index (DAI) in the DCI is applied to at least one first PUSCH among the PUSCHs, and at least one HARQ-ACK is respectively multiplexed in the at least one first PUSCH. The at least one first PUSCH may be transmitted in a plurality of different slots. The DAI may be used for handling the HARQ-ACK codebooks, and the number of bits of the HARQ-ACK codebooks may be determined according to the DAI. That is, when multiplexing the HARQ-ACK on multiple first PUSCHs scheduled by the DCI at multiple UL slot(s), the UE 100 may generate multiple HARQ-ACK codebooks for the multiple PUSCHs at the multiple UL slots according to a DAI field in the DCI.

Figure 15:
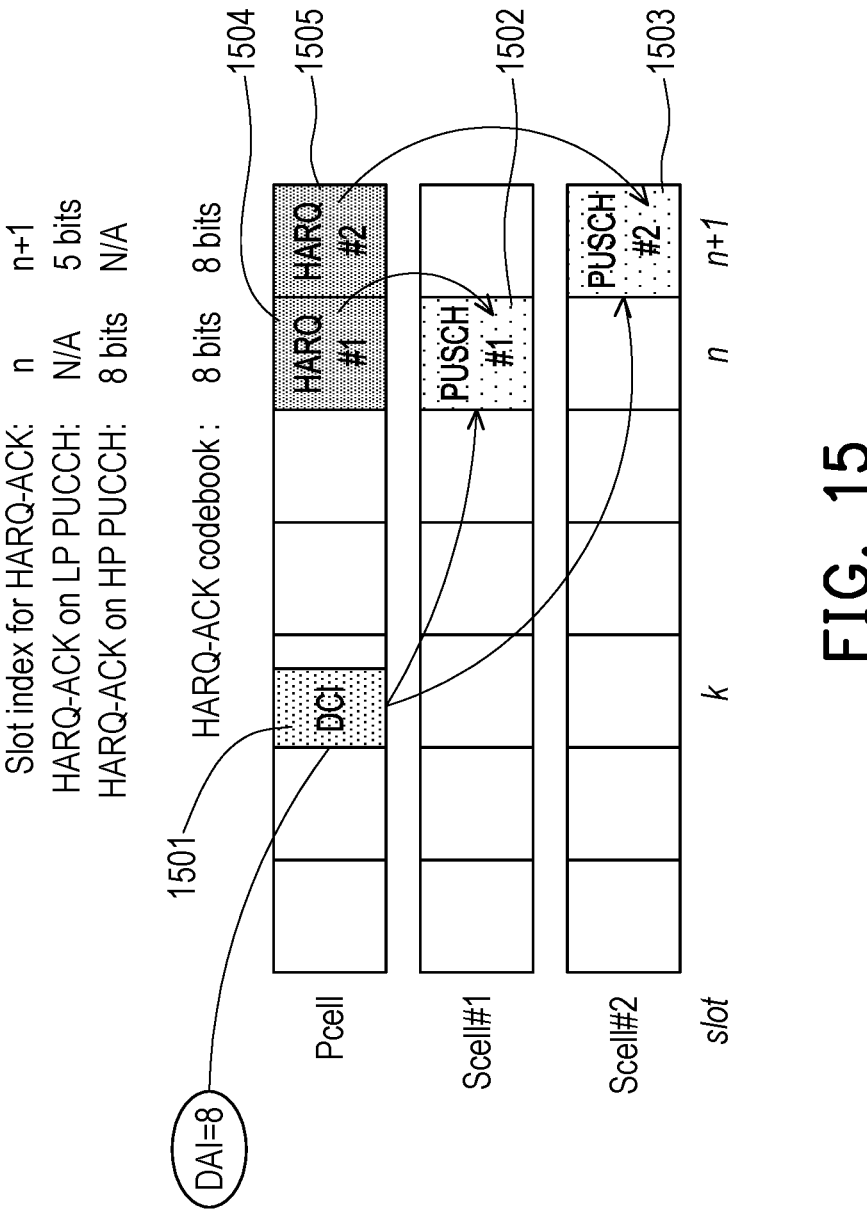
FIG. 15 is a schematic diagram that illustrates applying a DAI according to an exemplary embodiment of the present disclosure.

In some embodiments, the UE 100 may generate a plurality of HARQ-ACK codebooks to be multiplexed on the first PUSCHs according to a single DAI in the DCI, wherein the DCI schedules the first PUSCHs. FIG. 15 is a schematic diagram that illustrates applying a DAI according to an exemplary embodiment of the present disclosure. Referring FIG. 15, DCI 1501 may schedule PUSCH 1502 and PUSCH 1503 respectively on the scheduled cells Scell #1 and Scell #2. PUCCH 1504 corresponding to 8 HARQ feedback bits and PUCCH 1505 corresponding to 5 HARQ feedback bits are respectively conflict with PUSCH 1502 and PUSCH 1503 at slot #n and slot #(n+1). PUSCH 1502 and PUSCH 1503 are respectively selected by the UE 100 to respectively carry HARQ-ACKs HARQ #1 and HARQ #2. The DCI 1501 may include a single DAI. The UE 100 may generate a HARQ-ACK codebook which is multiplexed on the PUSCH 1502 according the single DAI in the DCI 1501. Further, the UE 100 may generate another HARQ-ACK codebook which is multiplexed on the PUSCH 1503 according the single DAI in the DCI 1501. For example, assuming the DAI in the DCI 1501 is 8. The UE 100 may generate a 8-bits HARQ-ACK codebook to be multiplexed on the PUSCH 1502, and generate another 8-bits HARQ-ACK codebook to be multiplexed on the PUSCH 1503.

Figure 16:
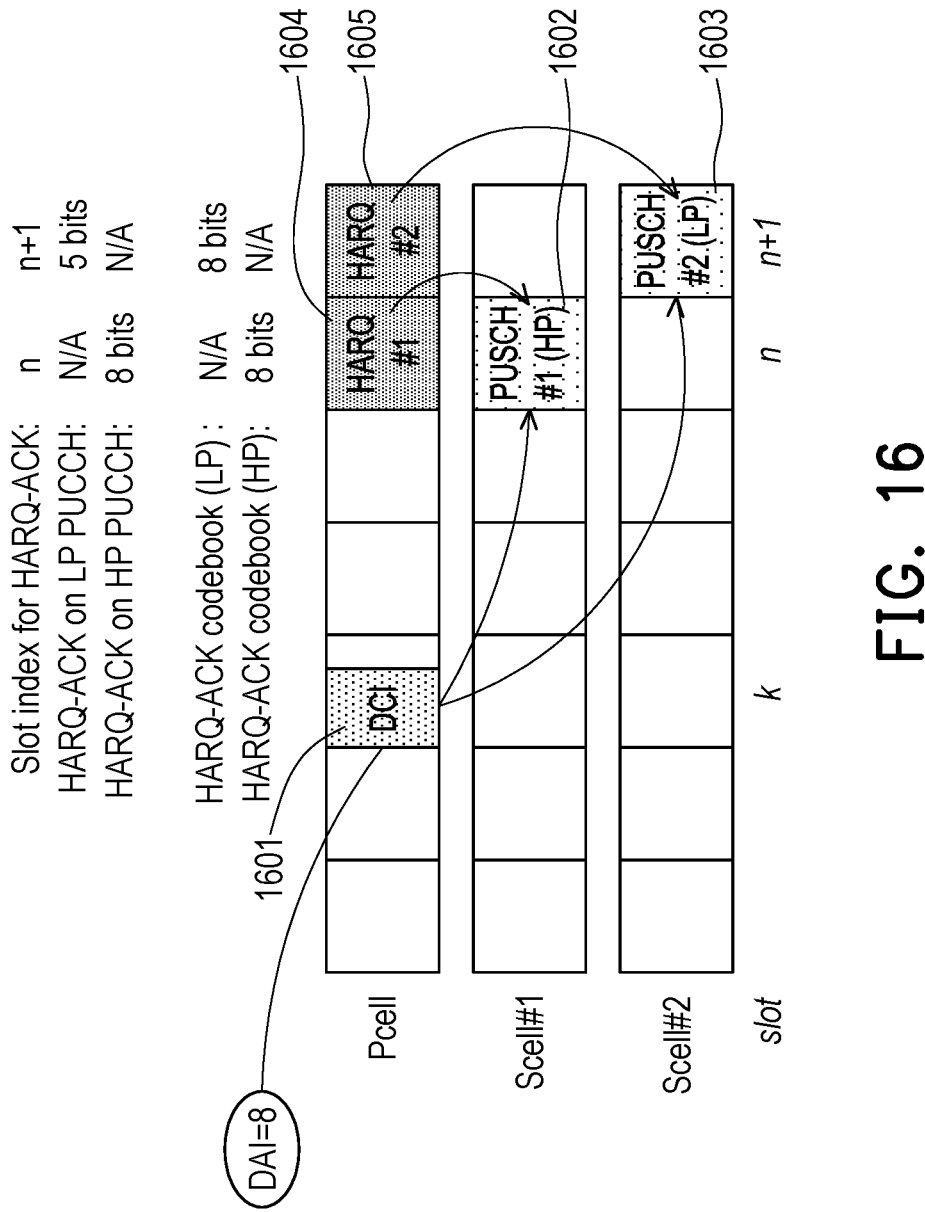
FIG. 16 is a schematic diagram that illustrates applying a DAI according to an exemplary embodiment of the present disclosure.

In some embodiments, a priority index of each HARQ-ACK codebook generated based on the single DAI may be correspond to a priority index of the corresponding first PUSCH. FIG. 16 is a schematic diagram that illustrates applying a DAI according to an exemplary embodiment of the present disclosure. Referring FIG. 16, DCI 1601 may schedule PUSCH 1602 and PUSCH 1603 respectively on the scheduled cells Scell #1 and Scell #2. PUCCH 1604 corresponding to 8 HARQ feedback bits and PUCCH 1605 corresponding to 5 HARQ feedback bits are respectively conflict with PUSCH 1602 and PUSCH 1603 at slot #n and slot #(n+1). PUSCH 1602 and PUSCH 1603 are respectively selected by the UE 100 to respectively carry HARQ-ACKs HARQ #1 and HARQ #2. The DCI 1601 may include a single DAI. The UE 100 may generate HARQ-ACK codebooks which are multiplexed on the PUSCHs 1602 and 1603 according the single DAI in the DCI 1601. In FIG. 16, "HP" stands for high priority, and "LP" stands for low priority. It should be noted that, a priority index of each HARQ-ACK codebook may correspond to the priority index of the corresponded PUSCH.

For example, assuming the DAI in the DCI 1601 is 8. The UE 100 may generate a 8-bits HARQ-ACK codebook corresponding to high priority (e.g., priority index=1) to be multiplexed on the PUSCH 1602 corresponding to high priority (e.g., priority index=1), and generate another 8-bits HARQ-ACK codebook corresponding to low priority (e.g., priority index=0) to be multiplexed on the PUSCH 1603 corresponding to low priority (e.g., priority index=0). That is, the priority index of HARQ-ACK codebook in PUSCH 1602 is same as the priority index of PUSCH 1602, and the priority index of HARQ-ACK codebook in PUSCH 1603 is same as the priority index of PUSCH 1603.

Figure 17:
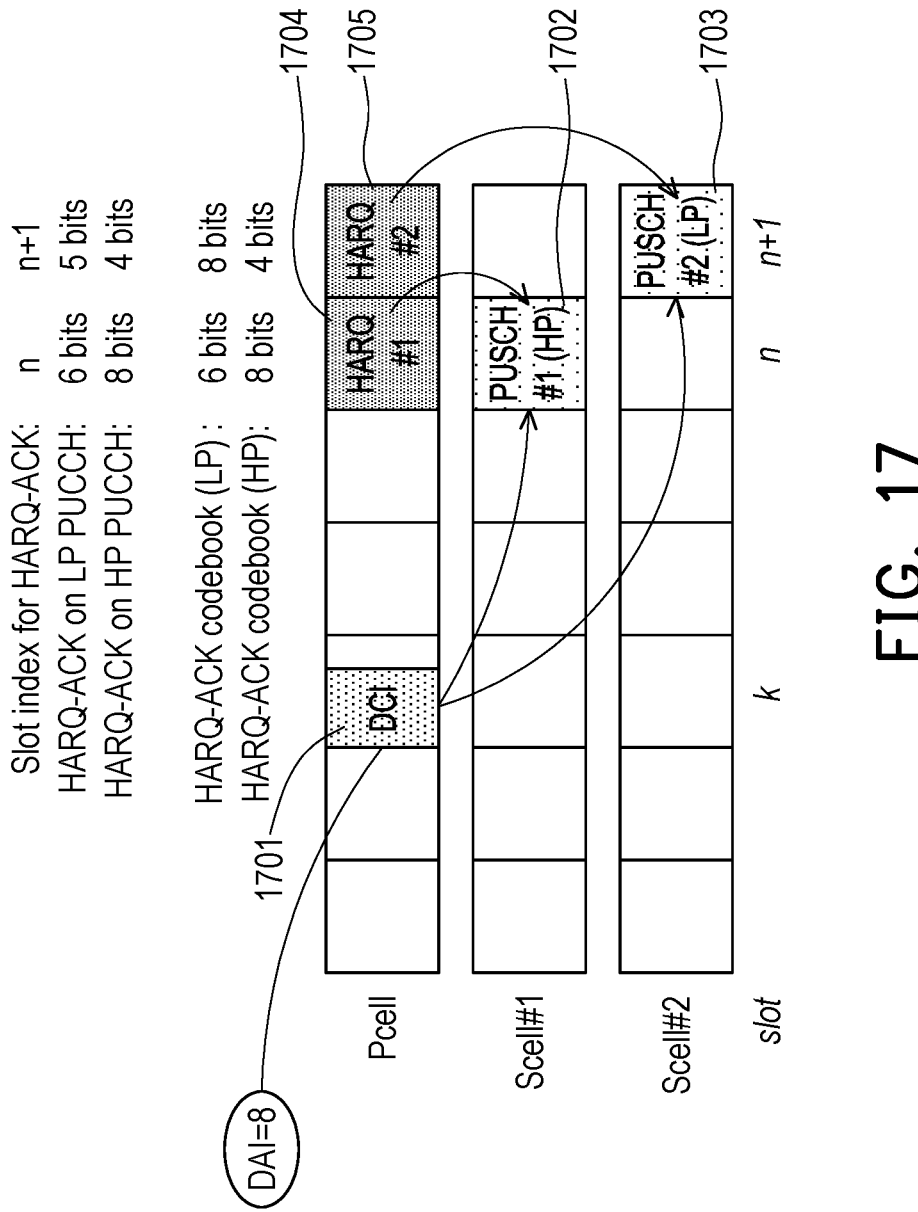
FIG. 17 is a schematic diagram that illustrates applying a DAI according to an exemplary embodiment of the present disclosure.

In some embodiments, when the PUCCH which is conflict with the first PUSCH is corresponding to HARQ-ACK feedback bits with different priorities, the UE 100 may generate a first HARQ-ACK codebook with a priority index according to the DAI and generate a second HARQ-ACK codebook with another priority index according to the HARQ-ACK information. FIG. 17 is a schematic diagram that illustrates applying a DAI according to an exemplary embodiment of the present disclosure. Referring FIG. 17, DCI 1701 may schedule PUSCH 1702 and PUSCH 1703 respectively on the scheduled cells Scell #1 and Scell #2. PUCCH 1704 corresponding to 8 HARQ feedback bits with high priority and 6 HARQ feedback bits with low priority is conflict with PUSCH 1702 at slot #n. PUCCH 1705 corresponding to 4 HARQ feedback bits with high priority and 5 HARQ feedback bits with low priority is conflict with PUSCH 1703 at slot #(n+1). PUSCH 1702 and PUSCH 1703 are respectively selected by the UE 100 to respectively carry HARQ-ACKs HARQ #1 and HARQ #2. The DCI 1701 may include a single DAI. The UE 100 may generate HARQ-ACK codebooks with different priorities to be multiplexed on the PUSCHs 1702 and generate HARQ-ACK codebooks with different priorities to be multiplexed on the PUSCHs 1703. In FIG. 17, "HP" stands for high priority, and "LP" stands for low priority.

For example, assuming the DAI in the DCI 1701 is 8. The UE 100 may generate a 8-bits HARQ-ACK codebook corresponding to high priority (e.g., priority index=1) to be multiplexed on the PUSCH 1702 corresponding to high priority (e.g., priority index=1) according to the DAI in the DCI 1701. The UE 100 may generate a 6-bits HARQ-ACK codebook corresponding to low priority (e.g., priority index=0) to be multiplexed on the PUSCH 1702 according to the HARQ-ACK information corresponding to low priority. The UE 100 may generate a 8-bits HARQ-ACK codebook corresponding to low priority (e.g., priority index=0) to be multiplexed on the PUSCH 1703 corresponding to low priority (e.g., priority index=0) according to the DAI in the DCI 1701. The UE 100 may generate a 4-bits HARQ-ACK codebook corresponding to high priority (e.g., priority index=1) to be multiplexed on the PUSCH 1703 according to the HARQ-ACK information corresponding to high priority.

In some embodiments, in the case of applying to a single DAI to all the first PUSCHs multiplexed with the HARQ-ACKs, there may be a restriction for scheduling the PUSCHs on multiple scheduled cells.

Figure 18A:
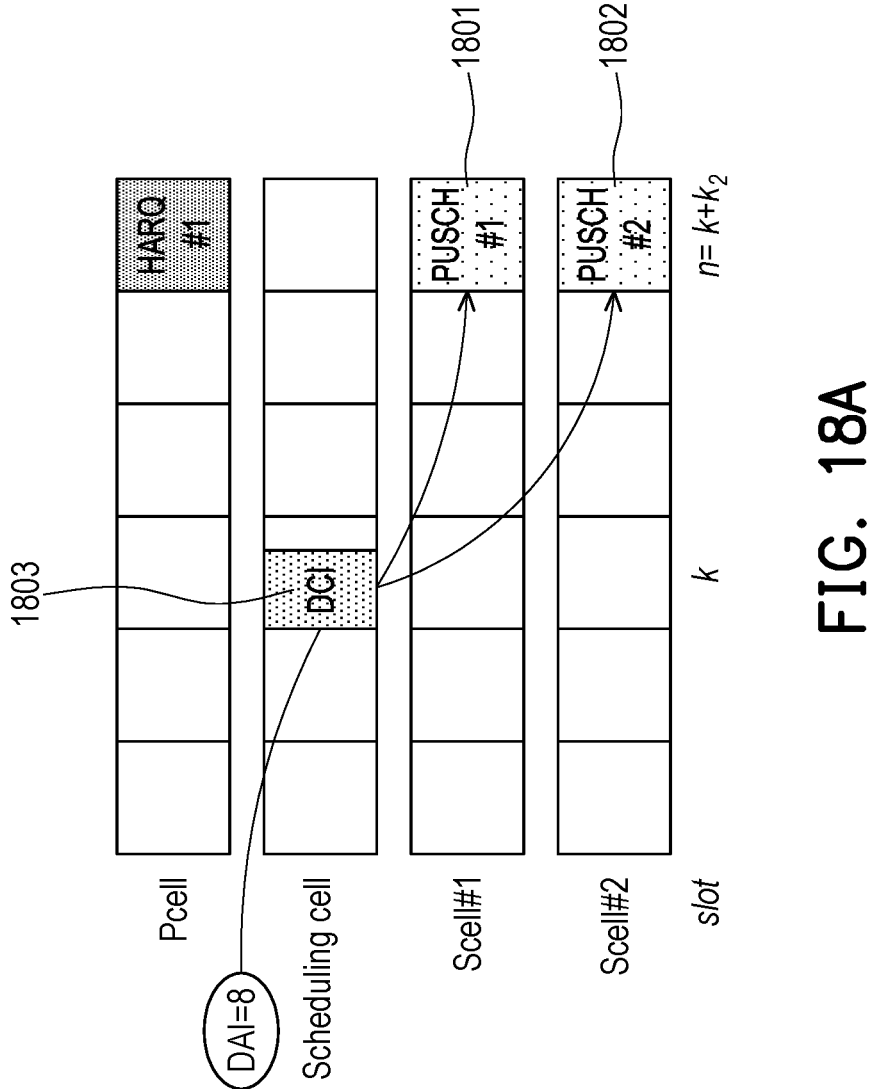
FIG. 18A is a schematic diagram that illustrates restricted scheduling according to an exemplary embodiment of the present disclosure.

FIG. 18A is a schematic diagram that illustrates restricted scheduling according to an exemplary embodiment of the present disclosure. Referring FIG. 18A, the DCI 1803 schedules multiple PUSCHs 1801 and 1802 on the scheduled cells Scell #1 and Scell #2, but the multiple PUSCHs 1801 and 1802 may not be scheduled in multiple slots by the DCI 1803. The UE 100 may expect all PUSCHs 1801 and 1802 scheduled by the DCI 1803 are scheduled with the same k 2.

Figure 18B:
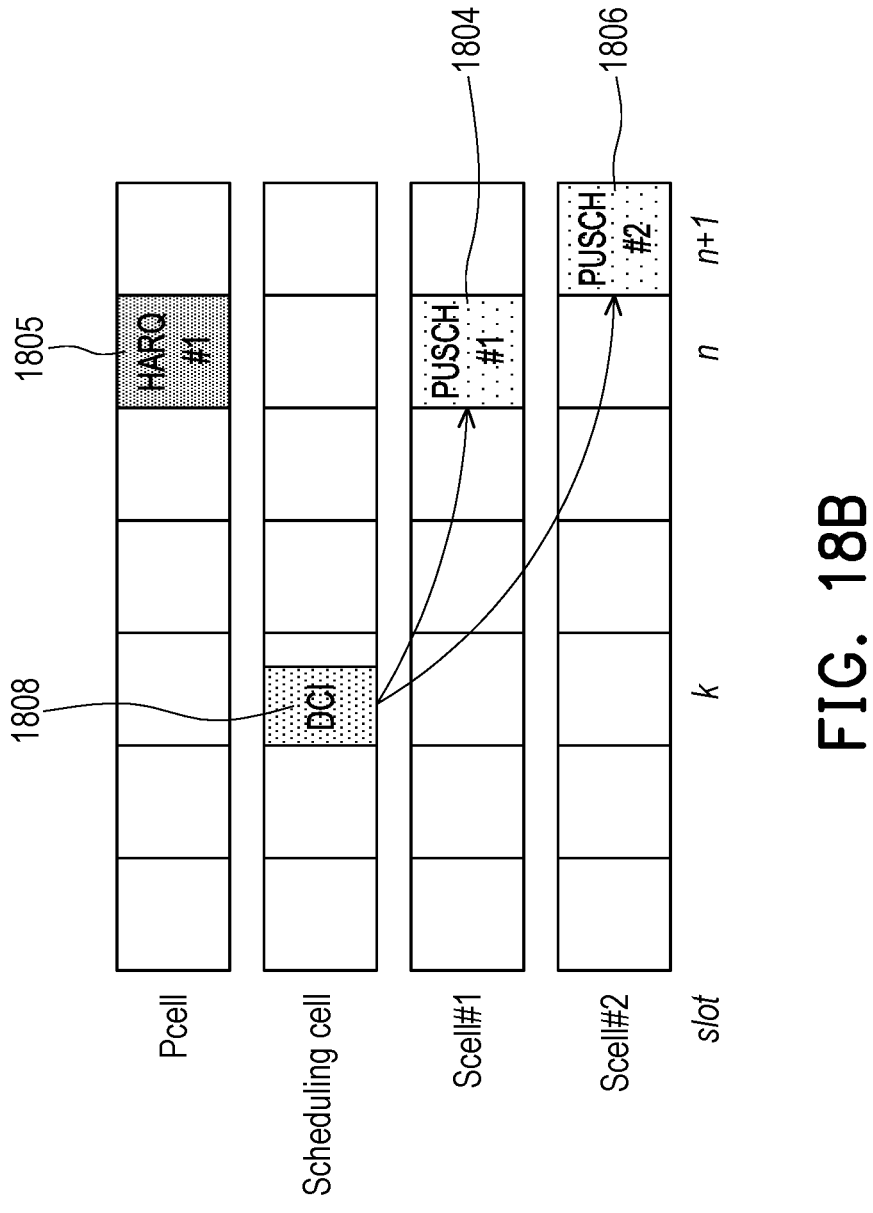
FIG. 18B is a schematic diagram that illustrates restricted scheduling according to an exemplary embodiment of the present disclosure.

FIG. 18B is a schematic diagram that illustrates restricted scheduling according to an exemplary embodiment of the present disclosure. Referring FIG. 18B, the DCI 1808 schedules multiple PUSCHs 1804 and 1806 on the scheduled cells Scell #1 and Scell #2. The UE 100 may not expect more than one PUSCH collided with more than one PUCCH. That is, at slot #n, only PUSCH 1804 may be collided with PUCCH 1805.

In some embodiments, the DCI scheduling multiple PUSCHs on the scheduled cells may include a first DAI corresponding to a first slot and a second DAI corresponding to a second slot. Multiple first PUSCHs may be selected by the UE 100 to transmit HARQ-ACKs. The UE 100 may generate a HARQ-ACK codebook transmitted at the first slot according to the first DAI. The UE 100 may generate another HARQ-ACK codebook transmitted at the second slot according to the second DAI. That is, the first DAI in the DCI is applied to a first PUSCH at the first slot, and the second DAI in the DCI is applied to another first PUSCH at the second slot.

Figure 19:
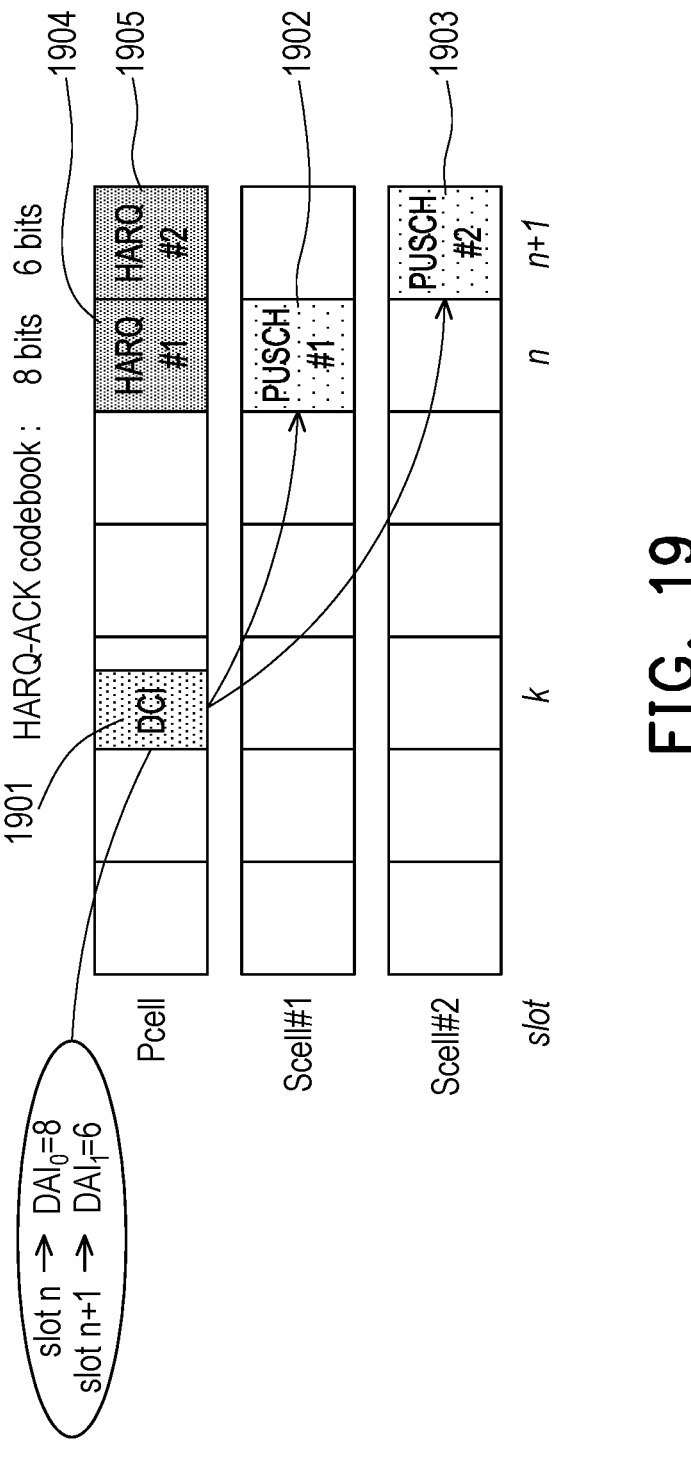
FIG. 19 is a schematic diagram that illustrates applying multiple DAIs according to an exemplary embodiment of the present disclosure.

FIG. 19 is a schematic diagram that illustrates applying multiple DAIs according to an exemplary embodiment of the present disclosure. Referring FIG. 19, DCI 1901 may schedule PUSCH 1902 and PUSCH 1903 respectively on the scheduled cells Scell #1 and Scell #2. PUCCH 1904 and PUCCH 1905 are respectively conflict with PUSCH 1902 and PUSCH 1903 at slot #n and slot #(n+1). PUSCH 1902 and PUSCH 1903 are respectively selected by the UE 100 to respectively carry HARQ-ACKs HARQ #1 and HARQ #2. The DCI 1901 may include a first DAI and a second DAI. The UE 100 may generate a HARQ-ACK codebook which is multiplexed on the PUSCH 1902 at slot #n according the first DAI in the DCI 1901. The UE 100 may generate a HARQ-ACK codebook which is multiplexed on the PUSCH 1903 at slot #(n+1) according the second DAI in the DCI 1901. For example, assuming the first DAI in the DCI 1901 is 8 (i.e., $DAI_0=8$) and the second DAI in the DCI 1901 is 6 (i.e., $DAI_1=6$). The UE 100 may generate a 8-bits HARQ-ACK codebook to be multiplexed on the PUSCH 1902 at slot #n, and the HARQ-ACK codebook multiplexed on the PUSCH 1902 is determined according to the first DAI. The UE 100 may generate another 6-bits HARQ-ACK codebook to be multiplexed on the PUSCH 1903 at slot #(n+1), and the HARQ-ACK codebook multiplexed on the PUSCH 1903 is determined according to the second DAI.

Figure 20:
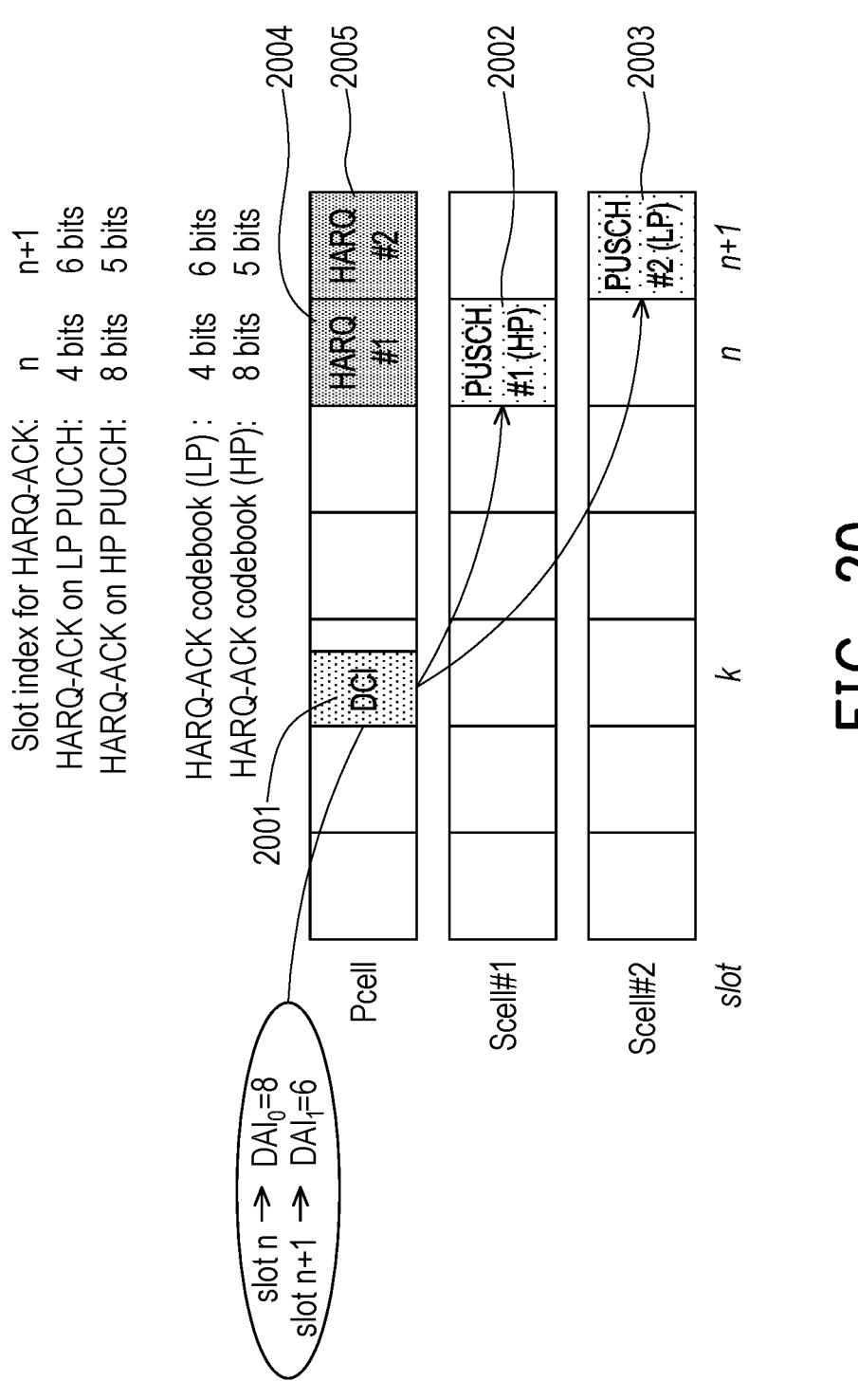
FIG. 20 is a schematic diagram that illustrates applying multiple DAIs according to an exemplary embodiment of the present disclosure.

FIG. 20 is a schematic diagram that illustrates applying multiple DAIs according to an exemplary embodiment of the present disclosure. Referring FIG. 20, DCI 2001 may schedule PUSCH 2002 and PUSCH 2003 respectively on the scheduled cells Scell #1 and Scell #2. PUCCH 2004 and PUCCH 2005 are respectively conflict with PUSCH 2002 and PUSCH 2003 at slot #n and slot #(n+1). PUCCH 2004 may be corresponding to 8 HARQ feedback bits with high priority and 4 HARQ feedback bits with low priority. PUCCH 2005 may be corresponding to 5 HARQ feedback bits with high priority and 6 HARQ feedback bits with low priority. PUSCH 2002 and PUSCH 2003 are respectively selected by the UE 100 to respectively carry HARQ-ACKs HARQ #1 and HARQ #2. The DCI 2001 may include a first DAI and a second DAI. The UE 100 may generate HARQ-ACK codebooks with different priorities to be multiplexed on the PUSCHs 2002 and generate HARQ-ACK codebooks with different priorities to be multiplexed on the PUSCHs 2003. In FIG. 20, "HP" stands for high priority, and "LP" stands for low priority.

For example, assuming the first DAI corresponding to the slot #n in the DCI 2001 is 8 (i.e., $DAI_0=8$) and the second DAI corresponding to the slot #(n+1) in the DCI 2001 is 6 (i.e., $DAI_1=6$). The UE 100 may generate a 8-bits HARQ-ACK codebook corresponding to high priority (e.g., priority index=1) to be multiplexed on the PUSCH 2002 corresponding to high priority (e.g., priority index=1) according to the first DAI in the DCI 2001. The UE 100 may generate a 4-bits HARQ-ACK codebook corresponding to low priority (e.g., priority index=0) to be multiplexed on the PUSCH 2002 according to the HARQ-ACK information corresponding to low priority. Besides, the UE 100 may generate a 6-bits HARQ-ACK codebook corresponding to low priority (e.g., priority index=0) to be multiplexed on the PUSCH 2003 corresponding to low priority (e.g., priority index=0) according to the second DAI in the DCI 2001. The UE 100 may generate a 5-bits HARQ-ACK codebook corresponding to high priority (e.g., priority index=1) to be multiplexed on the PUSCH 2003 according to the HARQ-ACK information corresponding to high priority.

In some embodiments, the DCI scheduling multiple PUSCHs on the scheduled cells may include a first DAI corresponding to a first priority index and a second DAI corresponding to a second priority index. In some embodiments, multiple first PUSCHs may be selected by the UE 100 to transmit HARQ-ACKs. The UE 100 may generate a HARQ-ACK codebook corresponding to the first priority index according to the first DAI. The UE 100 may generate another HARQ-ACK codebook corresponding to the second priority index according to the second DAI. That is, the first DAI and the second DAI in the DCI are applied to a first PUSCH for generating HARQ-ACK codebooks with different priorities.

Figure 21:
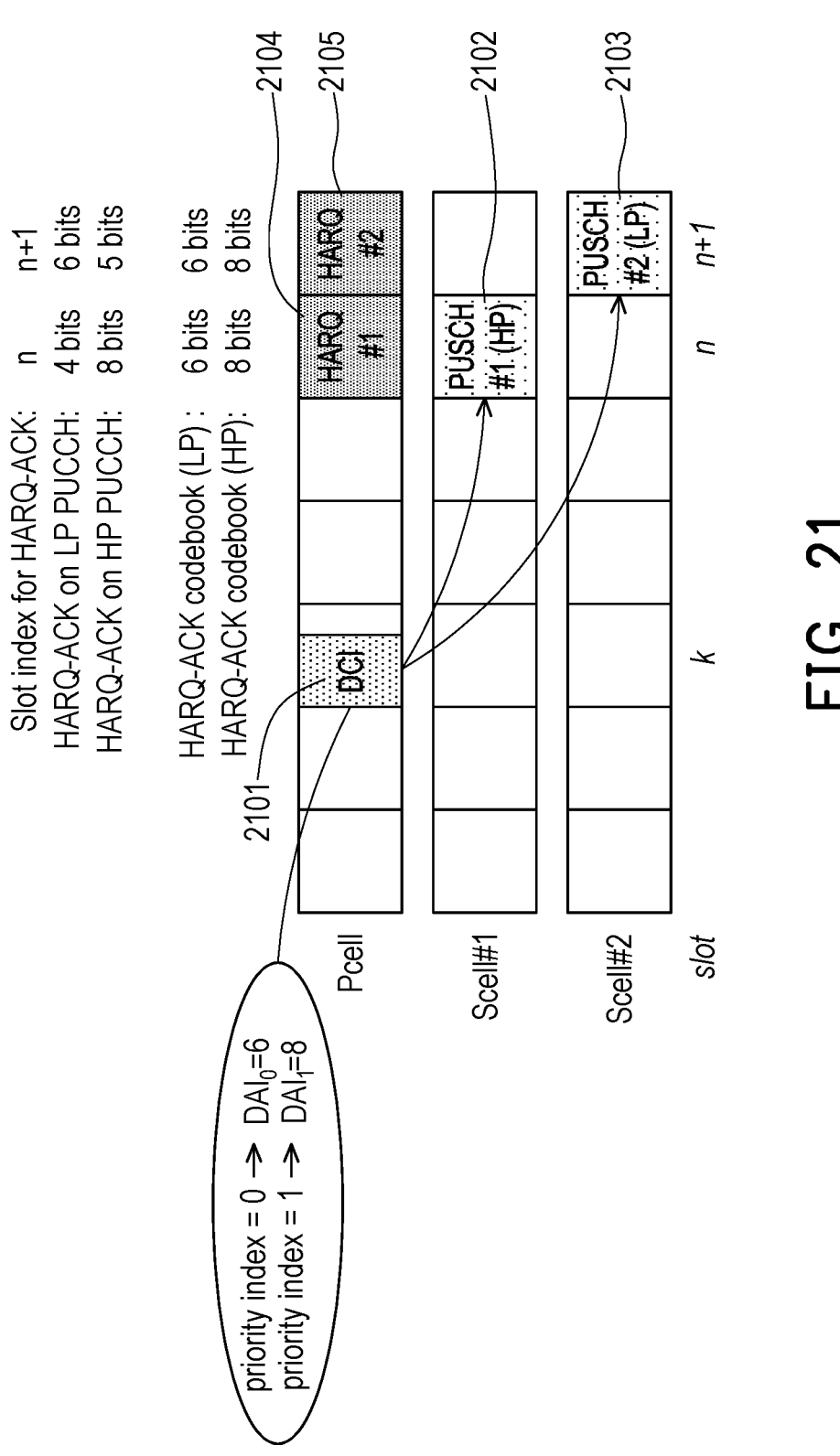
FIG. 21 is a schematic diagram that illustrates applying multiple DAIs according to an exemplary embodiment of the present disclosure.

FIG. 21 is a schematic diagram that illustrates applying multiple DAIs according to an exemplary embodiment of the present disclosure. Referring FIG. 21, DCI 2101 may schedule PUSCH 2102 and PUSCH 2103 respectively on the scheduled cells Scell #1 and Scell #2. PUCCH 2104 and PUCCH 2105 are respectively conflict with PUSCH 2102 and PUSCH 2103 at slot #n and slot #(n+1). PUCCH 2104 may be corresponding to 8 HARQ feedback bits with high priority and 4 HARQ feedback bits with low priority. PUCCH 2105 may be corresponding to 5 HARQ feedback bits with high priority and 6 HARQ feedback bits with low priority. PUSCH 2102 and PUSCH 2103 are respectively selected by the UE 100 to respectively carry HARQ-ACKs HARQ #1 and HARQ #2. The DCI 2101 may include a first DAI and a second DAI. The UE 100 may generate HARQ-ACK codebooks with different priorities to be multiplexed on the PUSCHs 2102 and generate HARQ-ACK codebooks with different priorities to be multiplexed on the PUSCHs 2103. In FIG. 21, "HP" stands for high priority, and "LP" stands for low priority.

For example, assuming the first DAI corresponding to the first priority index (e.g., priority index=0) is 6 (i.e., $DAI_0=6$) and the second DAI corresponding to the second priority index (e.g., priority index=1) is 8 (i.e., $DAI_1=8$). The UE 100 may generate a 8-bits HARQ-ACK codebook corresponding to high priority (e.g., priority index=1) to be multiplexed on the PUSCH 2102 according to the second DAI in the DCI 2101. The UE 100 may generate a 6-bits HARQ-ACK codebook corresponding to low priority (e.g., priority index=0) to be multiplexed on the PUSCH 2102 according to the first DAI in the DCI 2101. The UE 100 may generate a 8-bits HARQ-ACK codebook corresponding to high priority (e.g., priority index=1) to be multiplexed on the PUSCH 2103 according to the second DAI in the DCI 2101. The UE 100 may generate a 6-bits HARQ-ACK codebook corresponding to low priority (e.g., priority index=0) to be multiplexed on the PUSCH 2103 according to the first DAI in the DCI 2101.

Figure 22A:
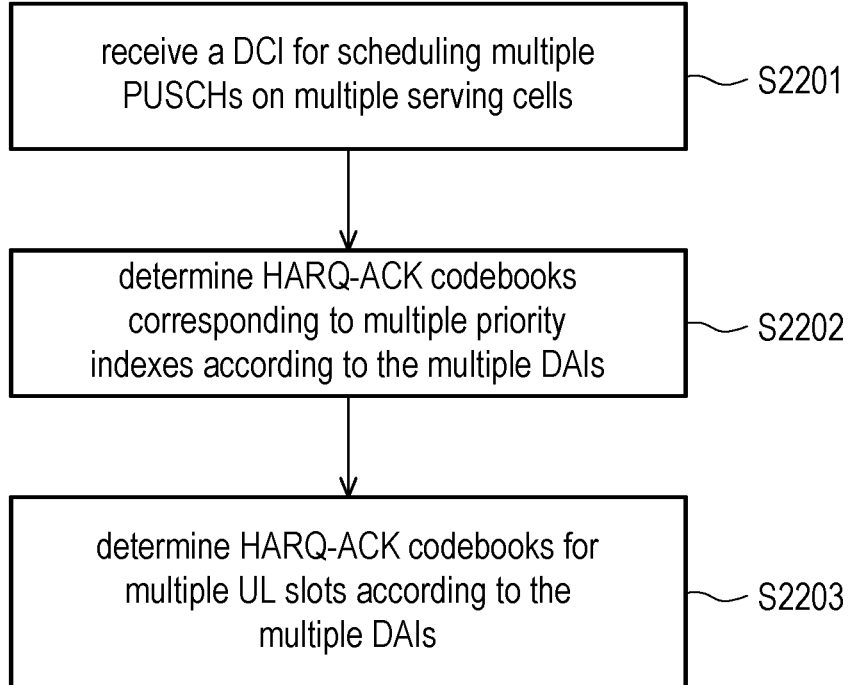
FIG. 22A is a flowchart of using multiple DAIs according to an embodiment of the disclosure.

FIG. 22A is a flowchart of using multiple DAIs according to an embodiment of the disclosure. Referring FIG. 22A, in step S2201, the UE 100 may receive a DCI for scheduling multiple PUSCHs on multiple serving cells, and the DCI comprises multiple DAIs. In step S2202, the UE 100 may determine HARQ-ACK codebooks corresponding to multiple priority indexes according to the multipe DAIs. In step S2203, the UE 100 may determine HARQ-ACK codebooks for multiple UL slots according to the multiple DAIs.

Figure 22B:
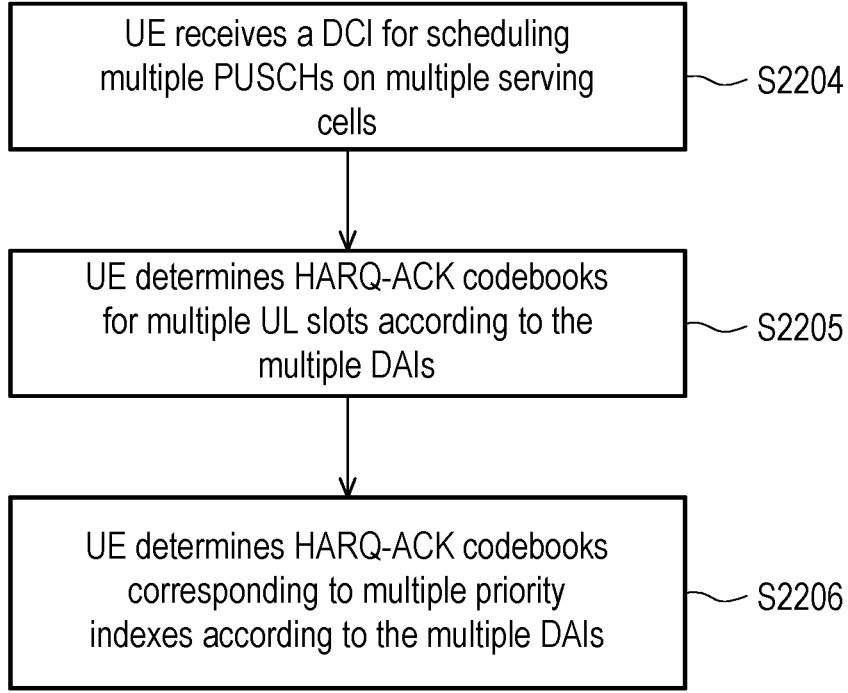
FIG. 22B is a flowchart of using multiple DAIs according to an embodiment of the disclosure.

FIG. 22B is a flowchart of using multiple DAIs according to an embodiment of the disclosure. Referring FIG. 22B, in step S2204, the UE 100 may receive a DCI for scheduling multiple PUSCHs on multiple serving cells, and the DCI comprises multiple DAIs. In step S2205, the UE 100 may determine HARQ-ACK codebooks for multiple UL slots according to the multiple DAIs. In step S2206, the UE 100 may determine HARQ-ACK codebooks corresponding to multiple priority indexes according to the multiple DAIs.

Figure 23A:
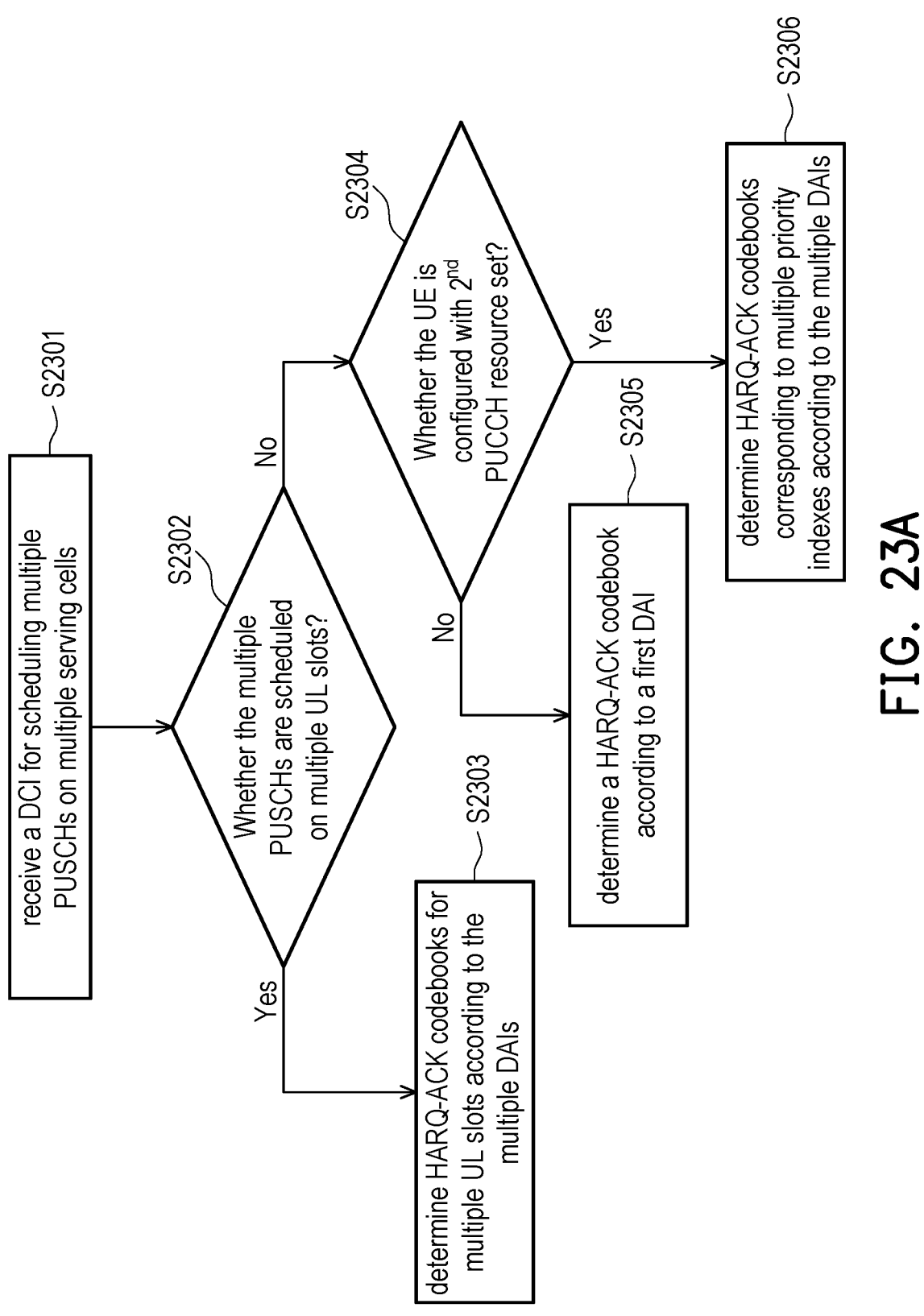
FIG. 23A is a flowchart of using multiple DAIs according to an embodiment of the disclosure.

FIG. 23A is a flowchart of using multiple DAIs according to an embodiment of the disclosure. Referring FIG. 23A, in step S2301, the UE 100 may receive a DCI for scheduling multiple PUSCHs on multiple serving cells. In step S2302, the UE 100 may determine whether the multiple PUSCHs are scheduled on multiple UL slots. If the step S2302 is determined yes, in step S2303, the UE 100 may determine HARQ-ACK codebooks for multiple UL slots according to the multiple DAIs. If the step S2302 is determined no, in step S2304, the UE 100 may determine whether the UE 100 is configured with $2^{nd}$ PUCCH resource set. The $2^{nd}$ PUCCH resource set may correspond to priority index=1. If the step S2304 is determined no, in step S2305, the UE 100 may determine a HARQ-ACK codebook according to a first DAI. If the step S2304 is determined yes, in step S2306, the UE 100 may determine HARQ-ACK codebooks corresponding to multiple priority indexes according to the multiple DAIs.

Figure 23B:
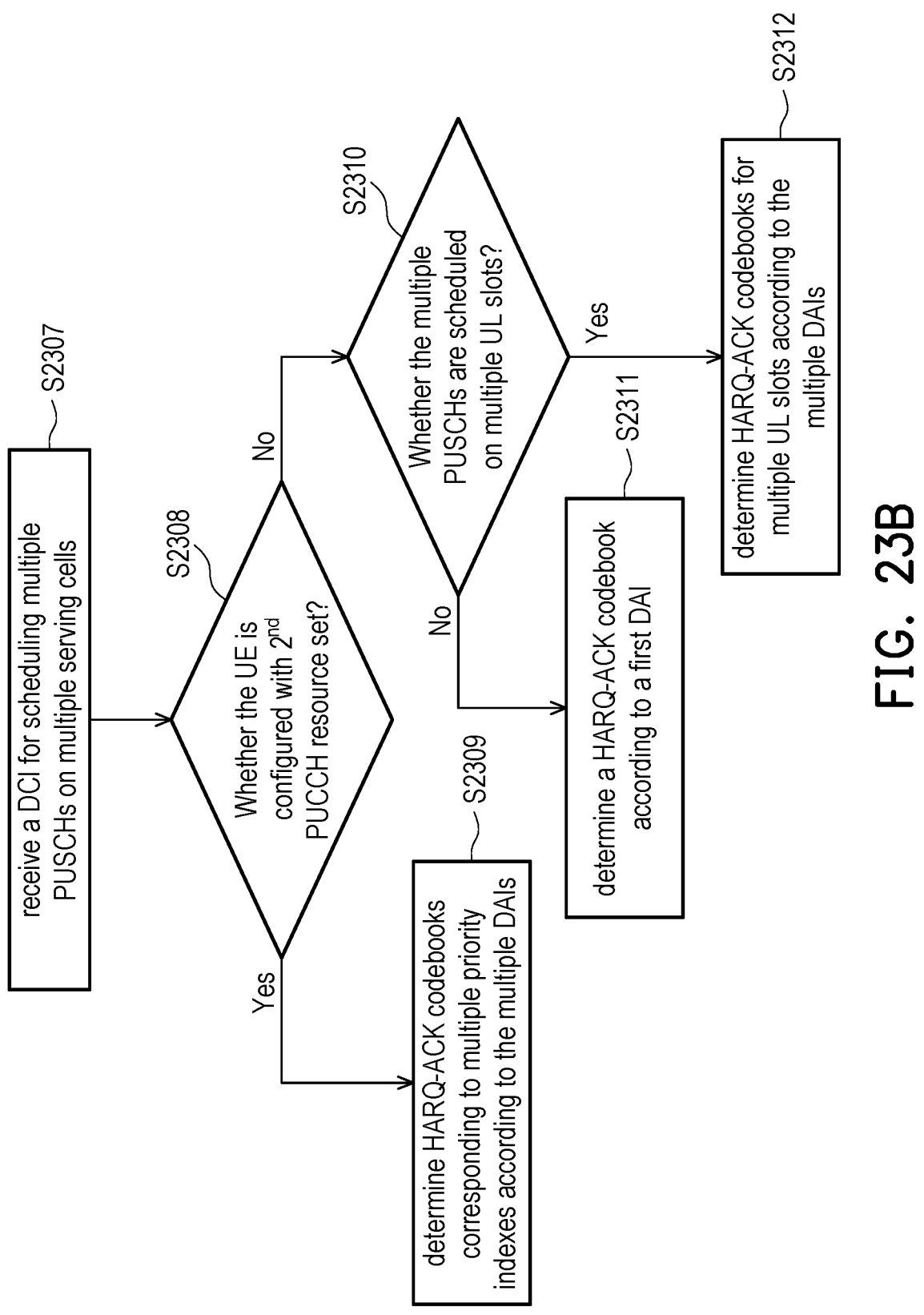
FIG. 23B is a flowchart of using multiple DAIs according to an embodiment of the disclosure.

FIG. 23B is a flowchart of using multiple DAIs according to an embodiment of the disclosure. Referring FIG. 23B, in step S2307, the UE 100 may receive a DCI for scheduling multiple PUSCHs on multiple serving cells. In step S2308, the UE 100 may determine whether the UE 100 is configured with $2^{nd}$ PUCCH resource set. The $2^{nd}$ PUCCH resource set may correspond to priority index=1. If the step S2308 is determined yes, in step S2309, the UE 100 may determine HARQ-ACK codebooks corresponding to multiple priority indexes according to the multiple DAIs. If the step S2308 is determined no, in step S2310, the UE 100 may determine whether the multiple PUSCHs are scheduled on multiple UL slots. If the step S2310 is determined no, in step S2311, the UE 100 may determine a HARQ-ACK codebook according to a first DAI. If the step S2310 is determined yes, in step S2312, the UE 100 may determine HARQ-ACK codebooks for multiple UL slots according to the multiple DAIs.

[Aperiodic CSI (A-CSI) Multiplexed on PUSCH]

In some embodiments, the at least one UCI comprises the aperiodic CSI, and the aperiodic CSI is multiplexed on the at least one first PUSCH. The aperiodic CSI is triggered by the DCI. That is, the DCI scheduling multiple PUSCHs on multiple serving cells may also trigger the UE 100 to transmit the aperiodic CSI.

In some embodiments, the at least one first PUSCH with the aperiodic CSI is transmitted in a predetermined UL slot. The predetermined UL slot is one of UL slots of the PUSCHs. The predetermined UL slot comprises an earliest UL slot among the UL slots of the PUSCHs, a latest UL slot among the UL slots of the PUSCHs, or a UL slot satisfying with a timing limitation of the aperiodic CSI. That is, the first PUSCH on the first scheduled cell is selected by the UE 100 according to the slots of the PUSCHs scheduled by the same DCI.

In some embodiments, the at least one first PUSCH with the aperiodic CSI is transmitted on a first scheduled cell with a lowest cell ID among the scheduled cells, and the scheduled cells are configured for respectively transmitting the PUSCHs in the predetermined UL slot. That is, if there are more than one PUSCHs scheduled in the predetermined UL slot, the UE 100 may select the first PUSCH for transmitting the aperiodic CSI according to the cell IDs of the scheduled cells.

In some embodiments, when a CSI request field of the DCI triggers N (N≥1) aperiodic CSI report(s) on PUSCH(s) scheduled by the DCI, the UE 100 may select the first PUSCH among the PUSCHs according to the slots of the PUSCHs and then provide a valid CSI report for the n-th (n=0, . . . , N−1) triggered aperiodic CSI report on the first PUSCH among the PUSCHs. The first PUSCH is selected for transmitting the aperiodic CSI report by the UE 100 if the first uplink symbol of the first PUSCH to carry the corresponding CSI report(s) including the effect of the timing advance, starts no earlier than a time threshold Z (e.g., number of symbol), and/or if the first uplink symbol of the first PUSCH to carry the n-th CSI report including the effect of the timing advance, starts no earlier than a time threshold Z' (e.g., number of symbol). The UE 100 may determine that a first time period between the CSI-RS resource and the selected first PUSCH is greater than or equal to the time threshold Z' and determine that a second time period between the DCI and the selected first PUSCH is greater than or equal to the time threshold Z. The UE 100 may select the first PUSCH from the PUSCHs according to these timing determinations. For example, the time threshold Z' and the time threshold Z may be defined in 3GPP TS 38.214. If more than one PUSCHs satisfying the requirements of Z and Z', the first PUSCH with a predetermined cell ID and/or the first PUSCH with a specific priority index (e.g., priority index=0) may be selected. The predetermined cell ID may be the lowest cell ID, the highest cell ID or the $2^{nd}$ lowest cell ID.

In some embodiments, the UE 100 does not expect that aperiodic CSI-RS is transmitted before the OFDM symbol(s) carrying its triggering DCI.

Figure 24:
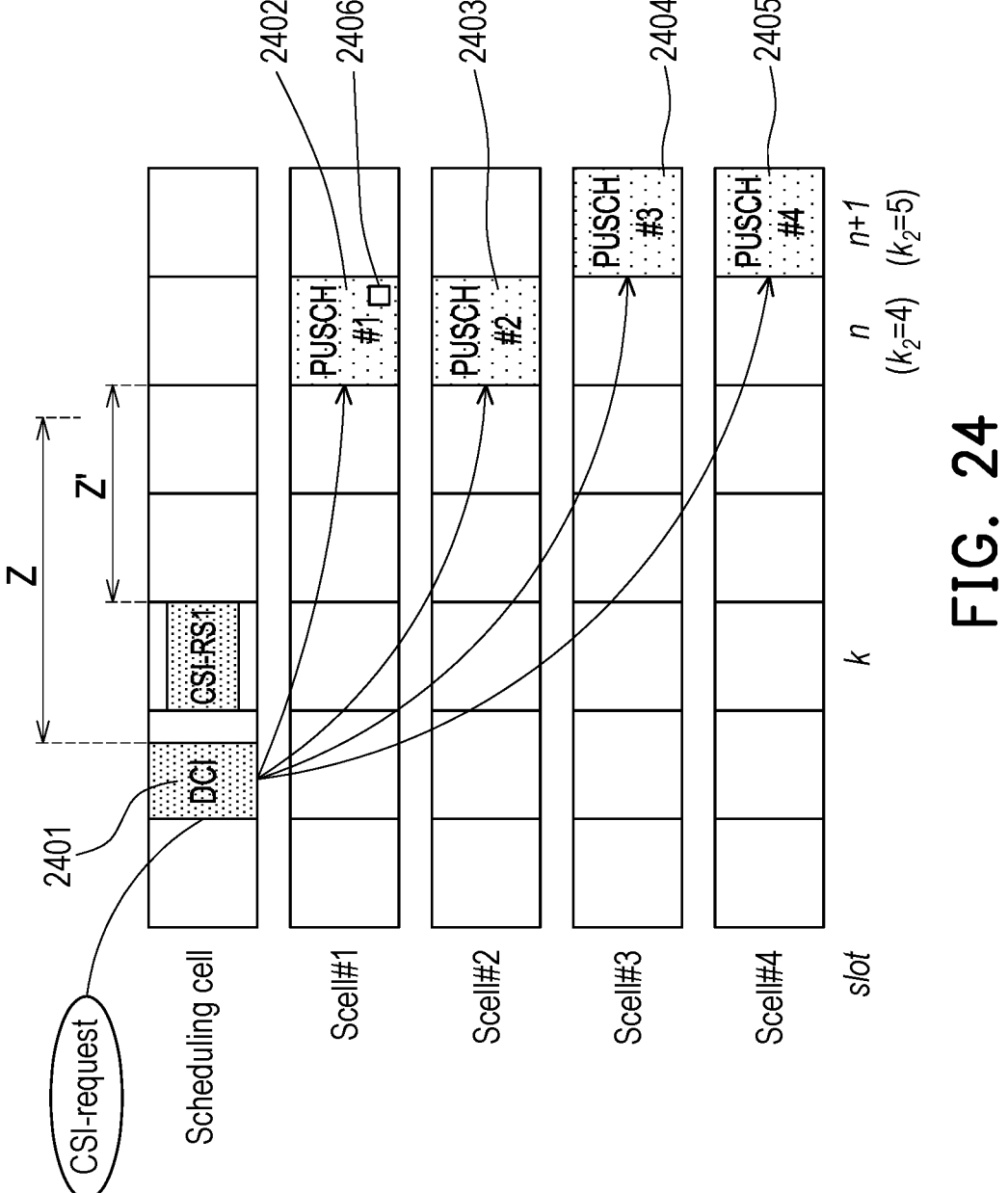
FIG. 24 is a schematic diagram that illustrates multiplexing an aperiodic CSI on a PUSCH according to an exemplary embodiment of the present disclosure.

FIG. 24 is a schematic diagram that illustrates multiplexing an aperiodic CSI on a PUSCH according to an exemplary embodiment of the present disclosure. Referring to FIG. 24, DCI 2401 may schedule PUSCHs 2402 to 2405 respectively on the scheduled cells Scell #1, Scell #2, Scell #3 and Scell #4. DCI 2401 including a CSI request may trigger an aperiodic CSI report. A reference signal CSI-RS1 may be used for channel measurement for the triggered CSI report. In FIG. 24, the UE 100 may determine the slots of PUSCHs 2402 and 2403 satisfy the timing requirement of the time threshold Z and time threshold Z'. Besides, since the cell ID of the PUSCH 2402 is the lowest, the aperiodic CSI report 2406 may be multiplexed on PUSCH 2402.

Figure 25:
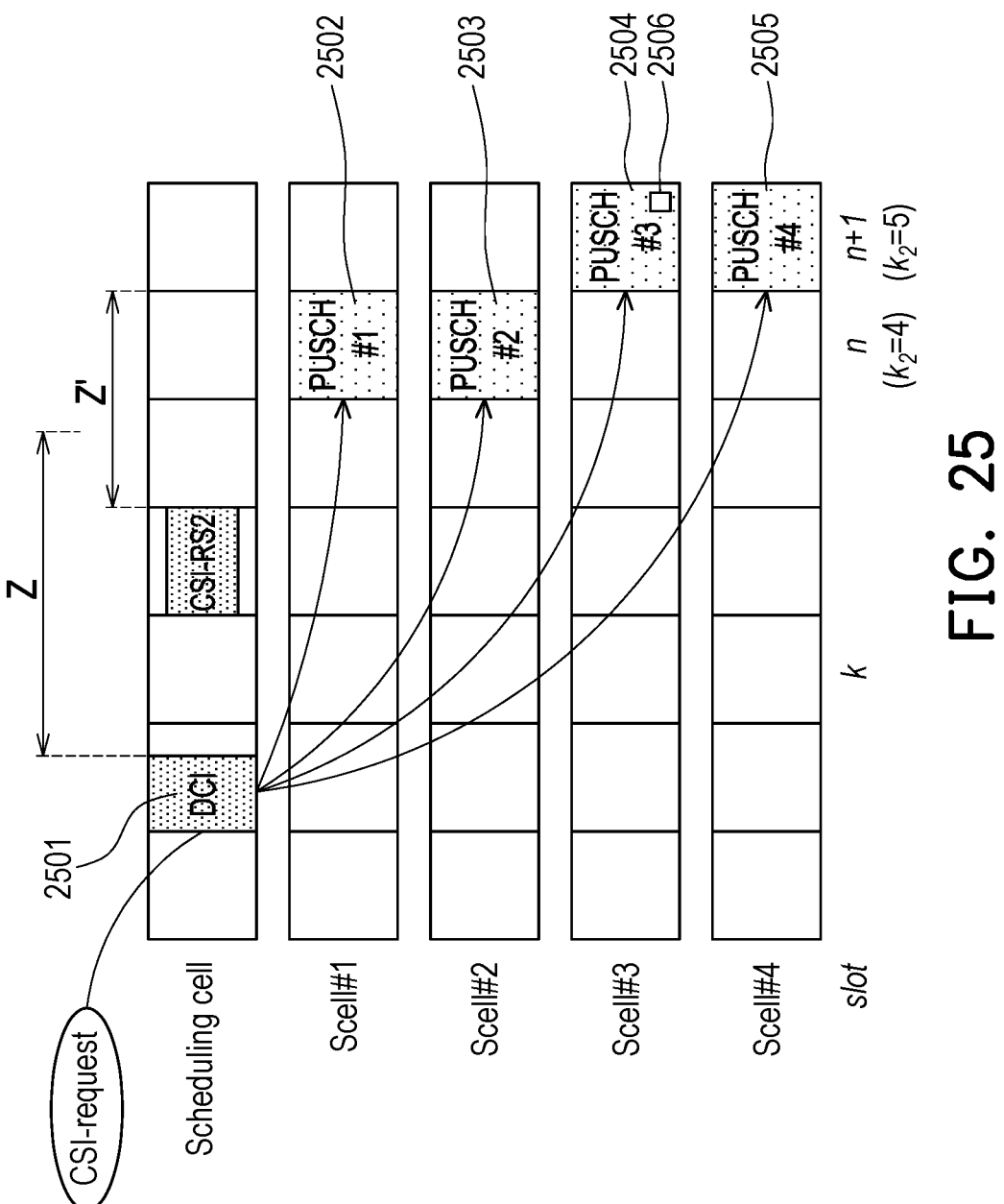
FIG. 25 is a schematic diagram that illustrates multiplexing an aperiodic CSI on a PUSCH according to an exemplary embodiment of the present disclosure.

FIG. 25 is a schematic diagram that illustrates multiplexing an aperiodic CSI on a PUSCH according to an exemplary embodiment of the present disclosure. Referring to FIG. 25, DCI 2501 may schedule PUSCHs 2502 to 2505 respectively on the scheduled cells Scell #1, Scell #2, Scell #3 and Scell #4. DCI 2501 including a CSI request may trigger an aperiodic CSI report. A reference signal CSI-RS2 may be used for channel measurement for the triggered CSI report. In FIG. 25, the UE 100 may determine the slots of PUSCHs 2504 and 2505 satisfy the timing requirement of the time threshold Z and time threshold Z'. Besides, since the cell ID of the PUSCH 2504 is the lowest, the aperiodic CSI report 2506 may be multiplexed on PUSCH 2504. That is, the cell ID of the PUSCH 2504 is smaller than the cell ID of the PUSCH 2505.

Figure 26:
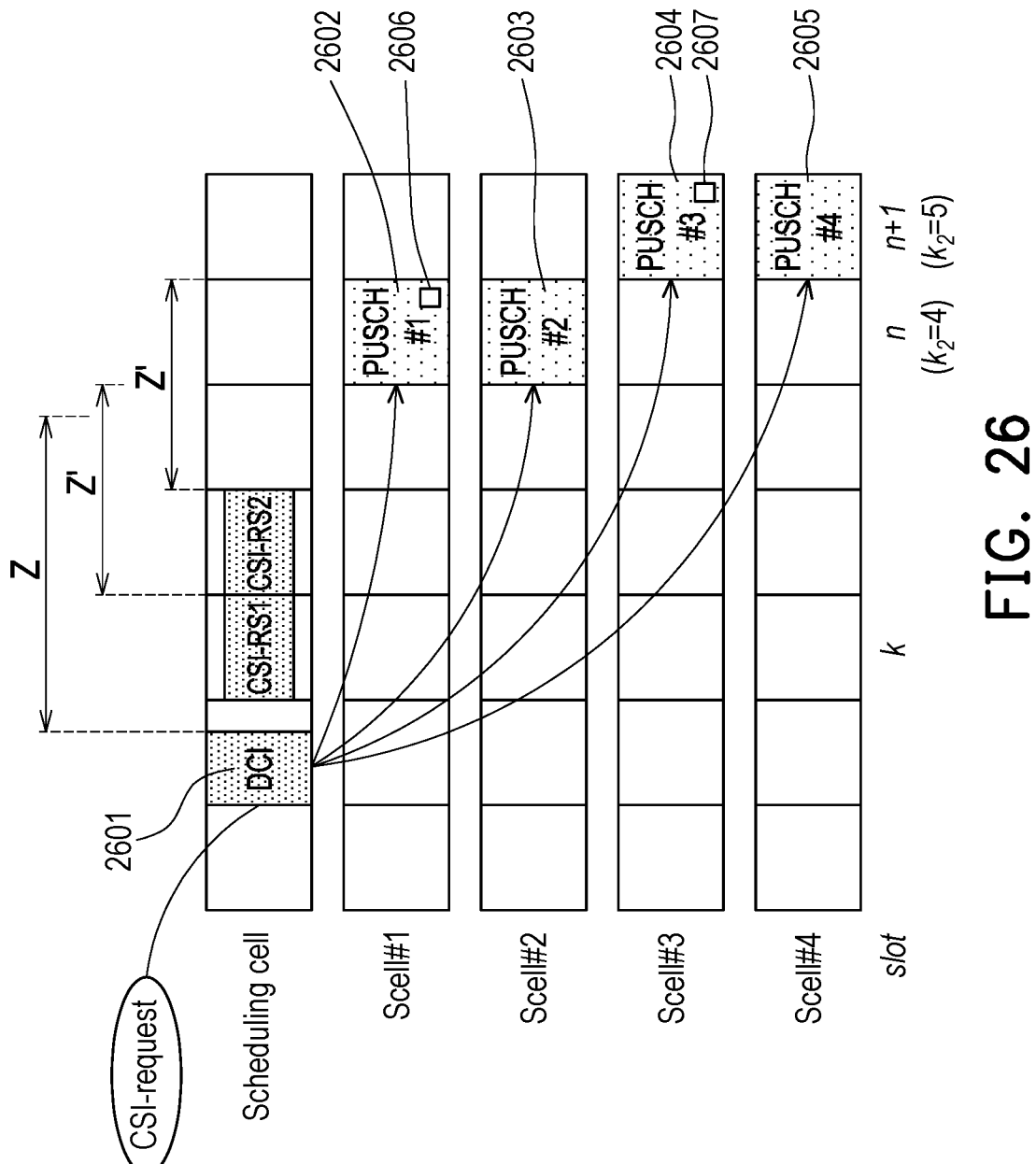
FIG. 26 is a schematic diagram that illustrates multiplexing aperiodic CSIs on PUSCHs according to an exemplary embodiment of the present disclosure.

FIG. 26 is a schematic diagram that illustrates multiplexing aperiodic CSIs on PUSCHs according to an exemplary embodiment of the present disclosure. Referring to FIG. 26, DCI 2601 may schedule PUSCHs 2602 to 2605 respectively on the scheduled cells Scell #1, Scell #2, Scell #3 and Scell #4. DCI 2601 including a CSI request may trigger aperiodic CSI reports for multiple CSI-RS s. Reference signals CSI-RS1 and CSI-RS2 may be used for channel measurement for the triggered CSI reports. In FIG. 26, regarding to the reference signal CSI-RS1, the UE 100 may determine the slots of PUSCHs 2602 and 2603 satisfy the timing requirement of the time threshold Z and time threshold Z'. Besides, since the cell ID of the PUSCH 2602 is the lowest, the aperiodic CSI report 2606 may be multiplexed on PUSCH 2602. Regarding to the reference signal CSI-RS2, the UE 100 may determine the slots of PUSCHs 2604 and 2605 satisfy the timing requirement of the time threshold Z and time threshold Z'. Besides, since the cell ID of the PUSCH 2604 is the lowest, the aperiodic CSI report 2607 may be multiplexed on PUSCH 2604.

Figure 27:
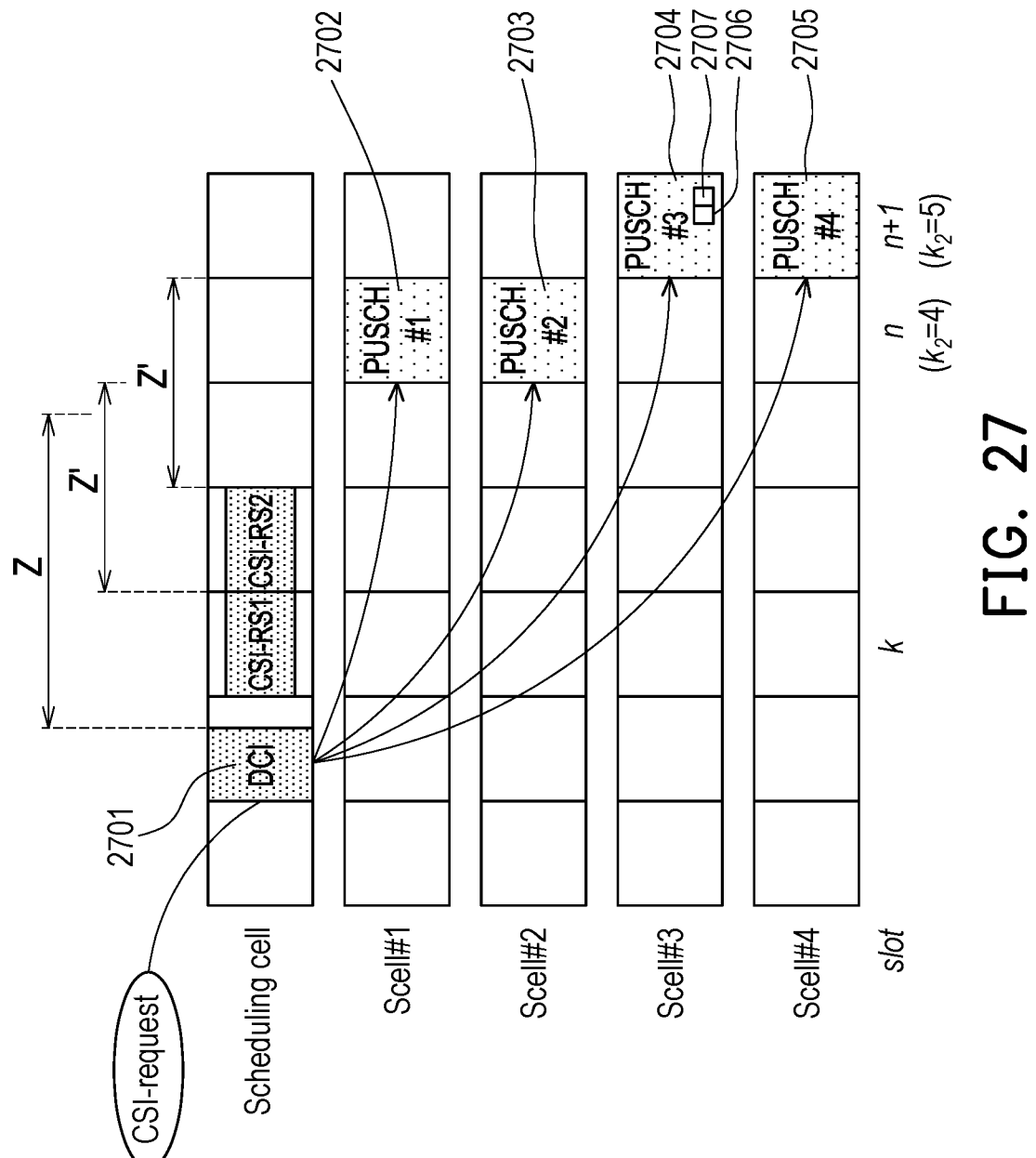
FIG. 27 is a schematic diagram that illustrates multiplexing aperiodic CSIs on a PUSCH according to an exemplary embodiment of the present disclosure.

FIG. 27 is a schematic diagram that illustrates multiplexing aperiodic CSIs on a PUSCH according to an exemplary embodiment of the present disclosure. Referring to FIG. 27, DCI 2701 may schedule PUSCHs 2702 to 2705 respectively on the scheduled cells Scell #1, Scell #2, Scell #3 and Scell #4. DCI 2701 including a CSI request may trigger aperiodic CSI reports for multiple CSI-RS s. Reference signals CSI-RS1 and CSI-RS2 may be used for channel measurement for the triggered CSI reports. In FIG. 27, by considering the reference signals CSI-RS1 and CSI-RS2 at the same time, the UE 100 may determine the slots of PUSCHs 2704 and 2705 satisfy the timing requirement of the time threshold Z and time threshold Z'. Besides, since the cell ID of the PUSCH 2704 is the lowest, the aperiodic CSI reports 2706 and 2707 respectively corresponding to the reference signals CSI-RS1 and CSI-RS2 may be multiplexed on PUSCH 2704.

In some embodiments, the at least one first PUSCH with the aperiodic CSI is transmitted on a first scheduled cell with a lowest cell ID among the scheduled cells. That is, without considering the slots of the PUSCHs scheduled by the DCI, the UE 100 may directly select the first PUSCH for transmitting the aperiodic CSI according to the cell IDs of the scheduled cells.

In some embodiments, the DCI scheduling multiple PUSCHs on multiple scheduled cells may include a UL-SCH indicator field. The UE 100 may disable transmitting an uplink shared channel (UL-SCH) on a serving cell with lowest cell ID among the scheduled cells when a UL-SCH indicator field indicating zero in the DCI.

In some embodiments, when the UE 100 receives a DCI format supporting multiple PUSCH scheduling, the UE may expect a single PUSCH is scheduled by the DCI if an indicator indicates UL-SCH not be transmitted on the PUSCH (e.g., the UL-SCH indicator field in the DCI indicates zero). The UE 100 may multiplex a CSI report on the single PUSCH without multiplexing transport block on the single PUSCH.

In some embodiments, for a DCI format configured for scheduling multiple PUSCH on multiple cells, the UE 100 may expect there is no UL-SCH indicator field in the DCI.

In some embodiments, the UE 100 may receive a DCI that schedules multiple PUSCHs on multiple serving cells. When the DCI indicates a CSI report(s) via the CSI request field and UL-SCH not be transmitted on PUSCH(s) (e.g., UL-SCH indicator field=0), one PUSCH with a pre-determined cell ID, predetermined scheduled UL slot and/or a PUSCH with a priority index (e.g., priority index=0) may not multiplex with a transport block. The pre-determined cell ID may be fixed or BS configured, and may be the lowest cell ID, the highest cell ID or 2nd lowest cell ID. Alternatively, when the DCI indicates a CSI report(s) via the CSI request field and UL-SCH not be transmitted on PUSCH(s) (e.g., UL-SCH indicator field=0), all PUSCH(s) scheduled by the DCI may not multiplex with transport block. The UE 100 may expect one PUSCH per UL slot, and the DCI may indicate multi-groups of CSI reports, each group of CSI report may correspond to one scheduled PUSCH.

Figure 28:
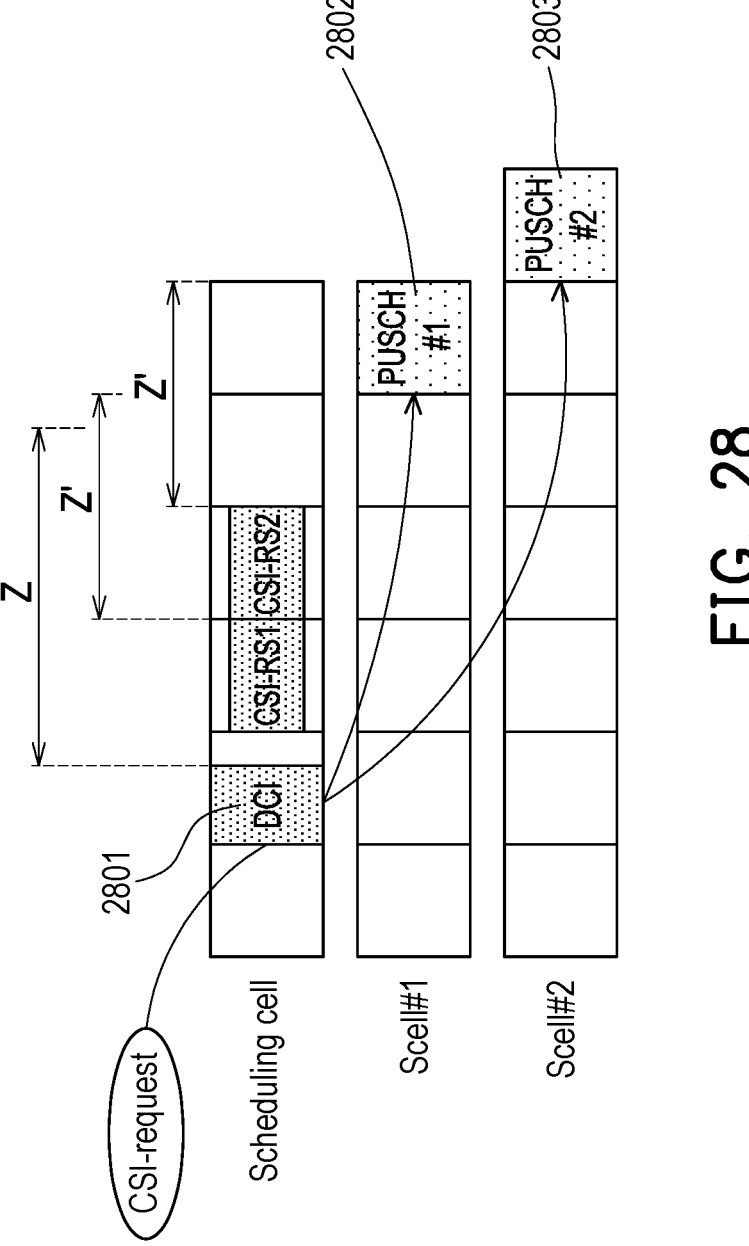
FIG. 28 is a schematic diagram that illustrates an aperiodic CSI report without UL_SCH according to an exemplary embodiment of the present disclosure.

FIG. 28 is a schematic diagram that illustrates an aperiodic CSI report without UL_SCH according to an exemplary embodiment of the present disclosure. Referring to FIG. 28, the UE 100 receives a DCI 2801 that schedules multiple PUSCHs 2802 and 2803 on multiple serving cells Scell #1, Scell #2. When the DCI 2801 indicates 2 group of A-CSI reports via CSI request field and UL-SCH indicator field is zero, the UE 100 may transmit a first A-CSI report on the first scheduled PUSCH 2802 and transmit a second A-CSI report on the second scheduled PUSCH 2803, wherein the number of scheduled PUSCHs 2802 and 2803 may equal to (or not larger than) the group number of A-CSI report(s). Further, all scheduled PUSCH(s) 2802 and 2803 may not multiplex with transport block.

[Semi-Persistent CSI (SP-CSI) Multiplexed on PUSCH]

In some embodiments, when the UE 100 receives a DCI format supporting multiple PUSCH scheduling, the UE 100 may expect a single PUSCH on the single cell can be scheduled by the DCI (e.g., in each time instance) if the DCI scrambled with SP-CSI-RNTI activates at least one SP CSI report. The UE 100 may multiplex SP-CSI report on the PUSCH without multiplexing transport block.

Figure 29:
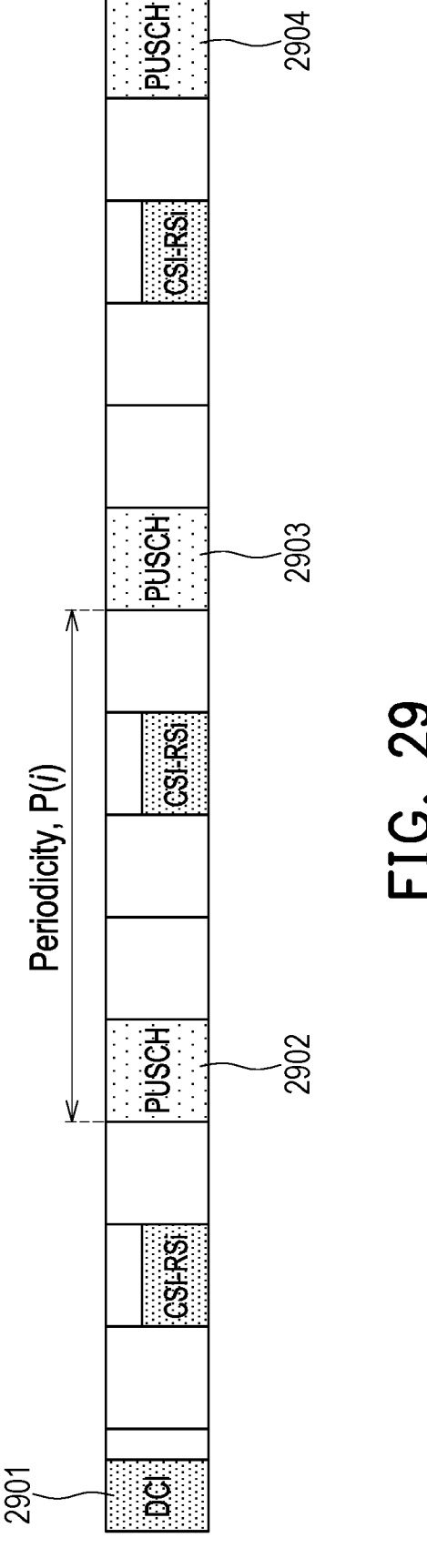
FIG. 29 is a schematic diagram that illustrates a SP-CSI report multiplexed on PUSCH according to an exemplary embodiment of the present disclosure.

For example, FIG. 29 is a schematic diagram that illustrates a SP-CSI report multiplexed on PUSCH according to an exemplary embodiment of the present disclosure. Referring to FIG. 29, the DCI 2901 contains a CSI request field which indicates the semi-persistent CSI trigger state (e.g., i) to activate or deactivate. When the UE 100 receives a DCI 2901 supporting multiple PUSCH scheduling, the UE 100 may multiplex SP-CSI report on the PUSCHs 2902 to 2904 and without multiplex transport block on the PUSCHs 2902 to 2904. The SP-CSI reports on the PUSCHs 2902 to 2904 may be transmitted with a periodicity P(i), and the SP-CSI reports may correspond to the measurement of CSI-RSi.

In some embodiments, the DCI configured for scheduling multiple PUSCH on multiple cells is not scrambled by a SP-CSI-RNTI, or the DCI is configured not to activate a SP CSI report on one of the scheduled cells. That is, the UE 100 may not expect the DCI configured for scheduling multiple PUSCH on multiple cells could activate any SP CSI report. The UE 100 may not expect to receive the DCI configured for scheduling multiple PUSCH on multiple cells and scrambled with SP-CSI-RNTI.

Figure 30:
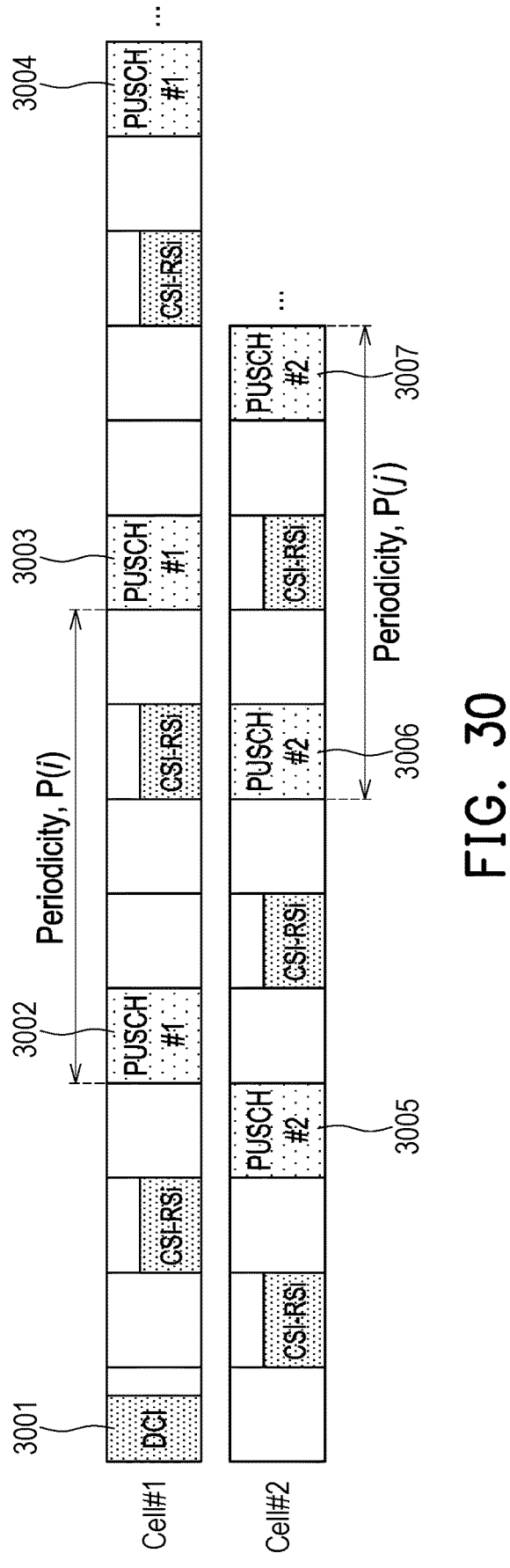
FIG. 30 is a schematic diagram that illustrates SP-CSI reports multiplexed on PUSCHs according to an exemplary embodiment of the present disclosure.

In some embodiments, the UE 100 receives a DCI that schedules at least one PUSCH on at least one serving cell. When the DCI scrambled with SP-CSI-RNTI activates at least one SP-CSI report via CSI request field, the UE 100 may assume the number of scheduled PUSCH in each time instance equals to the number of activated SP-CSI report activated with a ID, respectively. The mapping between the SP-CSI report and PUSCH may according to the SP-CSI report ID (e.g., CSI-ReportConfigId) and serving cell ID. For example, FIG. 30 is a schematic diagram that illustrates SP-CSI reports multiplexed on PUSCHs according to an exemplary embodiment of the present disclosure. Referring to FIG. 30, the DCI 3001 contains a CSI request field which indicates the semi-persistent CSI trigger state (e.g., i and j) to activate or deactivate. Based on the mapping relationship in Table 2, when the CSI request field is {001} in DCI 3001, the UE 100 may assume two PUSCHs in each time instance are scheduled on two serving cells (e.g., cell #1 and cell #2). The UE 100 may transmit SP-CSI report with ID #i via a PUSCHs 3002, 3003, 3004 on the scheduled cell cell #1 and transmit SP-CSI report with ID #j via a PUSCH 3005, 3006, 3007 on the scheduled cell cell #2, respectively. The PUSCHs 3002, 3003, 3004 may comprise SP-CSI according to CSI-ReportConfigId=i. The PUSCHs 3005, 3006, 3007 may comprise SP-CSI according to CSI-ReportConfigId=j.

TABLE 2

| CSI request fields | CSI-ReportConfigId(s) for activating SP-CSI report |
|---|---|
| 000 | ID#h |
| 001 | ID#i, ID#j |
| 010 | ID#k, ID#l, ID#m |
| . . . | |

[Periodic CSI (P-CSI) Multiplexed on PUSCH]

In some embodiments, the at least one first PUSCH is overlapped with at least one PUCCH for transmitting the at least one UCI in time domain, and the at least one UCI is the P-CSI. It should be noted that, the at least one first PUSCH is transmitted in a first scheduled cell with a lowest cell ID among the scheduled cells. The at least one first PUSCH may transmitted in a plurality of different slots. In detail, the UE 100 may determine whether a PUCCH related with the periodic CSI is overlap with the PUSCHs scheduled by the DCI in the time domain. If yes, the UE 100 may select a first PUSCH from the PUSCHs overlapped with at least one PUCCH related with the periodic CSI in time domain according to the cell IDs of the scheduled cells.

Figure 31:
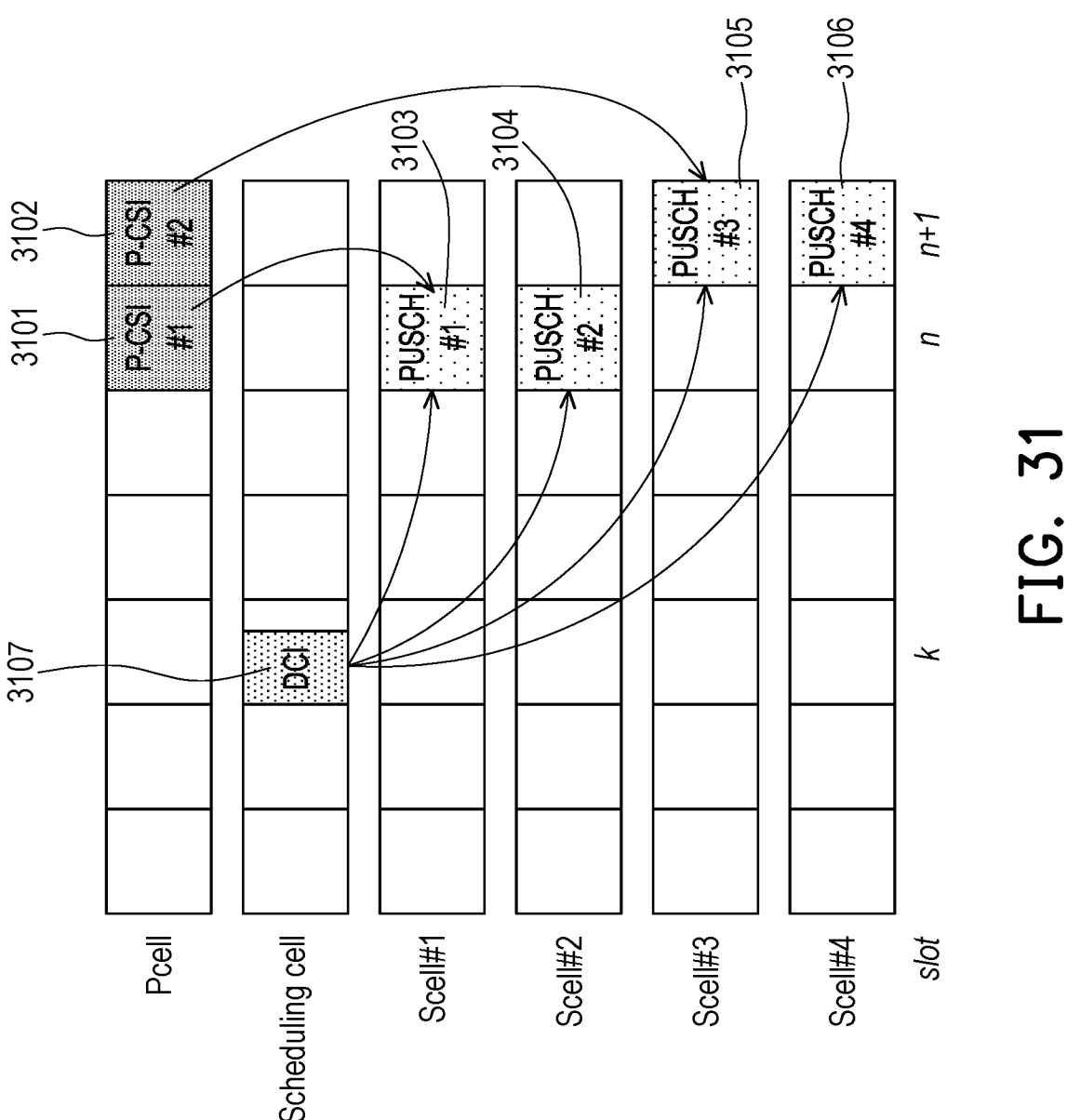
FIG. 31 is a schematic diagram that illustrates determining a first PUSCH for multiplexing a periodic CSI according to an exemplary embodiment of the present disclosure.

For example, FIG. 31 is a schematic diagram that illustrates determining a first PUSCH for multiplexing a periodic CSI according to an exemplary embodiment of the present disclosure. Referring FIG. 31, PUCCH 3101 for transmitting a periodic CSI P-CSI #1 is overlapped with PUSCHs 3103 and 3104. PUCCH 3102 for transmitting a periodic CSI P-CSI #2 is overlapped with PUSCHs 3105 and 3106. The PUSCHs 3103 to 1406 are scheduled by the DCI 3107 to be receptively on the scheduled cells Scell #1, Scell #2, Scell #3 and Scell #4. Since PUSCHs 3103 to 3106 are overlapped with PUCCH 3101 and 3102 in time domain, the UE 100 may select the specific PUSCHs scheduled in the first scheduled cells with a predetermined (e.g., lowest) cell ID for multiplexing the periodic CSIs CSI P-CSI #1 and CSI P-CSI #2. For example, in slot n, since PUSCH 3103 is scheduled on the scheduled cell Scell #1 with the lowest cell ID (i.e., the cell ID of the scheduled cell Scell #2 is greater than the cell ID of the scheduled cell Scell #1), the PUSCH 3103 is selected for multiplexing the periodic CSI CSI P-CSI #1 by the UE 100. In slot n+1, since PUSCH 3105 is scheduled on the scheduled cell Scell #3 with the lowest cell ID (i.e., the cell ID of the scheduled cell Scell #4 is greater than the cell ID of the scheduled cell Scell #3), the PUSCH 3105 is selected for multiplexing the periodic CSI CSI P-CSI #2 by the UE 100.

In some embodiments, the UE 100 may multiplex a first UCI with a first UCI type among the at least one UCI in a second PUSCH among the at least one first PUSCH. The UE 100 may multiplex a second UCI with a second UCI type among the at least one UCI in a third PUSCH among the at least one first PUSCH, wherein the second PUSCH is different from the third PUSCH. That is, the UE 100 may multiplex UCIs with different types in different PUSCHs.

In some embodiments, when multiple PUSCHs are scheduled in at least one UL slots by the DCI, and UCIs with multiple UCI types (e.g., HARQ-ACK and CSI) are collided in at least one of the multiple PUSCHs in a UL slot, the UCIs may be multiplexed in a same PUSCH or in different PUSCHs. For example, a first UCI with a first UCI type may be multiplexed on a first PUSCH of the multiple PUSCHs, and the second UCI type may be multiplexed on a second PUSCH of the multiple PUSCHs. The first UCI type may include HARQ-ACK or the combination of HARQ-ACK and CSI part 1. The second UCI type may include CSI or CSI part 2. The first PUSCH for transmitting the first UCI with the first UCI type may be a PUSCH with the lowest cell ID. The second PUSCH for transmitting the second UCI with the second UCI type may be a PUSCH with the 2nd lowest cell ID. Alternatively, the first PUSCH for transmitting the first UCI with the first UCI type and the second PUSCH for transmitting the second UCI with the second UCI type may be identical with each other, and the CSI comprise CSI part 1 and CSI part 2.

Figure 32:
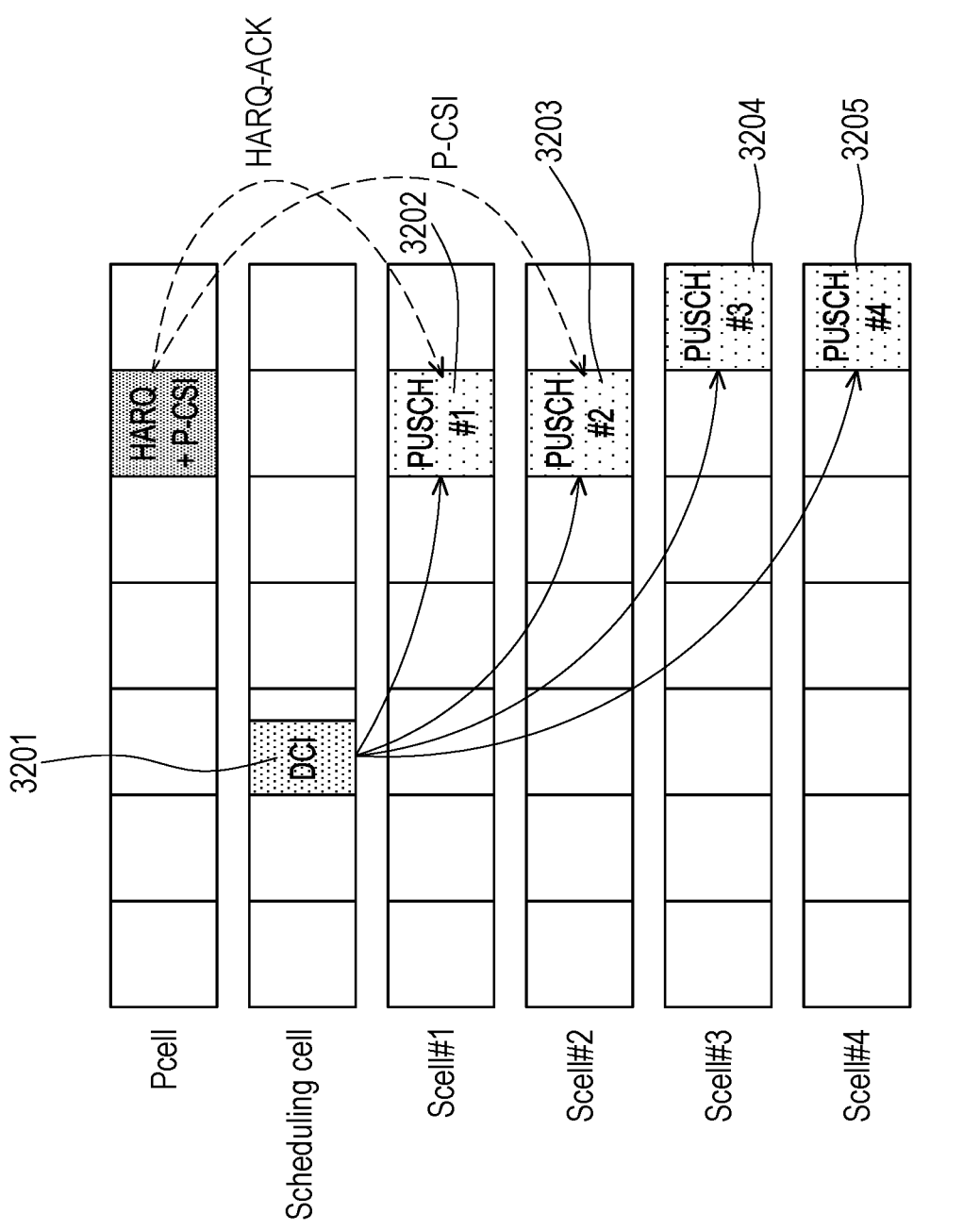
FIG. 32 is a schematic diagram that illustrates multiplexing different UCI types in PUSCH according to an exemplary embodiment of the present disclosure.

FIG. 32 is a schematic diagram that illustrates multiplexing different UCI types in PUSCH according to an exemplary embodiment of the present disclosure. Referring to FIG. 32, the UE 100 receives a DCI 3201 that schedules multiple PUSCHs 3202 to 3205 on multiple serving cells Scell #1, Scell #2, Scell #3, and Scell #4. A HARQ-ACK and a P-CSI are collided with each other in a UL slot. The HARQ-ACK may be multiplex in PUSCH 3202, and the P-CSI may be multiplexed in PUSCH 3203. Such that, it can avoid the P-CSI being dropped.

In some embodiments, the UE 100 may multiplex a first UCI with a first UCI type among the at least one UCI in a second PUSCH among the at least one first PUSCH, and multiplex a second UCI with a second UCI type among the at least one UCI in a third PUSCH among the at least one first PUSCH. The second PUSCH is identical with a third PUSCH if a code rate of the second UCI is not higher than a threshold. The second PUSCH is different from the third PUSCH if the code rate of the second UCI is higher than the threshold. The first UCI type may include HARQ-ACK or the combination of HARQ-ACK and CSI part 1. The second UCI type may include CSI or CSI part 2. That is, when a code rate of the second UCI is not higher than a threshold, the first UCI with the first UCI type and the second UCI with the second UCI type may be multiplexed in the different PUSCHs.

Figure 33A:
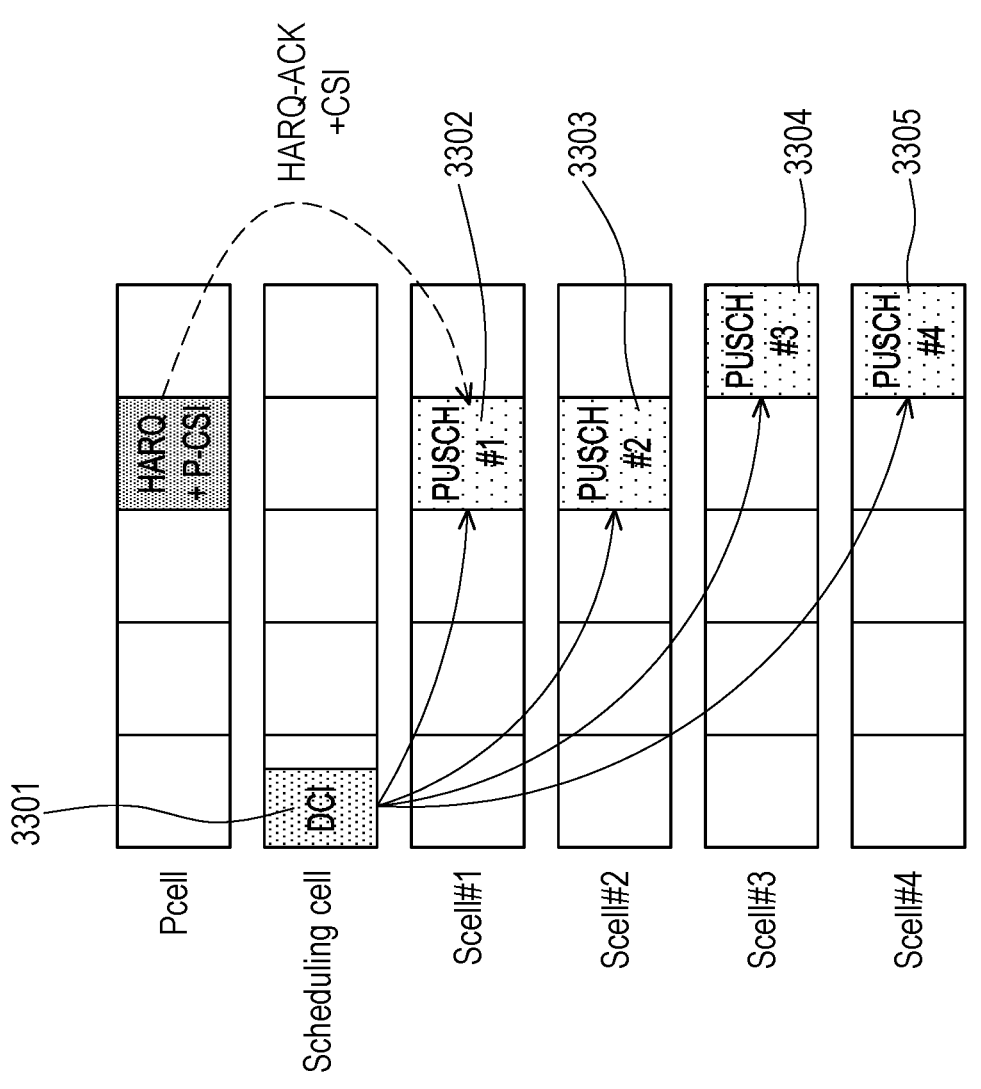
FIG. 33A is a schematic diagram that illustrates multiplexing different UCI types in PUSCH according to an exemplary embodiment of the present disclosure.

FIG. 33A is a schematic diagram that illustrates multiplexing different UCI types in PUSCH according to an exemplary embodiment of the present disclosure. Referring to FIG. 33A, the UE 100 receives a DCI 3301 that schedules multiple PUSCHs 3302 to 3305 on multiple serving cells Scell #1, Scell #2, Scell #3, and Scell #4. A HARQ-ACK and a P-CSI are collided with each other in a UL slot. The HARQ-ACK and the P-CSI may be multiplexed in PUSCH 3302 since the code rate of the P-CSI is not higher than a threshold when the P-CSI is multiplexed in the PUSCH 3302.

Figure 33B:
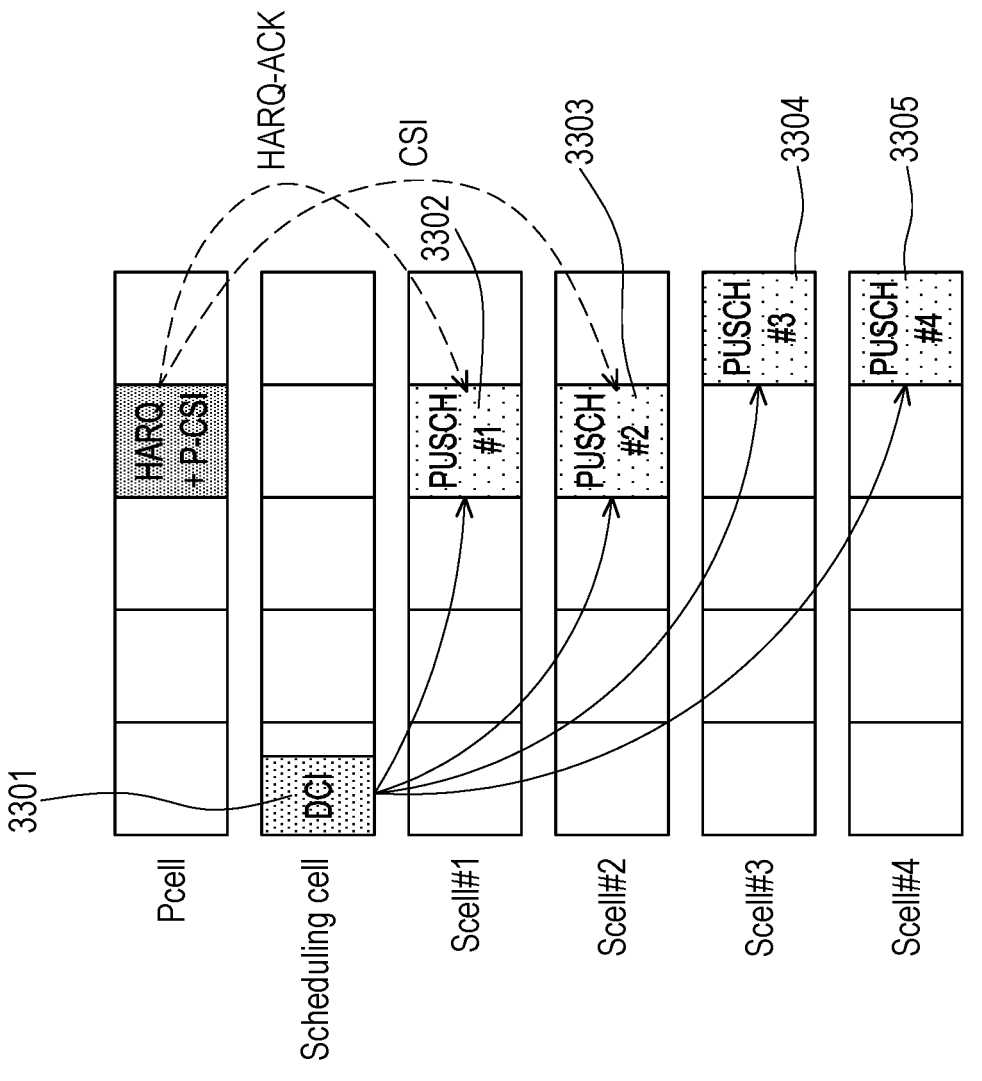
FIG. 33B is a schematic diagram that illustrates multiplexing different UCI types in PUSCH according to an exemplary embodiment of the present disclosure.

FIG. 33B is a schematic diagram that illustrates multiplexing different UCI types in PUSCH according to an exemplary embodiment of the present disclosure. Referring to FIG. 33B, the UE 100 receives a DCI 3301 that schedules multiple PUSCHs 3302 to 3305 on multiple serving cells Scell #1, Scell #2, Scell #3, and Scell #4. A HARQ-ACK and a P-CSI are collided with each other in a UL slot. The HARQ-ACK and the P-CSI may be respectively multiplexed in PUSCH 3302 and PUSCH 3303 since the code rate of the P-CSI is higher than a threshold when the P-CSI is multiplexed in the PUSCH 3302.

In some embodiments, the UE 100 may multiplex a first UCI with a first UCI type among the at least one UCI in a second PUSCH among the at least one first PUSCH. The UE 100 may drop a second UCI with a second UCI type among the at least one UCI according to a code rate of the second UCI. In some embodiments, when a code rate of second type UCI (e.g., CSI or CSI part 2) is higher than a threshold, wherein the code rate is determined by assuming the second type UCI is multiplexed in the second PUSCH, the second type UCI may be dropped according the following priority order until the code rate can satisfy the threshold. A-CSI (highest priority), SP-CSI, P-CSI, CSI reports carrying L1-RSRP/L1-SINR, CSI reports not carrying L1-RS RP/L1-S INR, serving cell index, reportConfigID (lowest priority).

In some embodiments, a beta_offset indicator in the DCI is applied to at least one first PUSCH among the PUSCH, and at least one UCI is respectively multiplexed in the at least one first PUSCH. In some embodiments, when multiple PUSCHs are scheduled in multiple UL (e.g., PUCCH) slots by a DCI. At least one beta_offset indicator in the DCI may be applied for determining multiple number of resources for multiplexing UCI in multiple PUSCHs in multiple UL slots.

Figure 34:
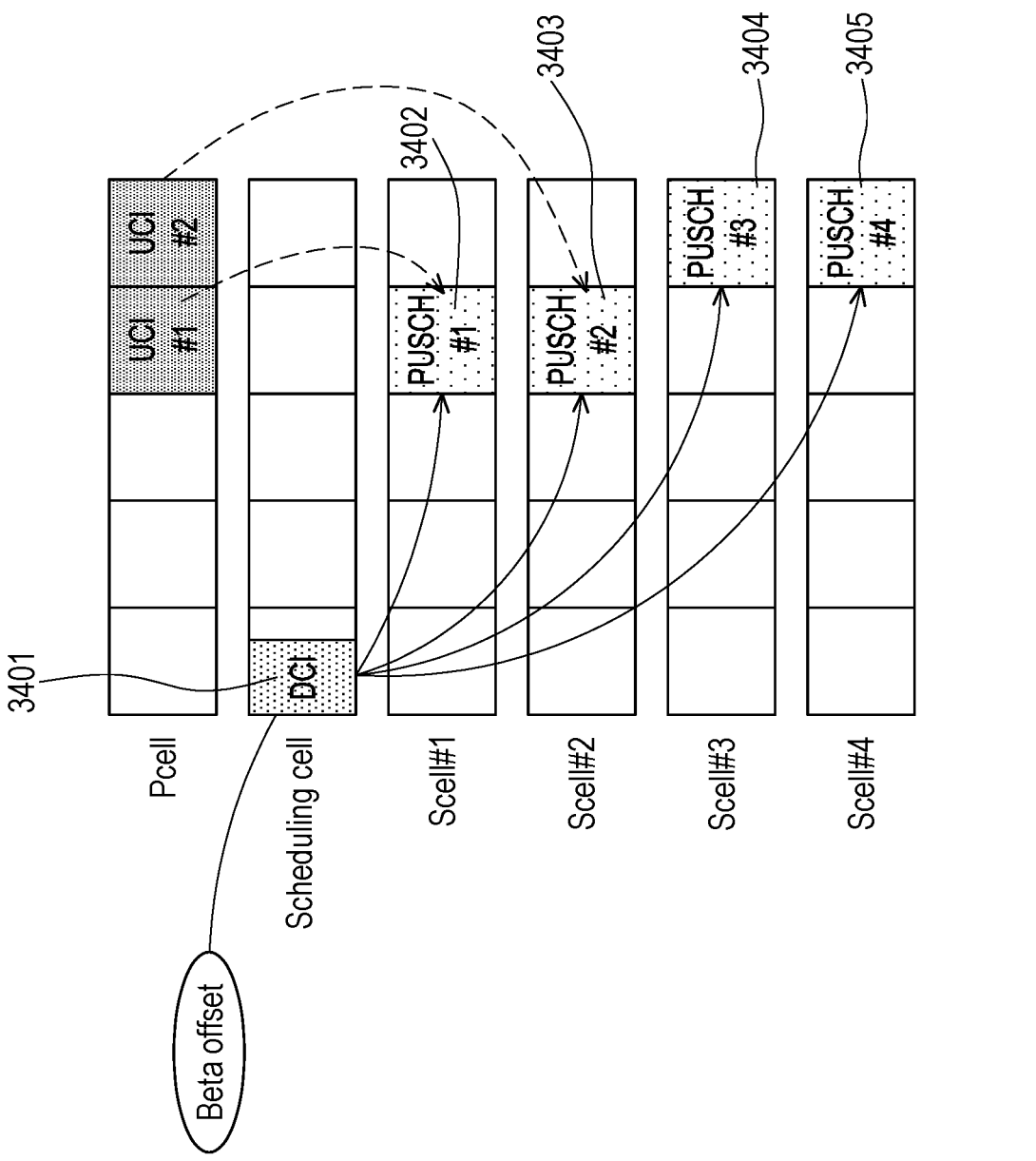
FIG. 34 is a schematic diagram that illustrates applying a beta_offset according to an exemplary embodiment of the present disclosure.

FIG. 34 is a schematic diagram that illustrates applying a beta_offset according to an exemplary embodiment of the present disclosure. Referring to FIG. 34, the UE 100 receives a DCI 3401 that schedules multiple PUSCHs 3402 to 3405 on multiple serving cells Scell #1, Scell #2, Scell #3, and Scell #4. Multiple PUSCHs 3402 to 3405 are scheduled in multiple UL slots of PUCCHs by the DCI 3401. The UE 100 may generate 2 resources according to a beta offset field (e.g., one codepoint indicated 2 beta offsets) in the DCI 3401 for multiplexing UCI in PUSCHs 3402 and 3404, respectively.

In some embodiments, a maximum number of the PUSCHs scheduled by the DCI is configured by a higher layer configuration. In some embodiments, a minimum number of PUSCHs scheduled by the DCI is 1. The maximum number (e.g., 3, 4, or 8) of PUSCHs may be a predetermined value, a fixed value or configured by the BS 200.

In some embodiments, the DCI comprises at least one single DCI field, and the at least one single DCI field corresponds to the at least one of the scheduled cells. That is, the DCI supporting multi-cell scheduling may include at least one share DCI field, and the share DCI field may be applied to all the scheduled cells. At least one single DCI field comprises at least one of an identifier field for a DCI format of the DCI, a TDRA field, a virtual resource block (VRB)-to-PRB mapping field, a SRS request field, a SRS offset indicator field, a channel state information (CSI) request field, a beta offset indicator field, an UL shared channel (UL-SCH) indicator field, a priority indicator field, a DMRS sequence initialization field, an open-loop power control parameter set indicator field, a UL/supplementary uplink (UL/SUL) indicator field, a TPC commend field, a downlink assignment index field, a secondary cell (Scell) dormancy indication field, a minimum applicable scheduling offset indicator field, a PDCCH monitoring adaptation indication field, an antenna port field, a SRS resource indicator field or a TPMI field.

In some embodiments, the DCI comprises a plurality of DCI field sets, and the plurality of DCI field sets respectively corresponds to the plurality of scheduled cells. Each DCI field set includes one or more DCI fields. That is, the DCI supporting multi-cell scheduling may include multiple DCI field sets, and the DCI fields of each DCI field set may be applied to one scheduled cell. Each of the plurality of DCI field sets comprises at least one of a FDRA field, an antenna port field, a modulation and coding scheme field, a sounding reference signal (SRS) resource indicator field, a precoding information and number of layers (TPMI) field, a hybrid automatic repeat request (HARM) process number field, a transmission power control (TPC) command field, a New data indicator (NDI) field, a Redundancy version (RV) field or a phase-tracking reference signal-demodulation reference signal (PTRS—DMRS) association field.

Figure 35:
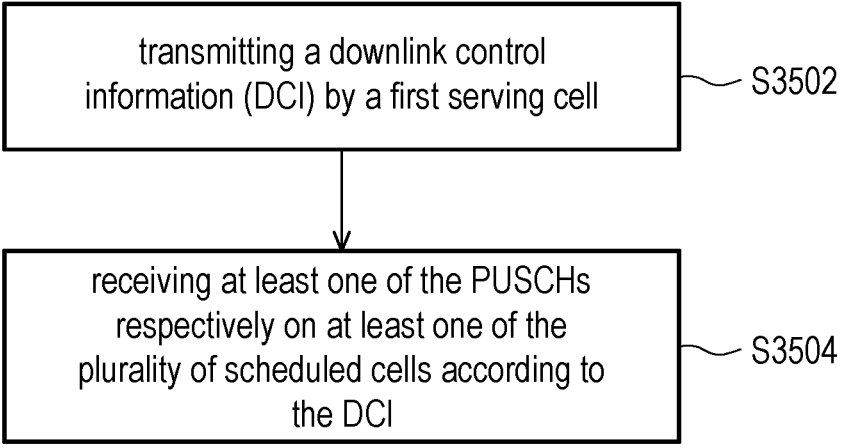
FIG. 35 is a flowchart of a method for handling multi-cell scheduling according to an embodiment of the disclosure.

FIG. 35 is a flowchart of a method for handling multi-cell scheduling according to an embodiment of the disclosure. Referring to FIG. 35, the method of this embodiment may be adapted for a BS 200 under the wireless communication system 10 of FIG. 1. Nevertheless, the processes of this method may be adjusted according to the actual needs and thus are not limited to the following.

In step S3502, the BS 200 may transmit a downlink control information (DCI) by a first serving cell, wherein the DCI is configured to schedule a plurality of PUSCHs respectively on the plurality of scheduled cells. The DCI for scheduling multiple PUSCHS on multiple serving cells has been described in the previous embodiments. In step S3504, the BS 200 may receive at least one of the PUSCHs respectively on at least one of the plurality of scheduled cells according to the DCI. The DCI supporting multi-cells scheduling has been described in detail set above.

Figure 36:
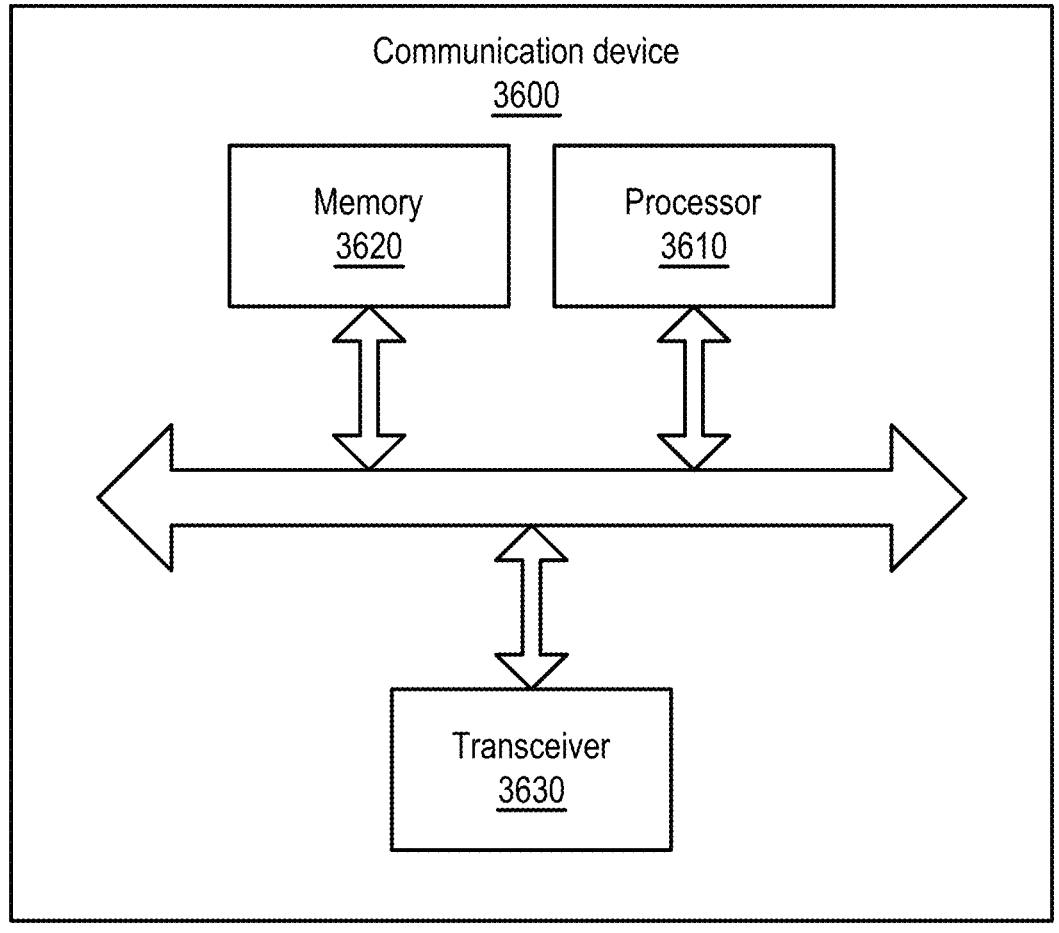
FIG. 36 is a block diagram that illustrates a communication device according to an exemplary embodiment of the present disclosure.

FIG. 36 is a block diagram that illustrates a communication device 3600 according to an exemplary embodiment of the present disclosure. Referring to FIG. 36, the communication device 3600 may be a UE or a BS. The communication device 3600 may include, but is not limited thereto a processor 3610. The processor 3610 (e.g., having processing circuitry) may include an intelligent hardware device, e.g., a Central Processing Unit (CPU), a microcontroller, an ASIC, and etc. The processor 3610 can call and run a computer program from a memory to implement the method in the embodiment of the disclosure.

Since the program code stored in the communication device 3600 adopts all the technical solutions of all the foregoing embodiments when being executed by the processor 3610, it at least has all the advantageous effects brought by all the technical solutions of all the foregoing embodiments, and no further description is incorporated herein.

Optionally, as shown in FIG. 36, the communication device 3600 may further include a memory 3620. The memory 3620 may include computer-storage media in the form of volatile and/or non-volatile memory. The memory 3620 may be removable, non-removable, or a combination thereof. Exemplary memory includes solid-state memory, hard drives, optical-disc drives, and etc. The processor 3610 may call and run a computer program from the memory 3620 to implement the method in the embodiment of the disclosure.

The memory 3620 may be a separate device independent of the processor 3610, or may be integrated in the processor 3610.

Optionally, as shown in FIG. 36, the communication device 3600 may further include a transceiver 3630, and the processor 3610 may control the transceiver 3630 to communicate with other devices. The transceiver 3600 having a transmitter (e.g., transmitting/transmission circuitry) and a receiver (e.g., receiving/reception circuitry) may be configured to transmit and/or receive time and/or frequency resource partitioning information. In some implementations, the transceiver 3600 may be configured to transmit in different types of subframes and slots including, but not limited to, usable, non-usable and flexibly usable subframes and slot formats. The transceiver 3630 may be configured to receive data and control channels. The transceiver 3630 may execute operations of Low Noise Amplifying (LNA), impedance matching, analog-to-digital (ADC) converting, digital-to-analog (DAC) converting, frequency mixing, up-down frequency conversion, filtering, amplifying and/or similar operations.

Specifically, the transceiver 3630 may send information or data to other devices, or receive information or data sent by other devices.

Specifically, the transceiver 3630 may include a transmitter and a receiver. The transceiver 3630 may further include an antenna, and the number of antennas may be one or more.

Any content of each embodiment of the embodiment of the present application, and any content of the same embodiment, may be freely combined. Any combination of the above is within the scope of embodiments of the present application.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items.

It will be apparent to those skilled in the art that various modifications and variations could be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for handling multi-cell scheduling used by a user equipment (UE), the method comprising:
   receiving a downlink control information (DCI) from a first serving cell;
   determining a plurality of scheduled cells from a first set of serving cell according to the DCI, wherein the DCI is configured to schedule a plurality of PUSCHs respectively on the plurality of scheduled cells; and
   transmitting at least one of the PUSCHs respectively on at least one of the plurality of scheduled cells according to the DCI,
   wherein the method further comprises:
   disabling transmitting an uplink shared channel (UL-SCH) on a serving cell with lowest cell ID among the scheduled cells when a UL-SCH indicator field indicating zero in the DCI.

2. The method according to claim 1, wherein the PUSCHs are transmitted in multiple UL slots or a single UL slot.

3. The method according to claim 1, wherein a sub-carrier spacing (SCS) corresponding to each of the PUSCHs is identical with a reference SCS.

4. The method according to claim 3, wherein the reference SCS is a SCS corresponding to a PDCCH transmitting the DCI.

5. The method according to claim 1, further comprising:
   determining not to transmit one of the PUSCHs on one of the plurality of scheduled cells if a SCS corresponding to the one of the PUSCHs is different from a reference SCS.

6. The method according to claim 1, wherein the DCI comprises a first indication, and the method further comprises:
   determining the first set of serving cell from a plurality sets of serving cell according to the first indication in the DCI, wherein each of the sets of serving cell comprises a plurality of serving cells.

7. The method according to claim 1, wherein the DCI comprises a second indication, and the step of determining the plurality of scheduled cells from the first set of serving cell according to the DCI comprises:
   determining the plurality of scheduled cells from the first set of serving cell according to the second indication in the DCI, wherein the first set of serving cell comprises a plurality of serving cells.

8. The method according to claim 1, wherein the step of determining the plurality of scheduled cells from the first set of serving cell according to the DCI comprises:
   determining a serving cell excluded from the plurality of scheduled cells in response to ta Frequency domain resource assignment (FDRA) field of the serving cell in the DCI comply with a predetermined pattern.

9. The method according to claim 1, further comprising:
   determining a priority index of one of the PUSCHs transmitted on one of the scheduled cells according to a priority index field of the DCI.

10. The method according to claim 9, wherein a plurality of priority indexes of all of the PUSCHs transmitted on the scheduled cells are identical.

11. The method according to claim 1, further comprising:
   determining a priority index of one of the PUSCHs transmitted on one of the scheduled cells according to a priority index field of the DCI if the one of the scheduled cells is configured with a higher layer configuration, wherein the higher layer configuration is configured to indicate whether the one of the scheduled cells supporting PUSCH with different priority index.

12. The method according to claim 1, further comprising:
   determining a priority index of one of the PUSCHs transmitted on one of the scheduled cells as a fixed priority index if the one of the scheduled cells is not configured with a higher layer configuration, wherein the higher layer configuration is configured to indicate whether the one of the scheduled cells supporting PUSCH with different priority index.

13. The method according to claim 1, further comprising:
   multiplexing at least one UCI on at least one first PUSCH of the at least one of the PUSCHs, wherein the at least one UCI comprises at least one of a HARQ-ACK, a periodic CSI and an aperiodic CSI.

14. The method according to claim 13, wherein the at least one UCI comprises the aperiodic CSI, the aperiodic CSI is multiplexed on the at least one first PUSCH, and the aperiodic CSI is triggered by the DCI.

15. The method according to claim 14, wherein the at least one first PUSCH with the aperiodic CSI is transmitted in a predetermined UL slot, the predetermined UL slot is one of UL slots of the PUSCHs, and the predetermined UL slot comprises an earliest UL slot among the UL slots of the PUSCHs, a latest UL slot among the UL slots of the PUSCHs, or a UL slot satisfying with a timing limitation of the aperiodic CSI.

16. The method according to claim 15, wherein the at least one first PUSCH with the aperiodic CSI is transmitted on a first scheduled cell with a lowest cell ID among the scheduled cells, and the scheduled cells are configured for respectively transmitting the PUSCHs in the predetermined UL slot.

17. The method according to claim 14, wherein the at least one first PUSCH with the aperiodic CSI is transmitted on a first scheduled cell with a lowest cell ID among the scheduled cells.

18. The method according to claim 13, wherein the at least one first PUSCH is overlapped with at least one PUCCH for transmitting the at least one UCI in time domain, and the at least one first PUSCH is transmitted in a first scheduled cell with a lowest cell ID among the scheduled cells.

19. The method according to claim 18, wherein the at least one UCI is the HARQ-ACK or the periodic CSI.

20. The method according to claim 18, wherein the step of multiplexing the at least one UCI on the at least one first PUSCH comprising:
    multiplexing a first UCI with a first UCI type among the at least one UCI in a second PUSCH among the at least one first PUSCH; and
    multiplexing a second UCI with a second UCI type among the at least one UCI in a third PUSCH among the at least one first PUSCH, wherein the second PUSCH is different from the third PUSCH.

21. The method according to claim 18, wherein the step of multiplexing the at least one UCI on the at least one first PUSCH comprising:
    multiplexing a first UCI with a first UCI type among the at least one UCI in a second PUSCH among the at least one first PUSCH; and
    multiplexing a second UCI with a second UCI type among the at least one UCI in a third PUSCH among the at least one first PUSCH,
    wherein the second PUSCH is identical with a third PUSCH if a code rate of the second UCI is not higher than a threshold; and the second PUSCH is different from the third PUSCH if the code rate of the second UCI is higher than the threshold.

22. The method according to claim 18, wherein the step of multiplexing the at least one UCI on the at least one first PUSCH comprising:
    multiplexing a first UCI with a first UCI type among the at least one UCI in the at least one first PUSCH; and
    dropping a second UCI with a second UCI type among the at least one UCI according to a code rate of the second UCI.

23. The method according to claim 1, wherein a DAI in the DCI is applied to at least one first PUSCH among the PUSCHs, and at least one HARQ-ACK is respectively multiplexed in the at least one first PUSCH.

24. The method according to claim 23, wherein the at least one first PUSCH is transmitted in a plurality of different slots.

25. The method according to claim 1, wherein a beta_offset indicator in the DCI is applied to at least one first PUSCH among the PUSCH, and at least one UCI is respectively multiplexed in the at least one first PUSCH.

26. The method according to claim 1, wherein the DCI is not scrambled by a SP-CSI-RNTI, or the DCI is configured not to activate a SP CSI report on one of the scheduled cells.

27. The method according to claim 1, wherein a maximum number of the PUSCHs scheduled by the DCI is configured by a higher layer configuration.

28. The method according to claim 1, wherein a minimum number of PUSCHs scheduled by the DCI is 1.

29. The method according to claim 1, wherein the DCI comprises at least one single DCI field, and the at least one single DCI field corresponds to the at least one of the scheduled cells.

30. The method according to claim 29, wherein at least one single DCI field comprises at least one of an identifier field for a DCI format of the DCI, a TDRA field, a virtual resource block (VRB)-to-PRB mapping field, a SRS request field, a SRS offset indicator field, a channel state information (CSI) request field, a beta offset indicator field, an UL shared channel (UL-SCH) indicator field, a priority indicator field, a DMRS sequence initialization field, an open-loop power control parameter set indicator field, a UL/supplementary uplink (UL/SUL) indicator field, a TPC commend field, a downlink assignment index field, a secondary cell (Scell) dormancy indication field, a minimum applicable scheduling offset indicator field, a PDCCH monitoring adaptation indication field, an antenna port field, a SRS resource indicator field or a TPMI field.

31. The method according to claim 1, wherein the DCI comprises a plurality of DCI field sets, and the plurality of DCI field sets respectively corresponds to the plurality of scheduled cells.

32. The method according to claim 31, wherein each of the plurality of DCI field sets comprises at least one of a FDRA field, an antenna port field, a modulation and coding scheme field, a sounding reference signal (SRS) resource indicator field, a precoding information and number of layers (TPMI) field, a hybrid automatic repeat request (HARQ) process number field, a transmission power control (TPC) command field, a New data indicator (NDI) field, a Redundancy version (RV) field or a phase-tracking reference signal-demodulation reference signal (PTRS-DMRS) association field.

33. A user equipment comprising:
    a transceiver; and
    a processor connected to the transceiver and configured at least to:
        receive a downlink control information (DCI) from a first serving cell;
        determine a plurality of scheduled cells from a first set of serving cell according to the DCI, wherein the DCI is configured to schedule a plurality of PUSCHs respectively on the plurality of scheduled cells; and
        transmit at least one of the PUSCHs respectively on at least one of the plurality of scheduled cells according to the DCI,
    wherein the processor is configured to:
        disabling transmitting an uplink shared channel (UL-SCH) on a serving cell with lowest cell ID among the scheduled cells when a UL-SCH indicator field indicating zero in the DCI.

34. A method for handling multi-cell scheduling used by a user equipment (UE), the method comprising:
    receiving a downlink control information (DCI) from a first serving cell;
    determining a plurality of scheduled cells from a first set of serving cell according to the DCI, wherein the DCI is configured to schedule a plurality of PUSCHs respectively on the plurality of scheduled cells;
    multiplexing at least one UCI on at least one first PUSCH of the at least one of the PUSCHs, wherein the at least one UCI comprises at least one of a HARQ-ACK, a periodic CSI and an aperiodic CSI, wherein the aperiodic CSI is multiplexed on the at least one first PUSCH, and the aperiodic CSI is triggered by the DCI, the at least one first PUSCH with the aperiodic CSI is transmitted on a first scheduled cell with a lowest cell ID among the scheduled cells; and transmitting at least one of the PUSCHs respectively on at least one of the plurality of scheduled cells according to the DCI, wherein the step of multiplexing the at least one UCI on the at least one first PUSCH comprises:

multiplexing a first UCI with a first UCI type among the at least one UCI in the at least one first PUSCH; and dropping a second UCI with a second UCI type among the at least one UCI according to a code rate of the second UCI.

* * * * *